United States Patent
Tseng et al.

(10) Patent No.: US 11,953,657 B2
(45) Date of Patent: Apr. 9, 2024

(54) PHOTOGRAPHING OPTICAL LENS ASSEMBLY INCLUDING EIGHT LENSES OF +-+--++-, +-++-++-, ++++-++- OR +-+-+-+- REFRACTIVE POWERS, IMAGING APPARATUS AND ELECTRONIC DEVICE

(71) Applicant: LARGAN PRECISION CO., LTD., Taichung (TW)

(72) Inventors: Yu-Tai Tseng, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 18/052,596

(22) Filed: Nov. 4, 2022

(65) Prior Publication Data
US 2023/0088080 A1    Mar. 23, 2023

Related U.S. Application Data

(63) Continuation of application No. 16/942,922, filed on Jul. 30, 2020, now Pat. No. 11,531,191.

(30) Foreign Application Priority Data

Jan. 20, 2020 (TW) .................. 109102020

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| 5,048,940 A | 9/1991 | Ueda et al. |
| 5,066,113 A | 11/1991 | Nakajima et al. |
| 5,642,229 A | 6/1997 | Kaneko et al. |

(Continued)

FOREIGN PATENT DOCUMENTS

| CN | 108227145 A | 6/2018 |
| CN | 108594407 A | 9/2018 |

(Continued)

*Primary Examiner* — Wen Huang
(74) *Attorney, Agent, or Firm* — McClure, Qualey & Rodack, LLP

(57) ABSTRACT

A photographing optical lens assembly includes eight lens elements, which are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface towards the object side and an image-side surface towards the image side. The first lens element has positive refractive power. The object-side surface of the fifth lens element is concave in a paraxial region thereof. The image-side surface of the sixth lens element is concave in a paraxial region thereof. The object-side surface of the seventh lens element is convex in a paraxial region thereof. The image-side surface of the eighth lens element is concave in a paraxial region thereof.

20 Claims, 25 Drawing Sheets

(56) References Cited

U.S. PATENT DOCUMENTS

| | | |
|---|---|---|
| 10,705,319 B2 | 7/2020 | Jhang et al. |
| 2019/0056568 A1 | 2/2019 | Huang |
| 2019/0204560 A1 | 7/2019 | Jhang et al. |
| 2019/0302427 A1 | 10/2019 | Jung et al. |
| 2020/0012078 A1 | 1/2020 | Kuo |
| 2020/0158987 A1 | 5/2020 | Chou et al. |
| 2021/0157097 A1 | 5/2021 | Hirano |
| 2021/0157098 A1 | 5/2021 | Hirano |
| 2021/0173183 A1 | 6/2021 | Ye et al. |
| 2022/0050268 A1 | 2/2022 | Dai et al. |

FOREIGN PATENT DOCUMENTS

| | | |
|---|---|---|
| CN | 108646394 A | 10/2018 |
| CN | 108681040 A | 10/2018 |
| CN | 108761730 A | 11/2018 |
| CN | 108873272 A | 11/2018 |
| CN | 109343203 A | 2/2019 |
| CN | 109343205 A | 2/2019 |
| CN | 109358410 A | 2/2019 |
| CN | 109870788 A | 6/2019 |
| CN | 110412749 A | 11/2019 |
| CN | 110426822 A | 11/2019 |
| CN | 110456490 A | 11/2019 |
| CN | 110554485 A | 12/2019 |
| CN | 110850559 A | 2/2020 |
| CN | 110927931 A | 3/2020 |
| CN | 110967813 A | 4/2020 |
| CN | 110989136 A | 4/2020 |
| CN | 111061036 A | 4/2020 |
| CN | 111061037 A | 4/2020 |
| CN | 111077656 A | 4/2020 |
| JP | H01261612 A | 10/1989 |
| JP | H02196207 A | 8/1990 |
| TW | I672537 B | 9/2019 |
| TW | 201945784 A | 12/2019 |
| WO | 2019100768 A1 | 5/2019 |
| WO | 2019105139 A1 | 6/2019 |
| WO | 2021114233 A1 | 6/2021 |
| WO | 2021114236 A1 | 6/2021 |
| WO | 2021114242 A1 | 6/2021 |
| WO | 2021128390 A1 | 7/2021 |

PHOTOGRAPHING OPTICAL LENS ASSEMBLY INCLUDING EIGHT LENSES OF +−+−−++−, +−++−++−, ++++−++− OR +−+−+−+− REFRACTIVE POWERS, IMAGING APPARATUS AND ELECTRONIC DEVICE

RELATED APPLICATIONS

This application is a continuation of the U.S. application Ser. No. 16/942,922, filed on Jul. 30, 2020, which claims priority to Taiwan Application Serial Number 109102020, filed Jan. 20, 2020, which are herein incorporated by references.

BACKGROUND

Technical Field

The present disclosure relates to a photographing optical lens assembly and an imaging apparatus. More particularly, the present disclosure relates to a photographing optical lens assembly and an imaging apparatus with compact size applicable to electronic devices.

Description of Related Art

With recent technology of semiconductor process advances, performances of image sensors are enhanced, so that the smaller pixel size can be achieved. Therefore, optical lens assemblies with high image quality have become an indispensable part of many modern electronics. With rapid developments of technology, applications of electronic devices equipped with optical lens assemblies increase and there is a wide variety of requirements for optical lens assemblies. However, in a conventional optical lens assembly, it is hard to balance among image quality, sensitivity, aperture size, volume or field of view. Thus, there is a demand for an optical lens assembly that meets the aforementioned needs.

SUMMARY

According to one aspect of the present disclosure, a photographing optical lens assembly includes eight lens elements, the eight lens elements being, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface towards the object side and an image-side surface towards the image side. The first lens element has positive refractive power. The object-side surface of the fifth lens element is concave in a paraxial region thereof. The image-side surface of the sixth lens element is concave in a paraxial region thereof. The object-side surface of the seventh lens element is convex in a paraxial region thereof. The image-side surface of the eighth lens element is concave in a paraxial region thereof. At least one of the object-side surfaces and the image-side surfaces of the eight lens elements includes at least one critical point in an off-axis region thereof. When an axial distance between the first lens element and the second lens element is T12, an axial distance between the second lens element and the third lens element is T23, an axial distance between the third lens element and the fourth lens element is T34, a curvature radius of the object-side surface of the third lens element is R5, and a curvature radius of the image-side surface of the third lens element is R6, the following conditions are satisfied: $5.5 < (T12+T34)/T23$; and $-0.70 < R5/R6 < 0.80$.

According to another aspect of the present disclosure, a photographing optical lens assembly includes eight lens elements, the eight lens elements being, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface towards the object side and an image-side surface towards the image side. The first lens element has positive refractive power. The object-side surface of the second lens element is convex in a paraxial region thereof. The third lens element has positive refractive power. The image-side surface of the fifth lens element is convex in a paraxial region thereof. The object-side surface of the sixth lens element is convex in a paraxial region thereof. At least one of the object-side surfaces and the image-side surfaces of the eight lens elements includes at least one critical point in an off-axis region thereof. When an axial distance between the sixth lens element and the seventh lens element is T67, an axial distance between the seventh lens element and the eighth lens element is T78, an axial distance between the object-side surface of the first lens element and the image-side surface of the eighth lens element is TD, a curvature radius of the object-side surface of the eighth lens element is R15, and a curvature radius of the image-side surface of the eighth lens element is R16, the following conditions are satisfied: $2.0 < TD/(T67+T78) < 6.3$; and $0.30 < (R15+R16)/(R15-R16)$.

According to another aspect of the present disclosure, an imaging apparatus includes the photographing optical lens assembly of the aforementioned aspect and an image sensor, wherein the image sensor is disposed on an image surface of the photographing optical lens assembly.

According to another aspect of the present disclosure, an electronic device includes the imaging apparatus of the aforementioned aspect.

According to another aspect of the present disclosure, a photographing optical lens assembly includes eight lens elements, the eight lens elements being, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface towards the object side and an image-side surface towards the image side. The first lens element has positive refractive power. The third lens element has positive refractive power. The object-side surface of the fifth lens element is concave in a paraxial region thereof. The object-side surface of the seventh lens element is convex in a paraxial region thereof. The image-side surface of the eighth lens element is concave in a paraxial region thereof. At least one of the object-side surface and the image-side surface of the eighth lens element includes at least one critical point in an off-axis region thereof. When an axial distance between the sixth lens element and the seventh lens element is T67, an axial distance between the seventh lens element and the eighth lens element is T78, a focal length of the photographing optical lens assembly is f, and a curvature radius of the object-side surface of the fifth lens element is R9, the following conditions are satisfied: $-0.40 < (T67-T78)/(T67+T78)$; and $-1.0 < R9/f < 0$.

According to another aspect of the present disclosure, an imaging apparatus includes the photographing optical lens assembly of the aforementioned aspect and an image sensor, wherein the image sensor is disposed on an image surface of the photographing optical lens assembly.

According to another aspect of the present disclosure, an electronic device includes the imaging apparatus of the aforementioned aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
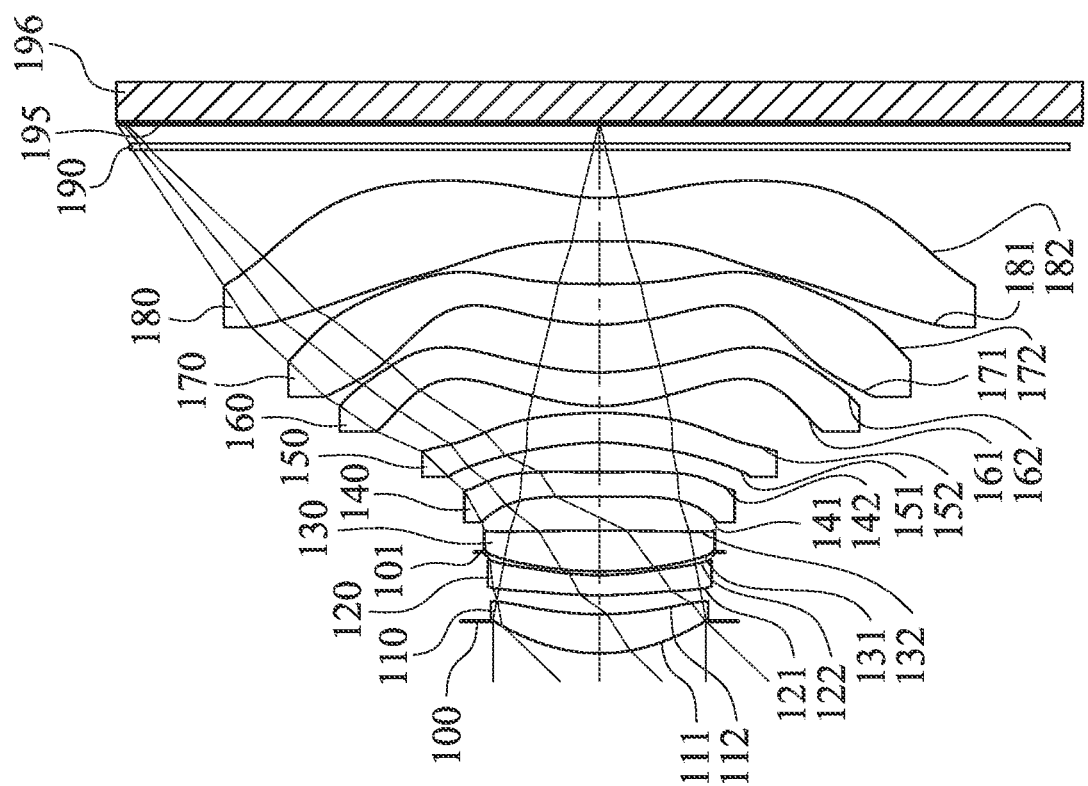
FIG. 1 is a schematic view of an imaging apparatus according to the 1st embodiment of the present disclosure.

A photographing optical lens assembly includes eight lens elements, which are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface towards the object side and an image-side surface towards the image side.

The first lens element has positive refractive power, so that it is favorable for compressing a total track length of the photographing optical lens assembly. The object-side surface of the first lens element can be convex in a paraxial region thereof, so that it allows light from each of field of view entering the photographing optical lens assembly evenly, so as to increase peripheral relative illuminance on an image surface. The image-side surface of the first lens element can be concave in a paraxial region thereof, so that it is favorable for correcting aberrations, such as coma aberration.

The object-side surface of the second lens element can be convex in a paraxial region thereof, so that it is favorable for reducing surface reflection in cooperation with the first lens element. The image-side surface of the second lens element can be concave in a paraxial region thereof, so that it is favorable for correcting aberrations in cooperation with the third lens element.

The third lens element can have positive refractive power, so that it is favorable for reducing sensitivity to increase assembling yield rate by dispersing positive refractive power in which is for compressing the total track length of the photographing optical lens assembly. The object-side surface of the third lens element can be convex in a paraxial region thereof, so that it is favorable for compressing the total track length of the photographing optical lens assembly by adjusting the refractive power of the third lens element.

The object-side surface of the fifth lens element can be concave in a paraxial region thereof, so that it is favorable for obtaining proper volume distribution of the photographing optical lens assembly to balance among the field of view, the size of the image surface and the total track length by adjusting the traveling direction of the light. The image-side surface of the fifth lens element can be convex in a paraxial region thereof, so that it is favorable for enlarging the area of the image surface by adjusting the traveling direction of the light.

The object-side surface of the sixth lens element can be convex in a paraxial region thereof, so that it is favorable for correcting aberrations in the off-axis region in cooperation with the fifth lens element. The image-side surface of the sixth lens element can be concave in a paraxial region thereof, so that it is favorable for correcting aberrations and adjusting the volume distribution on the image side of the photographing optical lens assembly by adjusting the traveling direction of the light.

The seventh lens element can have positive refractive power, so that it is favorable for compressing the volume of the image side of the photographing optical lens assembly. The object-side surface of the seventh lens element can be convex in a paraxial region thereof, so that it is favorable for balancing among the image quality, the size of the image surface and the volume distribution by adjusting the surface shape and the refractive power of the seventh lens element.

The eighth lens element can have negative refractive power, so that it is favorable for obtaining a suitable back focal length. The image-side surface of the eighth lens element can be concave in a paraxial region thereof, so that it is favorable for adjusting the back focal length and correct aberrations in the off-axis region, such as field curvature, by obtaining a suitable surface shape of the eighth lens element.

At least one of the object-side surfaces and the image-side surfaces of the eight lens elements includes at least one critical point in an off-axis region thereof. Therefore, it is favorable for increasing the variation of the surfaces of the lens elements so as to correct aberrations in the off-axis region and increase peripheral illuminance on the image surface, and to configure wide field of view and large image surface. Moreover, at least one of the object-side surfaces and the image-side surfaces of the sixth lens element, the seventh lens element and the eighth lens element can include at least one critical point in the off-axis region thereof. Hence, it is favorable for enhancing the image quality in the off-axis region of the image surface and compressing the volume of the object side of the photographing optical lens assembly by arranging the critical points on the image side of the photographing optical lens assembly.

At least one of the object-side surface and the image-side surface of the sixth lens element can include at least one critical point in the off-axis region thereof, so that it is favorable for adjusting the volume distribution of the photographing optical lens assembly by adjusting the traveling direction of the light. The object-side surface of the sixth lens element can include at least one critical point in the off-axis region thereof, so that it is favorable for enlarging the area of the image surface by adjusting the traveling direction of the light. Moreover, the image-side surface of the sixth lens element can include at least one critical point in the off-axis region thereof, so that it is favorable for reducing aberrations in the off-axis region.

At least one of the object-side surface and the image-side surface of the seventh lens element can include at least one critical point in the off-axis region thereof, so that it is favorable for enhancing the image quality in the off-axis region of the image surface. The object-side surface of the seventh lens element can include at least one critical point in the off-axis region thereof, so that it is favorable for enlarging the area of the image surface and enhancing the image quality in the off-axis region of the image surface by adjusting the incident angle of the light on the seventh lens element. Moreover, the image-side surface of the seventh lens element can include at least one critical point in the off-axis region thereof, so that it is favorable for correcting aberrations in the off-axis region in cooperation with the eighth lens element.

At least one of the object-side surface and the image-side surface of the eighth lens element can include at least one critical point in the off-axis region thereof, so that it is favorable for correcting aberrations in the off-axis region by adjusting the surface shape of the eighth lens element. Moreover, the image-side surface of the eighth lens element can include at least one critical point in the off-axis region thereof, so that it is favorable for enhancing the illuminance on the image surface and the response efficiency of an image sensor by correcting aberrations in the off-axis region and adjusting the incident angle of the light on the image surface.

Each of at least three of the eight lens elements can include at least one inflection point on at least one of the surfaces thereof. Therefore, it is favorable for correcting aberrations and compressing the volume by increasing the variation of the surfaces of the lens elements. Each of at least four or at least five of the eight lens elements can include at least one inflection point on at least one of the surfaces thereof. Moreover, both the object-side surface and the image-side surface of each of the eight lens elements can include at least one inflection point, so that it is favorable for further correcting aberrations and compressing the volume by increasing the variation of the surfaces of the lens elements.

When an axial distance between the first lens element and the second lens element is T12, an axial distance between the second lens element and the third lens element is T23, and an axial distance between the third lens element and the fourth lens element is T34, the following condition is satisfied: $5.5<(T12+T34)/T23$. Therefore, it is favorable for compressing the volume of the object side of the photographing optical lens assembly by configuring the distribution of the lens elements on the object side of the photographing optical lens assembly. Moreover, the following condition can be satisfied: $6.5<(T12+T34)/T23<90$. Further, the following condition can be satisfied: $8.0<(T12+T34)/T23<50$. Furthermore, the following condition can be satisfied: $10<(T12+T34)/T23<30$.

When a curvature radius of the object-side surface of the third lens element is R5, and a curvature radius of the image-side surface of the third lens element is R6, the following condition is satisfied: $-1.6<R5/R6$ or $R5/R6<0.80$. Therefore, it is favorable for correcting aberrations and compressing the volume by adjusting the surface shape and the refractive power of the third lens element. Moreover, the following condition can be satisfied: $-1.3<R5/R6$; $-1.0<R5/R6$; $-0.70<R5/R6$; $-0.55<R5/R6$; $R5/R6<0.55$; $R5/R6<0.30$; or $R5/R6<0.15$. Further, the following condition can be satisfied: $-0.70<R5/R6<0.80$. Furthermore, the following condition can be satisfied: $-0.55<R5/R6<0.30$.

When an axial distance between the sixth lens element and the seventh lens element is T67, an axial distance between the seventh lens element and the eighth lens element is T78, and an axial distance between the object-side surface of the first lens element and the image-side surface of the eighth lens element is TD, the following condition is satisfied: $2.0<TD/(T67+T78)<6.3$. Therefore, it is favorable for configuring large image surface and short total track length by configuring the distribution of the lens elements of the photographing optical lens assembly. Moreover, the following condition can be satisfied: $3.0<TD/(T67+T78)<6.0$. Furthermore, the following condition can be satisfied: $4.0<TD/(T67+T78)<6.0$.

When a curvature radius of the object-side surface of the eighth lens element is R15, and a curvature radius of the image-side surface of the eighth lens element is R16, the following condition is satisfied: $0.30<(R15+R16)/(R15-R16)$. Therefore, it is favorable for adjusting the back focal length and correct aberrations by adjusting the surface shape of the eighth lens element. Moreover, the following condition can be satisfied: $0.50<(R15+R16)/(R15-R16)<4.0$. Further, the following condition can be satisfied: $0.70<(R15+R16)/(R15-R16)<2.0$. Furthermore, the following condition can be satisfied: $0.85<(R15+R16)/(R15-R16)<1.5$.

When the axial distance between the sixth lens element and the seventh lens element is T67, and the axial distance between the seventh lens element and the eighth lens element is T78, the following condition is satisfied: $-0.40<(T67-T78)/(T67+T78)$ or $(T67-T78)/(T67+T78)<0.40$. Therefore, it is favorable for correcting aberrations and enlarging the area of the image surface by adjusting the traveling direction of the light by cooperating the seventh lens element and the eighth lens element. Moreover, the following condition can be satisfied: $-0.30<(T67-T78)/(T67+T78)$; $-0.20<(T67-T78)/(T67+T78)$; $(T67-T78)/(T67+T78)<0.30$; or $(T67-T78)/(T67+T78)<0.25$. Furthermore, the following condition can be satisfied: $-0.30<(T67-T78)/(T67+T78)<0.30$.

When a focal length of the photographing optical lens assembly is f, and a curvature radius of the object-side surface of the fifth lens element is R9, the following condition is satisfied: $-1.0<R9/f<0$. Therefore, it is favorable for adjusting the traveling direction of the light to obtain proper volume distribution of the photographing optical lens assembly by adjusting the surface shape and the refractive power of the fifth lens element. Moreover, the following condition can be satisfied: $-0.90<R9/f<-0.25$. Furthermore, the following condition can be satisfied: $-0.80<R9/f<-0.45$.

When a minimum among Abbe numbers of all the lens elements of the photographing optical lens assembly is Vmin, the following condition is satisfied: $10.0<Vmin<20.0$. Therefore, it is favorable for correcting chromatic aberration by arranging the material with lower Abbe number.

When the axial distance between the sixth lens element and the seventh lens element is T67, the axial distance between the seventh lens element and the eighth lens element is T78, and a central thickness of the seventh lens element is CT7, the following condition is satisfied: $1.5<(T67+T78)/CT7$. Therefore, it is favorable for enhancing the image quality and enlarging the area of the image surface by configuring the distribution of the lens elements on the image side of the photographing optical lens assembly. Moreover, the following condition can be satisfied: $1.7<(T67+T78)/CT7<2.8$.

When the focal length of the photographing optical lens assembly is f, and a maximum image height of the photographing optical lens assembly is ImgH, the following condition is satisfied: $0.75<f/ImgH<1.1$. Therefore, it is favorable for balancing among the volume, the field of view and the size of the image surface.

When a focal length of the seventh lens element is f7, and a focal length of the eighth lens element is f8, the following condition is satisfied: $1.2<|f7/f8|<3.5$. Therefore, it is favorable for correcting aberrations by cooperating the refractive power of the seventh lens element and the eighth lens element. Moreover, the following condition can be satisfied: $1.4<|f7/f8|<2.3$.

When each of the object-side surface and the image-side surface of the seventh lens element can include at least one critical point in the off-axis region thereof, a distance between the critical point of the object-side surface of the seventh lens element and an optical axis is Yc71, and a distance between the critical point of the image-side surface of the seventh lens element and the optical axis is Yc72, at least one critical point of the object-side surface and at least one critical point of the image-side surface of the seventh lens element in the off-axis region thereof satisfy the following condition: $0.80<Yc72/Yc71<1.3$. Therefore, it is favorable for correcting aberrations in the off-axis region by adjusting the surface shape of the seventh lens element.

When an Abbe number of the fifth lens element is V5, the following condition is satisfied: $15.0<V5<45.0$. Therefore, it is favorable for correcting chromatic aberration by adjusting the material of the fifth lens element.

When an Abbe number of the sixth lens element is V6, the following condition is satisfied: $35.0<V6<60.0$. Therefore, it is favorable for correcting aberrations in cooperation with the fifth lens element by adjusting the material of the sixth lens element.

When a central thickness of the first lens element is CT1, and a central thickness of the third lens element is CT3, the following condition is satisfied: $0.65<CT1/CT3<1.4$. Therefore, it is favorable for compressing the volume of the object side of the photographing optical lens assembly by cooperating the first lens element and the third lens element. Moreover, the following condition can be satisfied: $0.75<CT1/CT3<1.2$.

When the axial distance between the first lens element and the second lens element is T12, the axial distance between the second lens element and the third lens element is T23, the axial distance between the third lens element and the fourth lens element is T34, an axial distance between the fourth lens element and the fifth lens element is T45, an axial distance between the fifth lens element and the sixth lens element is T56, the axial distance between the sixth lens element and the seventh lens element is T67, and the axial distance between the seventh lens element and the eighth lens element is T78, the following condition is satisfied: $8.0<(T12+T34+T45+T67+T78)/(T23+T56)<30$. Therefore, it is favorable for compressing the total track length and enlarging the area of the image surface by configuring the distribution of the lens elements of the photographing optical lens assembly. Moreover, the following condition can be satisfied: $10<(T12+T34+T45+T67+T78)/(T23+T56)<24$.

When an axial distance between the object-side surface of the first lens element and the image surface is TL, and the maximum image height of the photographing optical lens assembly is ImgH, the following condition is satisfied: $0.70<TL/ImgH<1.40$. Therefore, it is favorable for balancing between compressing the total track length and enlarging the area of the image surface. Moreover, the following condition can be satisfied: $0.80<TL/ImgH<1.20$.

When a focal length of the first lens element is f1, and a focal length of the third lens element is f3, the following condition is satisfied: $0.40<f1/f3<1.5$. Therefore, it is favorable for avoiding excessive aberrations as compressing the volume of the photographing optical lens assembly by cooperating the refractive power of the first lens element and the third lens element. Moreover, the following condition can be satisfied: $0.55<f1/f3<1.2$.

When each of the object-side surface and the image-side surface of the sixth lens element can include at least one critical point in the off-axis region thereof, a distance between the critical point of the object-side surface of the sixth lens element and the optical axis is Yc61, and a distance between the critical point of the image-side surface of the sixth lens element and the optical axis is Yc62, at least one critical point of the object-side surface and at least one critical point of the image-side surface of the sixth lens element in the off-axis region thereof satisfy the following condition: $0.80<Yc62/Yc61<1.3$. Therefore, it is favorable for enhancing the image quality in the off-axis region of the image surface by adjusting the surface shape of the sixth lens element.

When half of a maximum field of view of the photographing optical lens assembly is HFOV, the following condition is satisfied: 30.0 degrees<HFOV<65.0 degrees. Therefore, it is favorable for configuring wide field of view of the photographing optical lens assembly and avoiding distortion from the large field of view. Moreover, the following condition can be satisfied: 35.0 degrees<HFOV<55.0 degrees.

When a maximum distance between an optically effective area of the image-side surface of the eighth lens element and the optical axis is Y82, and a maximum distance between an optically effective area of the object-side surface of the first lens element and the optical axis is Y11, the following condition is satisfied: 2.0<Y82/Y11<5.0. Therefore, it is favorable for balancing among the field of view, the volume and the size of the image surface by adjusting the ratio of outer diameter of the photographing optical lens assembly.

When an Abbe number of the first lens element is V1, an Abbe number of the second lens element is V2, an Abbe number of the third lens element is V3, an Abbe number of the fourth lens element is V4, the Abbe number of the fifth lens element is V5, the Abbe number of the sixth lens element is V6, an Abbe number of the seventh lens element is V7, an Abbe number of the eighth lens element is V8, an Abbe number of i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of i-th lens element is Ni, and a minimum of Vi/Ni is (Vi/Ni)min, the following condition is satisfied: 8.0<(Vi/Ni)min<12.0, wherein i=1–8. Therefore, it is favorable for compressing the volume and correct aberrations by arranging the distribution of materials of the photographing optical lens assembly.

When a sum of central thicknesses of all the lens elements of the photographing optical lens assembly is ΣCT, and a sum of all axial distances between adjacent lens elements of the photographing optical lens assembly is ΣAT, the following condition is satisfied: 1.0<ΣCT/ΣAT<2.0. Therefore, it is favorable for compressing the total track length by configuring the distribution of the lens elements of the photographing optical lens assembly.

When an f-number of the photographing optical lens assembly is Fno, the following condition is satisfied: 1.0<Fno<2.4. Therefore, it is favorable for balancing between the illuminance and the depth of field. Moreover, the following condition can be satisfied: 1.4<Fno<2.2.

When a maximum among central thicknesses of all the lens elements of the photographing optical lens assembly is CTmax, and a minimum among central thicknesses of all the lens elements of the photographing optical lens assembly is CTmin, the following condition is satisfied: 1.2<CTmax/CTmin<2.5. Therefore, it is favorable for adjusting the mass center of the photographing optical lens assembly to facilitate assembling by configuring the lens elements more regularly.

When the axial distance between the object-side surface of the first lens element and the image-side surface of the eighth lens element is TD, and the axial distance between the fourth lens element and the fifth lens element is T45, the following condition is satisfied: 2.0<TD/T45<30. Therefore, it is favorable for compressing the volume of the object side of the photographing optical lens assembly and enlarging the area of the image surface by configuring the distribution of the lens elements of the photographing optical lens assembly. Moreover, the following condition can be satisfied: 6.0<TD/T45<25. Furthermore, the following condition can be satisfied: 10<TD/T45<20.

When the axial distance between the object-side surface of the first lens element and the image surface is TL, the following condition is satisfied: 3.0 mm<TL<14.0 mm. Therefore, it is favorable for various applications by adjusting the total track length of the photographing optical lens assembly. Moreover, the following condition can be satisfied: 4.0 mm<TL<10.0 mm.

When the axial distance between the object-side surface of the first lens element and the image surface is TL, the focal length of the photographing optical lens assembly is f, the following condition is satisfied: 1.1<TL/f<1.4. Therefore, it Is favorable for balancing between the field of view and the total track length.

When the focal length of the photographing optical lens assembly is f, the focal length of the first lens element is f1, a focal length of the second lens element is f2, the focal length of the third lens element is f3, a focal length of the fourth lens element is f4, a focal length of the fifth lens element is f5, a focal length of the sixth lens element is f6, the focal length of the seventh lens element is f7, and the focal length of the eighth lens element is f8, at least one of the following conditions can be satisfied: 0.40<f/f1<1.0; −0.40<f/f2<0.40; 0.20<f/f3<1.2; −0.70<f/f4<1.0; −0.80<f/f5<0.70; −0.40<f/f6<0.50; 0.50<f/f7<1.0 and −1.8<f/f8<−1.0. Therefore, it is favorable for reducing aberrations and sensitivity and configuring wide field of view by adjusting the refractive power of the lens elements. Moreover, at least one of the following conditions can be satisfied: 0.30<f/f3<1.0; −0.40<f/f4<0.50; and −0.60<f/f5<0.35.

When the maximum image height of the photographing optical lens assembly is ImgH, and an axial distance between the image-side surface of the eighth lens element and the image surface is BL, the following condition is satisfied: 5.5<ImgH/BL<12. Therefore, it is favorable for obtaining a suitable back focal length and a suitable size of the image surface, and adjusting the incident angle of the light on the image surface to enhance the response efficiency of an image sensor.

When the focal length of the third lens element is f3, and the focal length of the seventh lens element is f7, the following condition is satisfied: 0.50<f3/f7<5.0. Therefore, it is favorable for compressing the volume of the photographing optical lens assembly by adjusting the refractive power distribution of the photographing optical lens assembly. Moreover, the following condition can be satisfied: 0.75<f3/f7<2.4.

When the image-side surface of the eighth lens element can include at least one critical point in the off-axis region thereof, a distance between the critical point of the image-side surface of the eighth lens element and the optical axis is Yc82, and the maximum distance between the optically effective area of the image-side surface of the eighth lens element and the optical axis is Y82, at least one critical point of the image-side surface of the eighth lens element in the off-axis region thereof satisfies the following condition: 0.25<Yc82/Y82<0.65. Therefore, it is favorable for enhancing the image quality by adjusting the surface shape of the eighth lens element.

Each of the aforementioned features of the photographing optical lens assembly can be utilized in various combinations for achieving the corresponding effects.

According to the photographing optical lens assembly of the present disclosure, the lens elements thereof can be made of glass or plastic materials. When the lens elements are made of glass materials, the distribution of the refractive power of the photographing optical lens assembly may be more flexible to design. The glass lens element can either be made by grinding or molding. When the lens elements are made of plastic materials, manufacturing costs can be effectively reduced. Furthermore, surfaces of each lens element can be arranged to be spherical or aspheric (ASP), wherein it is easier to fabricate the spherical surface. If the surfaces are arranged to be aspheric, more controllable variables can be obtained for eliminating aberrations thereof, and to further decrease the required amount of lens elements in the photographing optical lens assembly. Therefore, the total track length of the photographing optical lens assembly can also be reduced. The aspheric surfaces may be formed by plastic injection molding or glass molding.

According to the photographing optical lens assembly of the present disclosure, one or more of the lens material may optionally include an additive which alters the lens transmittance in a specific range of wavelength for reducing unwanted stray light or color deviation. For example, the additive may optionally filter out light in the wavelength range of 600 nm-800 nm for reducing excessive red light and/or near infra-red light, or may optionally filter out light in the wavelength range of 350 nm-450 nm to reduce excessive blue light and/or near ultra-violet light from interfering the final image. The additive may be homogenously mixed with a plastic material to be used in manufacturing a mixed-material lens element by injection molding.

According to the photographing optical lens assembly of the present disclosure, when a surface of a lens element is aspheric, it indicates that the surface has an aspheric shape throughout its optically effective area or a portion(s) thereof.

According to the photographing optical lens assembly of the present disclosure, when the lens element has a convex surface, it indicates that the surface can be convex in the paraxial region thereof; when the lens element has a concave surface, it indicates that the surface can be concave in the paraxial region thereof. According to the photographing optical lens assembly of the present disclosure, the refractive power or the focal length of a lens element being positive or negative may refer to the refractive power or the focal length in a paraxial region of the lens element.

According to the photographing optical lens assembly of the present disclosure, a critical point is a non-axial point of the lens surface where its tangent is perpendicular to the optical axis.

According to the photographing optical lens assembly of the present disclosure, the definition of the inflection point is a point on a lens surface with a curvature changing from positive to negative or from negative to positive.

According to the photographing optical lens assembly of the present disclosure, the image surface of the photographing optical lens assembly, based on the corresponding image sensor, can be flat or curved. In particular, the image surface can be a concave curved surface facing towards the object side. According to the photographing optical lens assembly of the present disclosure, at least one image correcting element (such as a field flattener) can be selectively disposed between the lens element closest to the image side of the photographing optical lens assembly and the image surface on an imaging optical path so as to correct the image (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin piano-concave element having a concave surface towards the object side and is disposed close to the image surface.

Figure 21A:
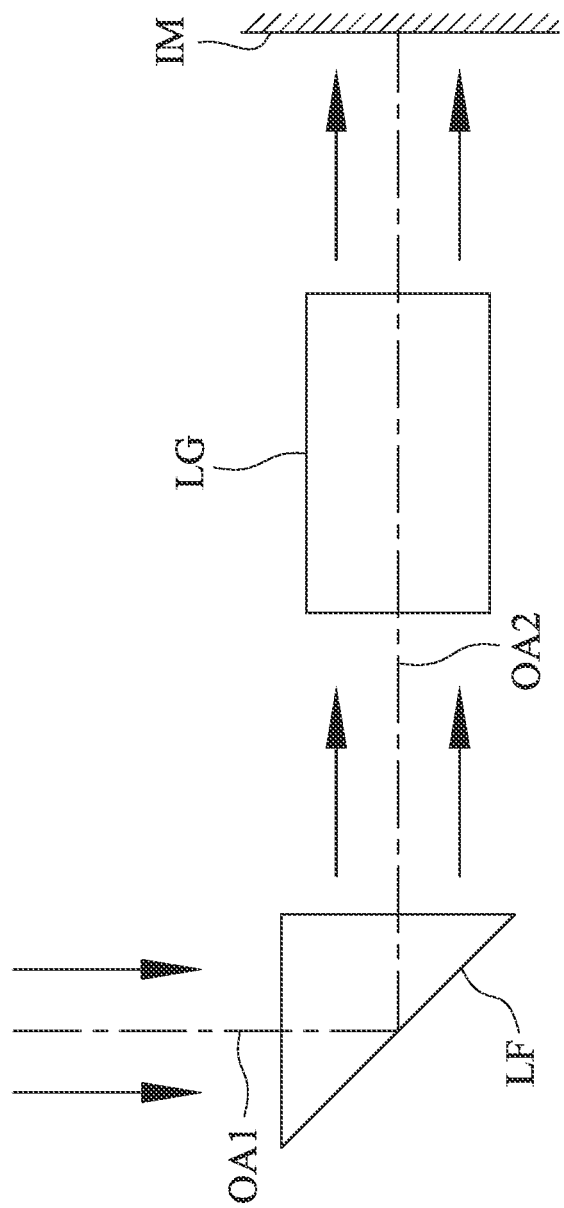
FIG. 21A is a schematic view of an arrangement of a light path folding element in the photographing optical lens assembly of the present disclosure.
Figure 21B:
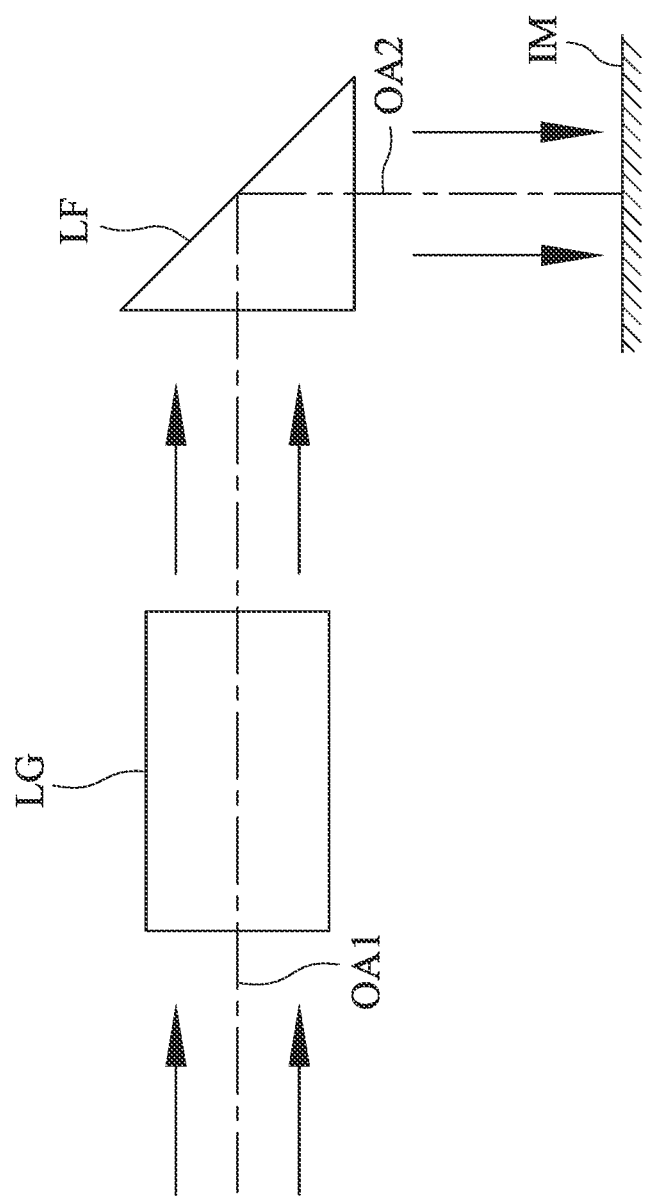
FIG. 21B is a schematic view of another arrangement of the light path folding element in the photographing optical lens assembly of the present disclosure.
Figure 21C:
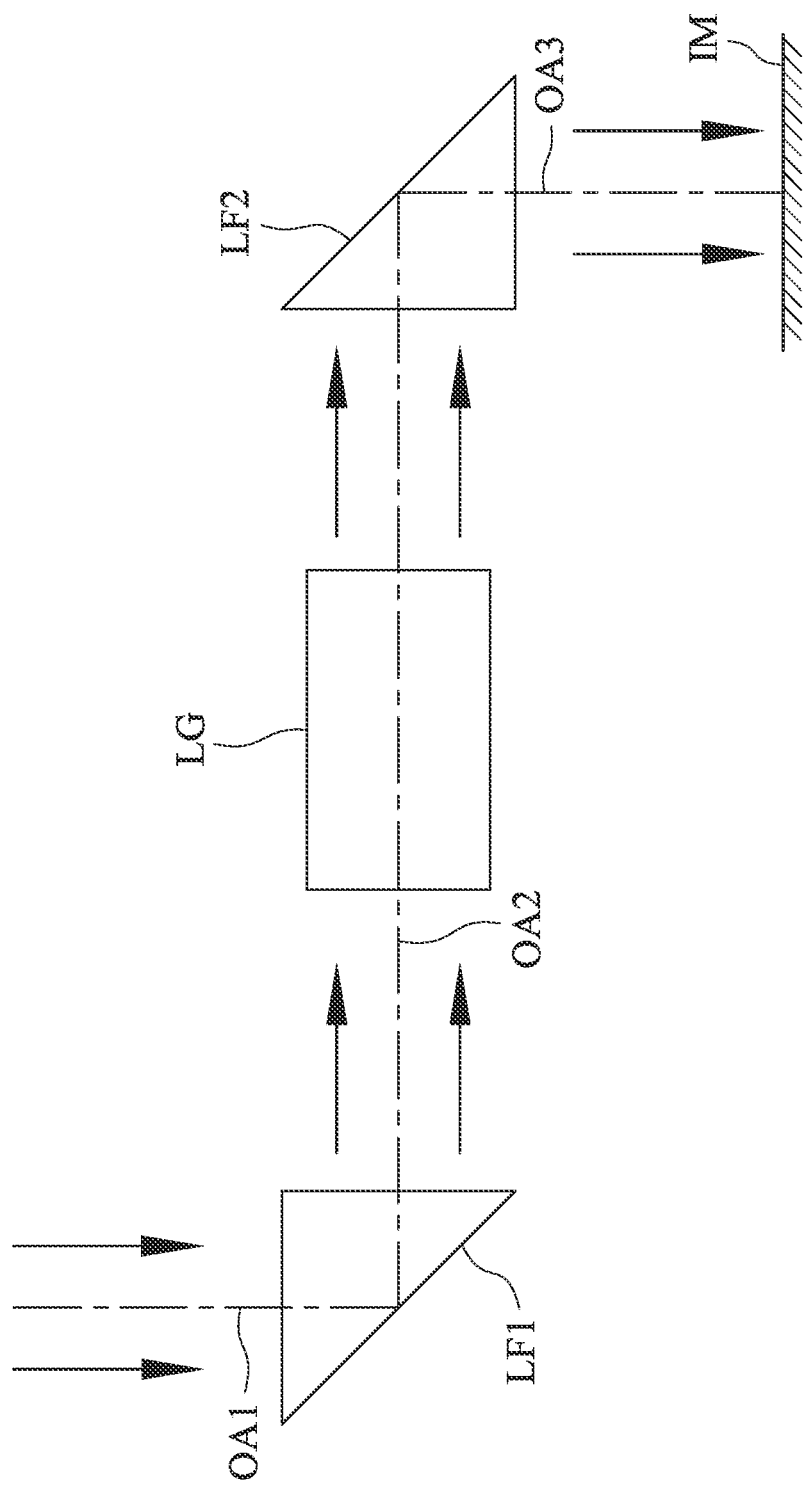
FIG. 21C is a schematic view of an arrangement of two light path folding elements in the photographing optical lens assembly of the present disclosure.

According to the photographing optical lens assembly of the present disclosure, at least one element with light path folding function can be selectively disposed between the imaged object and the image surface, such as a prism or a mirror. Therefore it is favorable for providing high flexible space arrangement of the photographing optical lens assembly, so that the compactness of the electronic device would not be restricted by the optical total track length of the photographing optical lens assembly. FIG. 21A is a schematic view of an arrangement of a light path folding element LF in the photographing optical lens assembly of the present disclosure. FIG. 21B is a schematic view of another arrangement of the light path folding element LF in the photographing optical lens assembly of the present disclosure. As shown in FIGS. 21A and 21B, the photographing optical lens assembly includes, in order from an imaged object (not shown in drawings) to an image surface IM, a first optical axis OA1, the light path folding element LF and a second optical axis OA2, wherein the light path folding element LF can be disposed between the imaged object and a lens group LG of the photographing optical lens assembly as shown in FIG. 21A, or can be disposed between the lens group LG of the photographing optical lens assembly and the image surface IM as shown in FIG. 21B. Moreover, FIG. 21C is a schematic view of an arrangement of two light path folding elements LF1, LF2 in the photographing optical lens assembly of the present disclosure. As shown in FIG. 21C, the photographing optical lens assembly includes, in order from an imaged object (not shown in drawings) to an image surface IM, a first optical axis OA1, the light path folding element LF1, a second optical axis OA2, the light path folding element LF2 and a third optical axis OA3, wherein the light path folding element LF1 is disposed between the imaged object and a lens group LG of the photographing optical lens assembly, and the light path folding element LF2 is disposed between the lens group LG of the photographing optical lens assembly and the image surface IM. The photographing optical lens assembly can also be selectively disposed with three or more light path folding element, the type, amount and location of the light path folding element will not be limited to the present disclosure.

According to the photographing optical lens assembly of the present disclosure, the photographing optical lens assembly can include at least one stop, such as an aperture stop, a glare stop or a field stop. Said glare stop or said field stop is for eliminating the stray light and thereby improving the image resolution thereof.

According to the photographing optical lens assembly of the present disclosure, an aperture stop can be configured as a front stop or a middle stop. A front stop disposed between the object and the first lens element can provide a longer distance between an exit pupil of the photographing optical lens assembly and the image surface, and thereby obtains a telecentric effect and improves the image-sensing efficiency of the image sensor, such as CCD or CMOS. A middle stop disposed between the first lens element and the image surface is favorable for enlarging the field of view of the photographing optical lens assembly and thereby provides a wider field of view for the same.

According to the photographing optical lens assembly of the present disclosure, an aperture adjusting unit can be properly configured. The aperture adjusting unit can be a mechanical part or a light control part, and the dimension and the shape of the aperture adjusting unit can be electrically controlled. The mechanical part can include a moveable component such as a blade group or a shielding plate. The light control part can include a screen component such as a light filter, an electrochromic material, a liquid crystal layer or the like. The amount of incident light or the exposure time of the image can be controlled by the aperture adjusting unit to enhance the image moderation ability. In addition, the aperture adjusting unit can be the aperture stop of the photographing optical lens assembly according to the present disclosure, so as to moderate the image properties such as depth of field or the exposure speed by changing f-number.

According to the photographing optical lens assembly of the present disclosure, the photographing optical lens assembly can be applied to 3D (three-dimensional) image capturing applications, in products such as digital cameras, mobile devices, digital tablets, smart TVs, surveillance systems, motion sensing input devices, driving recording systems, rearview camera systems, wearable devices, and unmanned aerial vehicles.

According to the present disclosure, an imaging apparatus is provided. The imaging apparatus includes the aforementioned photographing optical lens assembly and an image sensor, wherein the image sensor is disposed on the image side of the aforementioned photographing optical lens assembly, that is, the image sensor can be disposed on or near the image surface of the aforementioned photographing optical lens assembly. It is favorable for obtaining large image surface and reducing the total track length of the photographing optical lens assembly by properly arranging the first lens element having positive refractive power and arranging the critical point on the surface of at least one lens element. Preferably, the imaging apparatus can further include a barrel member, a holder member or a combination thereof.

According to the present disclosure, an electronic device is provided, wherein the electronic device includes the aforementioned imaging apparatus. Therefore, it is favorable for enhancing the image quality. Preferably, the electronic device can further include, but not limited to, a control unit, a display, a storage unit, a random access memory unit (RAM) or a combination thereof.

According to the above description of the present disclosure, the following specific embodiments are provided for further explanation.

1st Embodiment

Figure 2:
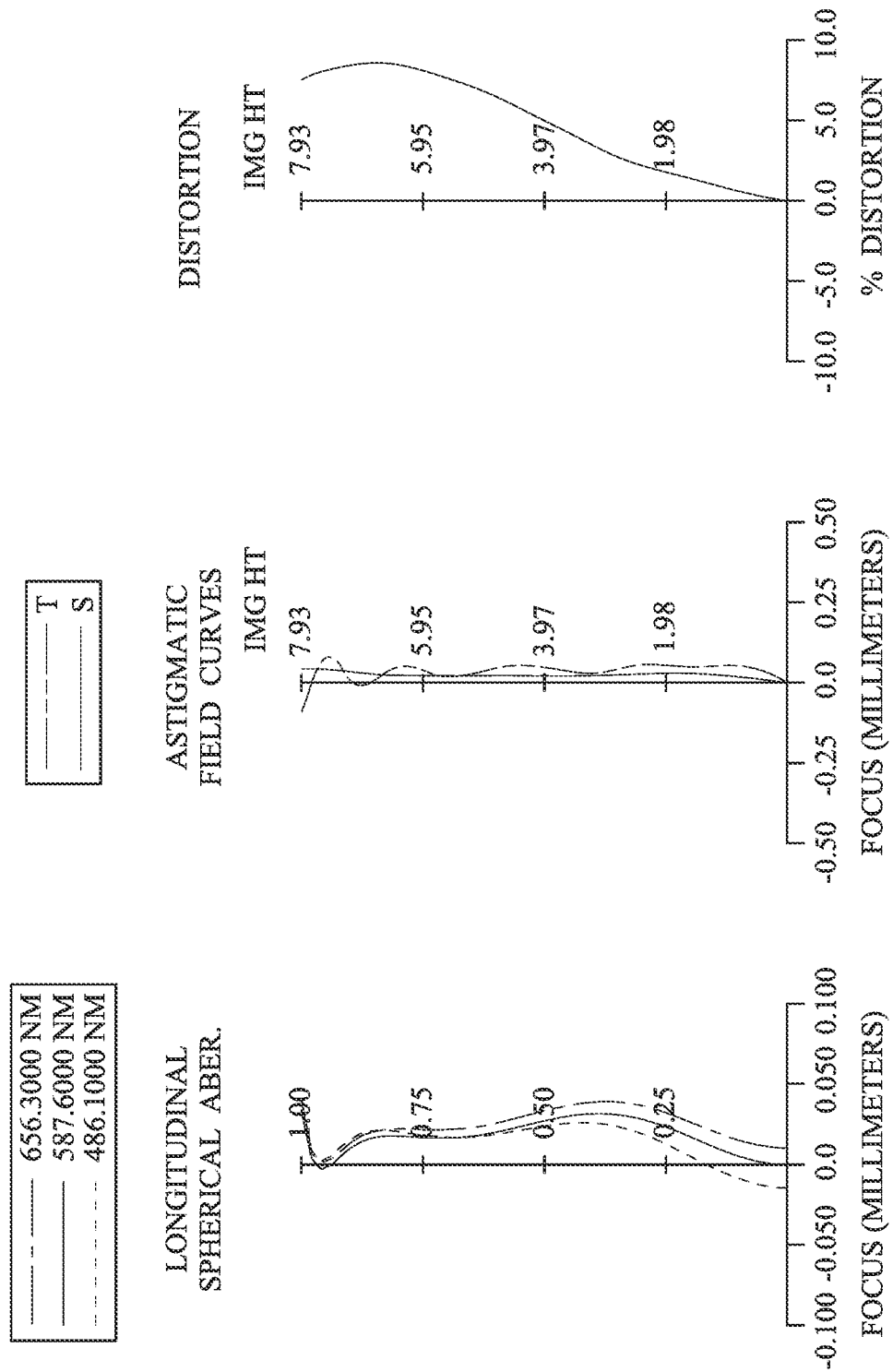
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows, in order from left to right, spherical aberration curves, astigmatic field curves and a distortion curve of the imaging apparatus of the 1st embodiment. In FIG. 1, the imaging apparatus according to the 1st embodiment includes a photographing optical lens assembly (its reference number is omitted) and an image sensor 196. The photographing optical lens assembly includes, in order from an object side to an image side along an optical path, an aperture stop 100, a first lens element 110, a second lens element 120, a stop 101, a third lens element 130, a fourth lens element 140, a fifth lens element 150, a sixth lens element 160, a seventh lens element 170, an eighth lens element 180, a filter 190 and an image sensor 195, wherein the image sensor 196 is disposed on the image surface 195 of the photographing optical lens assembly. The photographing optical lens assembly includes eight lens elements (110, 120, 130, 140, 150, 160, 170, 180) without additional one or more lens elements inserted between the first lens element 110 and the eighth lens element 180.

Figure 17:
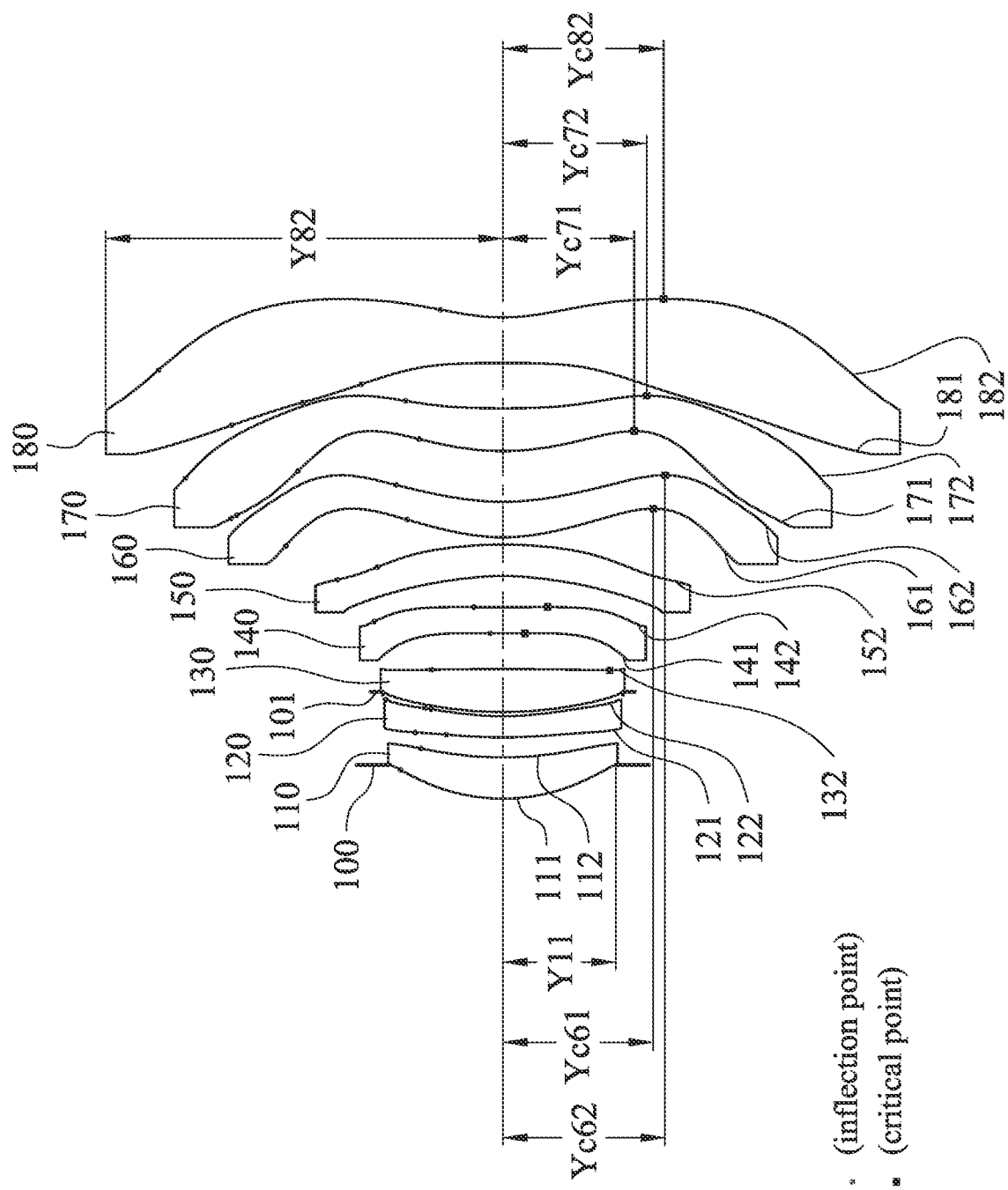
FIG. 17 is a schematic view of partial parameters, inflection points and critical points according to the 1st embodiment.

The first lens element 110 with positive refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric. FIG. 17 is a schematic view of partial parameters, inflection points and critical points according to the 1st embodiment, wherein "•" symbolizes the inflection points, and "■" symbolizes the critical points. In FIG. 17, the object-side surface 111 of the first lens element 110 includes an inflection point in an off-axis region thereof, and the image-side surface 112 of the first lens element 110 includes an inflection point in an off-axis region thereof.

The second lens element 120 with negative refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric. Furthermore, the object-side surface 121 of the second lens element 120 includes two inflection points in an off-axis region thereof, and the image-side surface 122 of the second lens element 120 includes three inflection points in an off-axis region thereof.

The third lens element 130 with positive refractive power has an object-side surface 131 being convex in a paraxial region thereof and an image-side surface 132 being convex in a paraxial region thereof. The third lens element 130 is made of a glass material, and has the object-side surface 131 and the image-side surface 132 being both aspheric. Furthermore, the image-side surface 132 of the third lens element 130 includes an inflection point and a critical point in an off-axis region thereof.

The fourth lens element 140 with negative refractive power has an object-side surface 141 being convex in a paraxial region thereof and an image-side surface 142 being concave in a paraxial region thereof. The fourth lens element 140 is made of a plastic material, and has the object-side surface 141 and the image-side surface 142 being both aspheric. Furthermore, the object-side surface 141 of the fourth lens element 140 includes an inflection point and a critical point in an off-axis region thereof, and the image-side surface 142 of the fourth lens element 140 includes two inflection points and a critical point in an off-axis region thereof.

The fifth lens element 150 with negative refractive power has an object-side surface 151 being concave in a paraxial region thereof and an image-side surface 152 being convex in a paraxial region thereof. The fifth lens element 150 is made of a plastic material, and has the object-side surface 151 and the image-side surface 152 being both aspheric. Furthermore, the image-side surface 152 of the fifth lens element 150 includes two inflection points in an off-axis region thereof.

The sixth lens element 160 with positive refractive power has an object-side surface 161 being convex in a paraxial region thereof and an image-side surface 162 being concave in a paraxial region thereof. The sixth lens element 160 is made of a plastic material, and has the object-side surface 161 and the image-side surface 162 being both aspheric. Furthermore, the object-side surface 161 of the sixth lens element 160 includes two inflection points and a critical point in an off-axis region thereof, and the image-side surface 162 of the sixth lens element 160 includes an inflection point and a critical point in an off-axis region thereof.

The seventh lens element 170 with positive refractive power has an object-side surface 171 being convex in a paraxial region thereof and an image-side surface 172 being concave in a paraxial region thereof. The seventh lens element 170 is made of a plastic material, and has the object-side surface 171 and the image-side surface 172 being both aspheric. Furthermore, the object-side surface 171 of the seventh lens element 170 includes four inflection points and a critical point in an off-axis region thereof, and the image-side surface 172 of the seventh lens element 170 includes two inflection points and a critical point in an off-axis region thereof.

The eighth lens element 180 with negative refractive power has an object-side surface 181 being concave in a paraxial region thereof and an image-side surface 182 being concave in a paraxial region thereof. The eighth lens element 180 is made of a plastic material, and has the object-side surface 181 and the image-side surface 182 being both aspheric. Furthermore, the object-side surface 181 of the eighth lens element 180 includes three inflection points in an off-axis region thereof, and the image-side surface 182 of the eighth lens element 180 includes two inflection points and a critical point in an off-axis region thereof.

The filter 190 is made of a glass material and disposed between the eighth lens element 180 and the image surface 195 and will not affect a focal length of the photographing optical lens assembly.

The equation of the aspheric surface profiles of the aforementioned lens elements is expressed as follows:

$$X(Y) = (Y^2/R)/(1 + sqrt(1 - (1+k) \times (Y/R)^2)) + \sum_i (Ai) \times (Y^i);$$

wherein,

X is a displacement in parallel with an optical axis from the intersection point of the aspheric surface and the optical axis to a point at a distance Y from the optical axis on the aspheric surface;

Y is the vertical distance from the point on the aspheric surface to the optical axis;

R is the curvature radius;

k is the conic coefficient; and

Ai is the i-th aspheric coefficient.

In the photographing optical lens assembly according to the 1st embodiment, when a focal length of the photographing optical lens assembly is f, an f-number of the photographing optical lens assembly is Fno, and half of a maximum field of view of the photographing optical lens assembly is HFOV, these parameters have the following values: f=7.03 mm; Fno=2.00; and HFOV=46.2 degrees.

In the photographing optical lens assembly according to the 1st embodiment, when an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, an Abbe number of the sixth lens element 160 is V6, an Abbe number of the seventh lens element 170 is V7, an Abbe number of the eighth lens element 180 is V8, an Abbe number of i-th lens element is Vi, a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the sixth lens element 160 is N6, a refractive index of the seventh lens element 170 is N7, a refractive index of the eighth lens element 180 is N8, a refractive index of i-th lens element is Ni, a minimum of Vi/Ni is (Vi/Ni)min, and a minimum among Abbe numbers of all the lens elements of the photographing optical lens assembly is Vmin, the following conditions are satisfied: V5=26.0; V6=56.0; (Vi/Ni)min=10.98, wherein i=1–8; and Vmin=18.4. In the 1st embodiment, (Vi/Ni)min=V4/N4, and Vmin=V4.

In the photographing optical lens assembly according to the 1st embodiment, when a central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, a central thickness of the sixth lens element 160 is CT6, a central thickness of the seventh lens element 170 is CT7, a central thickness of the eighth lens element 180 is CT8, a sum of central thicknesses of all the lens elements of the photographing optical lens assembly is ΣCT, an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, an axial distance between the sixth lens element 160 and the seventh lens element 170 is T67, an axial distance between the seventh lens element 170 and the eighth lens element 180 is T78, a sum of all axial distances between adjacent lens elements of the photographing optical lens assembly is ΣAT, a maximum among central thicknesses of all the lens elements of the photographing optical lens assembly is CTmax, a minimum among central thicknesses of all the lens elements of the photographing optical lens assembly is CTmin, and an axial distance between the object-side surface 111 of the first lens element 110 and the image-side surface 182 of the eighth lens element 180 is TD, the following conditions are satisfied: ΣCT/ΣAT=1.48; CT1/CT3=0.96; CTmax/CTmin=2.14; (T12+T34)/T23=13.52; (T12+T34+T45+T67+T78)/(T23+T56)=16.08; (T67+T78)/CT7=2.24; (T67−T78)/(T67+T78)=−0.06; TD/T45=15.42; and TD/(T67+T78)=5.02. In the 1st embodiment, the axial distance between adjacent lens elements is the axial distance between two adjacent surfaces of the adjacent lens elements; ΣCT=CT1+CT2+CT3+CT4+CT5+CT6+CT7+CT8; ΣAT=T12+T23+T34+T45+T56+T67+T78; CTmax=CT8; and CTmin=CT2.

In the photographing optical lens assembly according to the 1st embodiment, when an axial distance between the object-side surface 111 of the first lens element 110 and the image surface 195 is TL, the focal length of the photographing optical lens assembly is f, and a maximum image height of the photographing optical lens assembly is ImgH, the following conditions are satisfied: TL=8.81 mm; TL/f=1.25; and TL/ImgH=1.11.

In the photographing optical lens assembly according to the 1st embodiment, when the focal length of the photographing optical lens assembly is f, a curvature radius of the object-side surface 131 of the third lens element 130 is R5, a curvature radius of the image-side surface 132 of the third lens element 130 is R6, a curvature radius of the object-side surface 151 of the fifth lens element 150 is R9, a curvature radius of the object-side surface 181 of the eighth lens element 180 is R15, and a curvature radius of the image-side surface 182 of the eighth lens element 180 is R16, the following conditions are satisfied: R5/R6=−0.11; R9/f=−0.58; and (R15+R16)/(R15−R16)=0.98.

In the photographing optical lens assembly according to the 1st embodiment, when the focal length of the photographing optical lens assembly is f, a focal length of the first lens element 110 is f1, a focal length of the second lens element 120 is f2, a focal length of the third lens element 130 is f3, a focal length of the fourth lens element 140 is f4, a focal length of the fifth lens element 150 is f5, a focal length of the sixth lens element 160 is f6, a focal length of the seventh lens element 170 is f7, a focal length of the eighth lens element 180 is f8, the maximum image height of the photographing optical lens assembly is ImgH, and an axial distance between the image-side surface 182 of the eighth lens element 180 and an image surface 195 is BL, the following conditions are satisfied: f/f1=0.63; f/f2=−0.32; f/f3=0.63; f/f4=−0.02; f/f5=−0.38; f/f6=0.34; f/f7=0.74; f/f8=−1.24; f/ImgH=0.89; f1/f3=1.01; f3/f7=1.17; |f7/f8|=1.67 and ImgH/BL=6.39.

In FIG. 17, when a distance between the critical point of the object-side surface 161 of the sixth lens element 160 and the optical axis is Yc61, a distance between the critical point of the image-side surface 162 of the sixth lens element 160 and the optical axis is Yc62, a distance between the critical point of the object-side surface 171 of the seventh lens element 170 and the optical axis is Yc71, a distance between the critical point of the image-side surface 172 of the seventh lens element 170 and the optical axis is Yc72, a distance between the critical point of the image-side surface 182 of the eighth lens element 180 and the optical axis is Yc82, a maximum distance between an optically effective area of the object-side surface 111 of the first lens element 110 and the optical axis is Y11, and a maximum distance between an optically effective area of the image-side surface 182 of the eighth lens element 180 and the optical axis is Y82, the following conditions are satisfied: Y82/Y11=3.52; Yc62/Yc61=1.08; Yc72/Yc7=1.09; and Yc82/Y82=0.40.

The detailed optical data of the 1st embodiment are shown in Table 1 and the aspheric surface data are shown in Table 2 below.

TABLE 1

1st Embodiment
f = 7.03 mm, Fno = 2.00, HFOV = 46.2 deg.

| Surface # | | Curvature Radius | | Thickness | Material | Index | Abbe # | Focal Length |
|---|---|---|---|---|---|---|---|---|
| 0 | Object | Plano | | 2000.000 | | | | |
| 1 | Ape. Stop | Plano | | −0.532 | | | | |
| 2 | Lens 1 | 3.006 | ASP | 0.648 | Plastic | 1.545 | 56.1 | 11.17 |
| 3 | | 5.489 | ASP | 0.315 | | | | |
| 4 | Lens 2 | 7.110 | ASP | 0.335 | Plastic | 1.660 | 20.4 | −22.30 |
| 5 | | 4.704 | ASP | 0.384 | | | | |
| 6 | Stop | Plano | | −0.319 | | | | |
| 7 | Lens 3 | 6.425 | ASP | 0.676 | Glass | 1.522 | 62.2 | 11.09 |
| 8 | | −56.797 | ASP | 0.564 | | | | |
| 9 | Lens 4 | 130.894 | ASP | 0.411 | Plastic | 1.679 | 18.4 | −354.49 |
| 10 | | 84.688 | ASP | 0.491 | | | | |
| 11 | Lens 5 | −4.111 | ASP | 0.494 | Plastic | 1.614 | 26.0 | −18.49 |
| 12 | | −6.741 | ASP | 0.114 | | | | |
| 13 | Lens 6 | 3.040 | ASP | 0.559 | Plastic | 1.544 | 56.0 | 20.95 |
| 14 | | 3.876 | ASP | 0.798 | | | | |
| 15 | Lens 7 | 4.294 | ASP | 0.674 | Plastic | 1.544 | 56.0 | 9.48 |
| 16 | | 24.175 | ASP | 0.711 | | | | |
| 17 | Lens 8 | −250.000 | ASP | 0.718 | Plastic | 1.534 | 55.9 | −5.69 |
| 18 | | 3.078 | ASP | 0.800 | | | | |
| 19 | Filter | Plano | | 0.110 | Glass | 1.517 | 64.2 | — |
| 20 | | Plano | | 0.331 | | | | |
| 21 | Image | Plano | | — | | | | |

Reference wavelength is 587.6 nm (d-line).
Effective radius of Surface 6 (Stop 101) is 1.890 mm.

TABLE 2

Aspheric Coefficients

| Surface # | 2 | 3 | 4 | 5 | 7 | 8 |
|---|---|---|---|---|---|---|
| k = | 5.1753E−01 | −3.4822E+00 | −8.8242E−02 | −1.0643E+01 | 1.5913E−01 | 4.3048E+01 |
| A4 = | −1.9587E−03 | 9.8797E−04 | −1.7042E−02 | −1.0811E−03 | 6.2476E−03 | 1.2973E−03 |
| A6 = | −7.9930E−04 | −1.5801E−03 | −2.8420E−03 | −6.4652E−03 | −1.6990E−03 | −2.7486E−03 |
| A8 = | −5.7057E−05 | 8.5649E−04 | 4.4915E−03 | −5.7158E−04 | −6.6797E−03 | 3.8992E−03 |
| A10 = | 1.7597E−05 | −4.7925E−04 | −1.8390E−03 | 3.8768E−03 | 6.9373E−03 | −2.8076E−03 |
| A12 = | −3.7719E−05 | 1.8335E−05 | 2.2991E−04 | −2.3561E−03 | −3.0878E−03 | 1.1930E−03 |
| A14 = | | 1.0640E−05 | 5.5603E−05 | 6.3870E−04 | 6.7690E−04 | −2.8092E−04 |
| A16 = | | | −1.1385E−05 | −6.4619E−05 | −5.7471E−05 | 2.7998E−05 |

TABLE 2-continued

Aspheric Coefficients

| Surface # | 9 | 10 | 11 | 12 | 13 | 14 |
|---|---|---|---|---|---|---|
| k = | −9.9000E+01 | −9.9000E+01 | 1.5510E−01 | −8.1276E−01 | −1.2377E+01 | −4.6728E+00 |
| A4 = | −1.5364E−02 | 9.3674E−04 | 5.0690E−02 | 1.4244E−02 | 9.4115E−03 | −2.3377E−02 |
| A6 = | −3.9914E−03 | −1.4168E−02 | −4.0851E−02 | −1.8841E−02 | −2.1847E−03 | 1.3568E−02 |
| A8 = | −2.0733E−04 | 1.0175E−02 | 2.4104E−02 | 8.5664E−03 | 2.7347E−04 | −4.2054E−03 |
| A10 = | −1.7291E−04 | −5.7557E−03 | −9.3661E−03 | −2.3905E−03 | −1.3536E−04 | 7.2938E−04 |
| A12 = | 2.5362E−04 | 2.0269E−03 | 2.3032E−03 | 4.3275E−04 | 3.3191E−05 | −7.8688E−05 |
| A14 = | −8.7525E−05 | −4.1845E−04 | −3.4410E−04 | −4.6700E−05 | −4.1003E−06 | 5.3471E−06 |
| A16 = | 9.7613E−06 | 4.6394E−05 | 2.8656E−05 | 2.6629E−06 | 2.7285E−07 | −2.2043E−07 |
| A18 = |  | −2.0806E−06 | −1.0293E−06 | −6.1180E−08 | −9.2741E−09 | 5.0002E−09 |
| A20 = |  |  |  |  | 1.2576E−10 | −4.7646E−11 |

| Surface # | 15 | 16 | 17 | 18 |
|---|---|---|---|---|
| k = | −1.0088E+00 | 9.5988E+00 | −9.9000E+01 | −6.6218E+00 |
| A4 = | 2.8495E−03 | 2.6648E−02 | −3.2521E−02 | −2.1202E−02 |
| A6 = | −5.2422E−03 | −7.8713E−03 | 5.9251E−03 | 3.4197E−03 |
| A8 = | 9.5495E−04 | 8.5806E−04 | −5.0453E−04 | −3.3913E−04 |
| A10 = | −1.6187E−04 | −4.6016E−05 | 2.0536E−05 | 2.1384E−05 |
| A12 = | 1.9364E−05 | 9.6154E−07 | −1.5330E−07 | −8.8415E−07 |
| A14 = | −1.3427E−06 | 2.0654E−08 | −2.0859E−08 | 2.3723E−08 |
| A16 = | 5.2037E−08 | −1.6262E−09 | 8.9381E−10 | −3.9505E−10 |
| A18 = | −1.0533E−09 | 3.3835E−11 | −1.5168E−11 | 3.6991E−12 |
| A20 = | 8.6926E−12 | −2.4029E−13 | 9.7717E−14 | −1.4898E−14 |

Table 1 shows the detailed optical data of FIG. 1 of the 1st embodiment, wherein the curvature radius, thickness and the focal length are shown in millimeters (mm), and Surface numbers 0-21 represent the surfaces sequentially arranged from the object side to the image side. Table 2 shows the aspheric surface data of the 1st embodiment, wherein k represents the conic coefficient of the equation of the aspheric surface profiles, and A4-A20 represent the aspheric coefficients of each surface ranging from the 4th order to the 20th order. The tables presented below for each embodiment correspond to the schematic view and aberration curves of each embodiment, and term definitions of the tables are the same as those in Table 1 and Table 2 of the 1st embodiment. Therefore, an explanation in this regard will not be provided again.

2nd Embodiment

Figure 3:
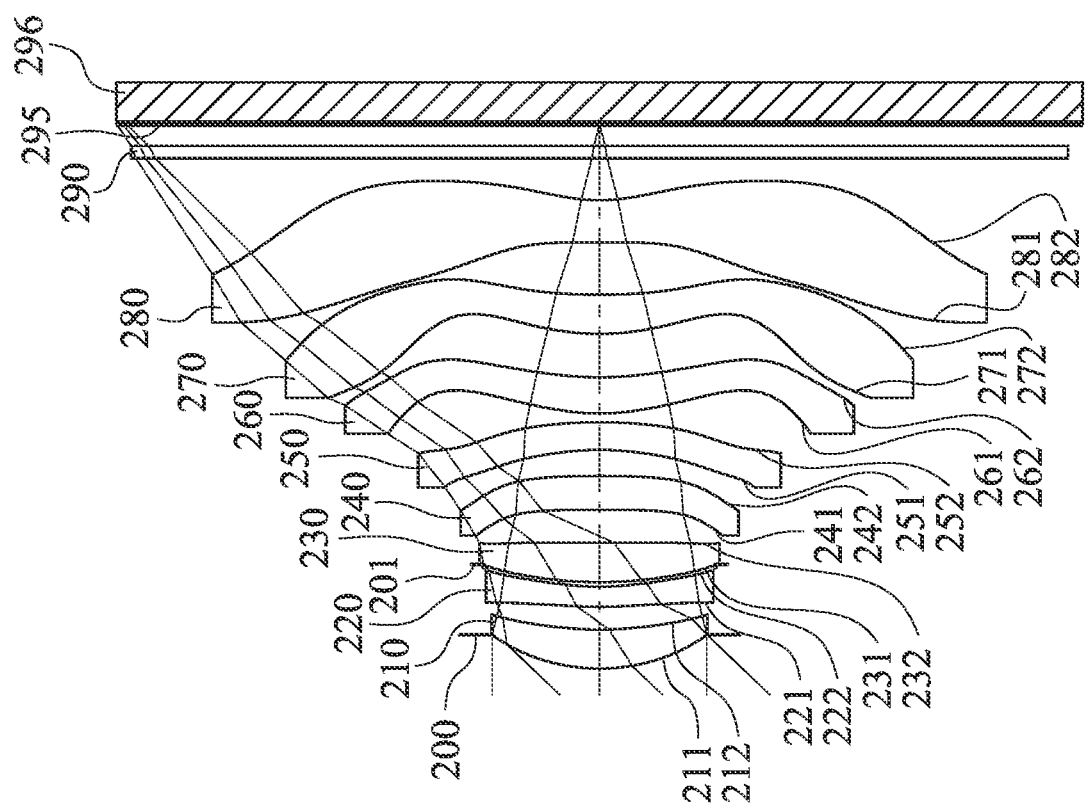
FIG. 3 is a schematic view of an imaging apparatus according to the 2nd embodiment of the present disclosure.
Figure 4:
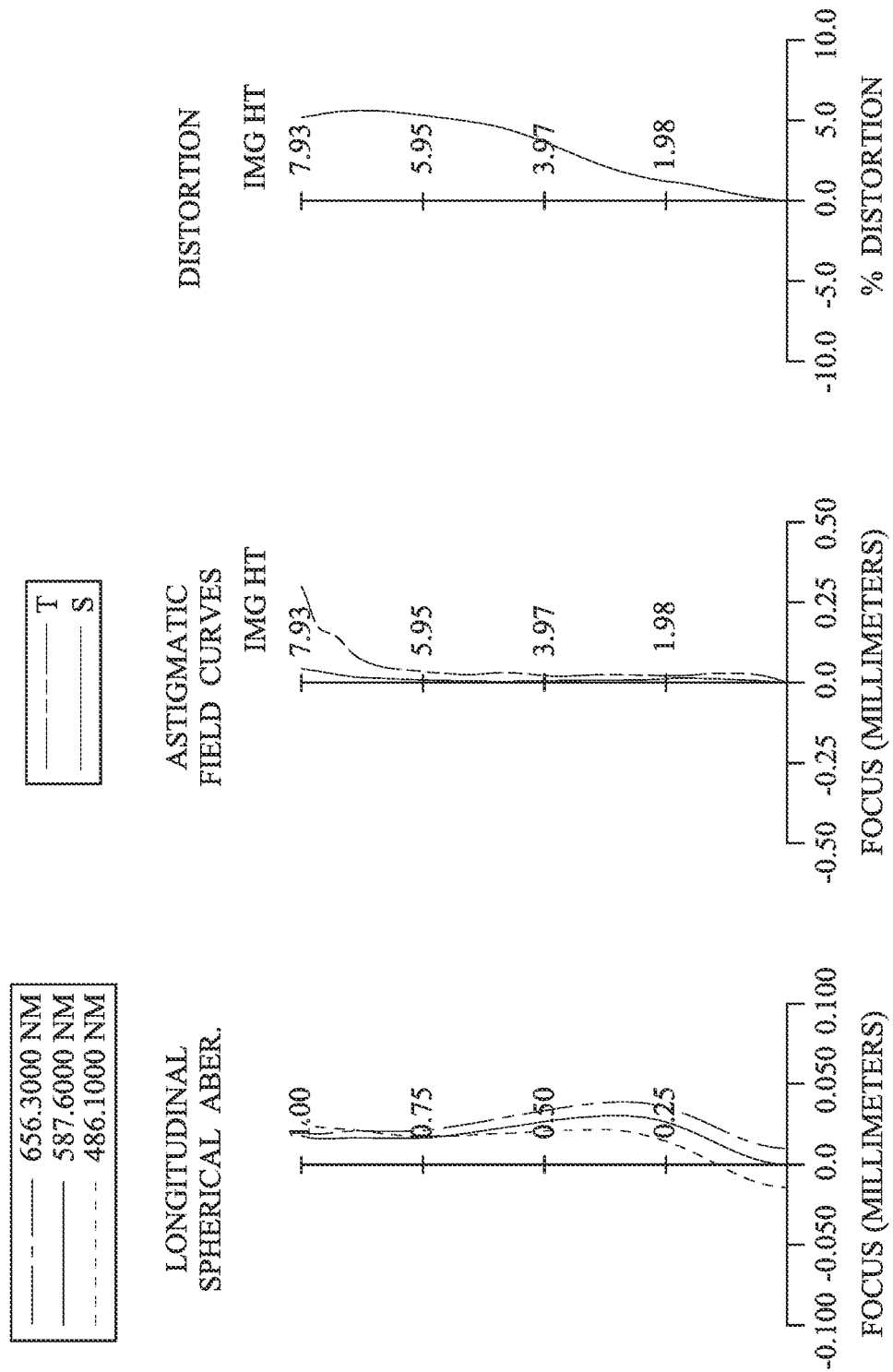
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows, in order from left to right, spherical aberration curves, astigmatic field curves and a distortion curve of the imaging apparatus of the 2nd embodiment. In FIG. 3, the imaging apparatus according to the 2nd embodiment includes a photographing optical lens assembly (its reference number is omitted) and an image sensor 296. The photographing optical lens assembly includes, in order from an object side to an image side along an optical path, an aperture stop 200, a first lens element 210, a second lens element 220, a stop 201, a third lens element 230, a fourth lens element 240, a fifth lens element 250, a sixth lens element 260, a seventh lens element 270, an eighth lens element 280, a filter 290 and an image surface 295, wherein the image sensor 296 is disposed on the image surface 295 of the photographing optical lens assembly. The photographing optical lens assembly includes eight lens elements (210, 220, 230, 240, 250, 260, 270, 280) without additional one or more lens elements inserted between the first lens element 210 and the eighth lens element 280.

The first lens element 210 with positive refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric. Furthermore, the object-side surface 221 of the second lens element 220 includes three inflection points in an off-axis region thereof, and the image-side surface 222 of the second lens element 220 includes an inflection point in an off-axis region thereof.

The third lens element 230 with positive refractive power has an object-side surface 231 being convex in a paraxial region thereof and an image-side surface 232 being concave in a paraxial region thereof. The third lens element 230 is made of a plastic material, and has the object-side surface 231 and the image-side surface 232 being both aspheric. Furthermore, the image-side surface 232 of the third lens element 230 includes two inflection points and two critical points in an off-axis region thereof.

The fourth lens element 240 with positive refractive power has an object-side surface 241 being concave in a paraxial region thereof and an image-side surface 242 being convex in a paraxial region thereof. The fourth lens element 240 is made of a plastic material, and has the object-side surface 241 and the image-side surface 242 being both aspheric. Furthermore, the object-side surface 241 of the fourth lens element 240 includes an inflection point in an off-axis region thereof, and the image-side surface 242 of the fourth lens element 240 includes an inflection point in an off-axis region thereof.

The fifth lens element 250 with negative refractive power has an object-side surface 251 being concave in a paraxial region thereof and an image-side surface 252 being convex in a paraxial region thereof. The fifth lens element 250 is made of a plastic material, and has the object-side surface 251 and the image-side surface 252 being both aspheric.

Furthermore, the object-side surface 251 of the fifth lens element 250 includes two inflection points in an off-axis region thereof, and the image-side surface 252 of the fifth lens element 250 includes two inflection points in an off-axis region thereof.

The sixth lens element 260 with positive refractive power has an object-side surface 261 being convex in a paraxial region thereof and an image-side surface 262 being concave in a paraxial region thereof. The sixth lens element 260 is made of a plastic material, and has the object-side surface 261 and the image-side surface 262 being both aspheric. Furthermore, the object-side surface 261 of the sixth lens element 260 includes an inflection point and a critical point in an off-axis region thereof, and the image-side surface 262 of the sixth lens element 260 includes three inflection points and a critical point in an off-axis region thereof.

The seventh lens element 270 with positive refractive power has an object-side surface 271 being convex in a paraxial region thereof and an image-side surface 272 being concave in a paraxial region thereof. The seventh lens element 270 is made of a plastic material, and has the object-side surface 271 and the image-side surface 272 being both aspheric. Furthermore, the object-side surface 271 of the seventh lens element 270 includes two inflection points and a critical point in an off-axis region thereof, and the image-side surface 272 of the seventh lens element 270 includes two inflection points and a critical point in an off-axis region thereof.

The eighth lens element 280 with negative refractive power has an object-side surface 281 being convex in a paraxial region thereof and an image-side surface 282 being concave in a paraxial region thereof. The eighth lens element 280 is made of a plastic material, and has the object-side surface 281 and the image-side surface 282 being both aspheric. Furthermore, the object-side surface 281 of the eighth lens element 280 includes four inflection points and a critical point in an off-axis region thereof, and the image-side surface 282 of the eighth lens element 280 includes two inflection points and a critical point in an off-axis region thereof.

The filter 290 is made of a glass material and disposed between the eighth lens element 280 and the image surface 295 and will not affect a focal length of the photographing optical lens assembly.

The detailed optical data of the 2nd embodiment are shown in Table 3 and the aspheric surface data are shown in Table 4 below.

TABLE 3

2nd Embodiment
f = 7.10 mm, Fno = 2.00, HFOV = 46.5 deg.

| Surface # | | Curvature Radius | | Thickness | Material | Index | Abbe # | Focal Length |
|---|---|---|---|---|---|---|---|---|
| 0 | Object | Plano | | 2000.000 | | | | |
| 1 | Ape. Stop | Plano | | −0.562 | | | | |
| 2 | Lens 1 | 3.216 | ASP | 0.650 | Plastic | 1.545 | 56.1 | 11.14 |
| 3 | | 6.351 | ASP | 0.378 | | | | |
| 4 | Lens 2 | 7.653 | ASP | 0.335 | Plastic | 1.669 | 19.5 | −19.03 |
| 5 | | 4.696 | ASP | 0.372 | | | | |
| 6 | Stop | Plano | | −0.298 | | | | |
| 7 | Lens 3 | 6.854 | ASP | 0.659 | Plastic | 1.544 | 56.0 | 13.11 |
| 8 | | 169.290 | ASP | 0.545 | | | | |
| 9 | Lens 4 | −142.893 | ASP | 0.567 | Plastic | 1.544 | 56.0 | 35.47 |
| 10 | | −17.026 | ASP | 0.433 | | | | |
| 11 | Lens 5 | −4.241 | ASP | 0.461 | Plastic | 1.587 | 28.3 | −20.27 |
| 12 | | −6.854 | ASP | 0.144 | | | | |
| 13 | Lens 6 | 3.891 | ASP | 0.600 | Plastic | 1.544 | 56.0 | 24.23 |
| 14 | | 5.219 | ASP | 0.724 | | | | |
| 15 | Lens 7 | 4.372 | ASP | 0.654 | Plastic | 1.544 | 56.0 | 11.02 |
| 16 | | 15.306 | ASP | 0.869 | | | | |
| 17 | Lens 8 | 36.289 | ASP | 0.700 | Plastic | 1.534 | 55.9 | −5.57 |
| 18 | | 2.728 | ASP | 0.700 | | | | |
| 19 | Filter | Plano | | 0.210 | Glass | 1.517 | 64.2 | — |
| 20 | | Plano | | 0.363 | | | | |
| 21 | Image | Plano | | — | | | | |

Reference wavelength is 587.6 nm (d-line).
Effective radius of Surface 6 (Stop 201) is 1.930 mm.

TABLE 4

Aspheric Coefficients

| Surface # | 2 | 3 | 4 | 5 | 7 | 8 |
|---|---|---|---|---|---|---|
| k = | 1.2595E+00 | 3.4154E−01 | −9.5080E+01 | −1.0740E+01 | 0.0000E+00 | 0.0000E+00 |
| A4 = | −4.0393E−03 | −2.7551E−03 | 2.3818E−03 | −7.1266E−03 | −3.9079E−05 | −3.5679E−03 |
| A6 = | −3.2038E−04 | −5.5774E−04 | −1.2403E−02 | 1.2028E−03 | 3.7297E−04 | 9.9308E−04 |
| A8 = | −1.8102E−04 | 7.1532E−04 | 7.9088E−03 | 2.2406E−04 | 6.8069E−05 | −9.0611E−04 |
| A10 = | −9.3449E−06 | −3.2837E−04 | −2.8995E−03 | −5.3873E−04 | −6.3216E−04 | 4.8003E−04 |
| A12 = | | 6.6669E−05 | 6.3164E−04 | 2.9075E−04 | 2.8651E−04 | −1.6882E−04 |
| A14 = | | | −5.8816E−05 | −4.1405E−05 | −3.2480E−05 | 2.5235E−05 |

TABLE 4-continued

| Aspheric Coefficients | | | | | | |
|---|---|---|---|---|---|---|
| Surface # | 9 | 10 | 11 | 12 | 13 | 14 |
| k = | 0.0000E+00 | 1.8899E+01 | 8.2476E-01 | 1.7658E+00 | -1.5370E+01 | -4.0440E+00 |
| A4 = | -1.5536E-02 | -3.8764E-03 | 4.0558E-02 | 2.2697E-02 | 1.1279E-02 | -1.7465E-02 |
| A6 = | 3.5679E-04 | -5.5829E-03 | -2.5617E-02 | -1.8526E-02 | -4.8204E-03 | 7.0653E-03 |
| A8 = | -2.9505E-03 | 8.7219E-04 | 9.7460E-03 | 5.8638E-03 | 1.1199E-03 | -1.8438E-03 |
| A10 = | 1.6837E-03 | -1.4824E-04 | -2.8073E-03 | -1.0793E-03 | -2.0498E-04 | 2.9151E-04 |
| A12 = | -5.6947E-04 | 4.5016E-05 | 6.9251E-04 | 1.4744E-04 | 2.3015E-05 | -3.1531E-05 |
| A14 = | 9.5269E-05 | -7.8159E-06 | -1.1817E-04 | -1.4519E-05 | -1.5176E-06 | 2.2836E-06 |
| A16 = | -5.2645E-06 | 6.3343E-07 | 1.1240E-05 | 8.4253E-07 | 5.4234E-08 | -1.0213E-07 |
| A18 = | | | -4.4702E-07 | -2.0615E-08 | -7.9925E-10 | 2.4987E-09 |
| A20 = | | | | | | -2.5319E-11 |
| Surface # | 15 | 16 | 17 | 18 | | |
| k = | -1.0000E+00 | 3.4230E+00 | 0.0000E+00 | -6.8547E+00 | | |
| A4 = | 4.4905E-03 | 2.2086E-02 | -4.6109E-02 | -2.3406E-02 | | |
| A6 = | -4.9933E-03 | -6.1364E-03 | 9.3695E-03 | 4.4617E-03 | | |
| A8 = | 7.9119E-04 | 5.5076E-04 | -9.6259E-04 | -5.3846E-04 | | |
| A10 = | -1.3300E-04 | -1.2132E-05 | 5.8030E-05 | 4.3256E-05 | | |
| A12 = | 1.6699E-05 | -1.5074E-06 | -2.1452E-06 | -2.3630E-06 | | |
| A14 = | -1.1992E-06 | 1.3750E-07 | 4.7790E-08 | 8.6952E-08 | | |
| A16 = | 4.7557E-08 | -5.0640E-09 | -5.6744E-10 | -2.1038E-09 | | |
| A18 = | -9.7938E-10 | 9.1195E-11 | 1.6279E-12 | 3.1963E-11 | | |
| A20 = | 8.2089E-12 | -6.5807E-13 | 3.4295E-14 | -2.7603E-13 | | |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 7.10 | R9/f | -0.60 |
| Fno | 2.00 | (R15 + R16)/(R15 - R16) | 1.16 |
| HFOV [deg.] | 46.5 | f/f1 | 0.64 |
| V5 | 28.3 | f/f2 | -0.37 |
| V6 | 56.0 | f/f3 | 0.54 |
| (Vi/Ni)min | 11.65 | f/f4 | 0.20 |
| Vmin | 19.5 | f/f5 | -0.35 |
| ΣCT/ΣAT | 1.46 | f/f6 | 0.29 |
| CT1/CT3 | 0.99 | f/f7 | 0.64 |
| CTmax/CTmin | 2.09 | f/f8 | -1.28 |
| (T12 + T34)/T23 | 12.47 | f/ImgH | 0.90 |
| (T12 + T34 + T45 + T67 + T78)/(T23 + T56) | 13.53 | f1/f3 | 0.85 |
| (T67 + T78)/CT7 | 2.44 | f3/f7 | 1.19 |
| (T67 - T78)/(T67 + T78) | -0.09 | |f7/f8| | 1.98 |
| TD/T45 | 18.00 | ImgH/BL | 6.23 |
| TD/(T67 + T78) | 4.89 | Y82/Y11 | 3.59 |
| TL [mm] | 9.07 | Yc62/Yc61 | 1.04 |
| TL/f | 1.28 | Yc72/Yc71 | 1.16 |
| TL/ImgH | 1.14 | Yc82/Y82 | 0.42 |
| R5/R6 | 0.04 | | |

3rd Embodiment

Figure 5:
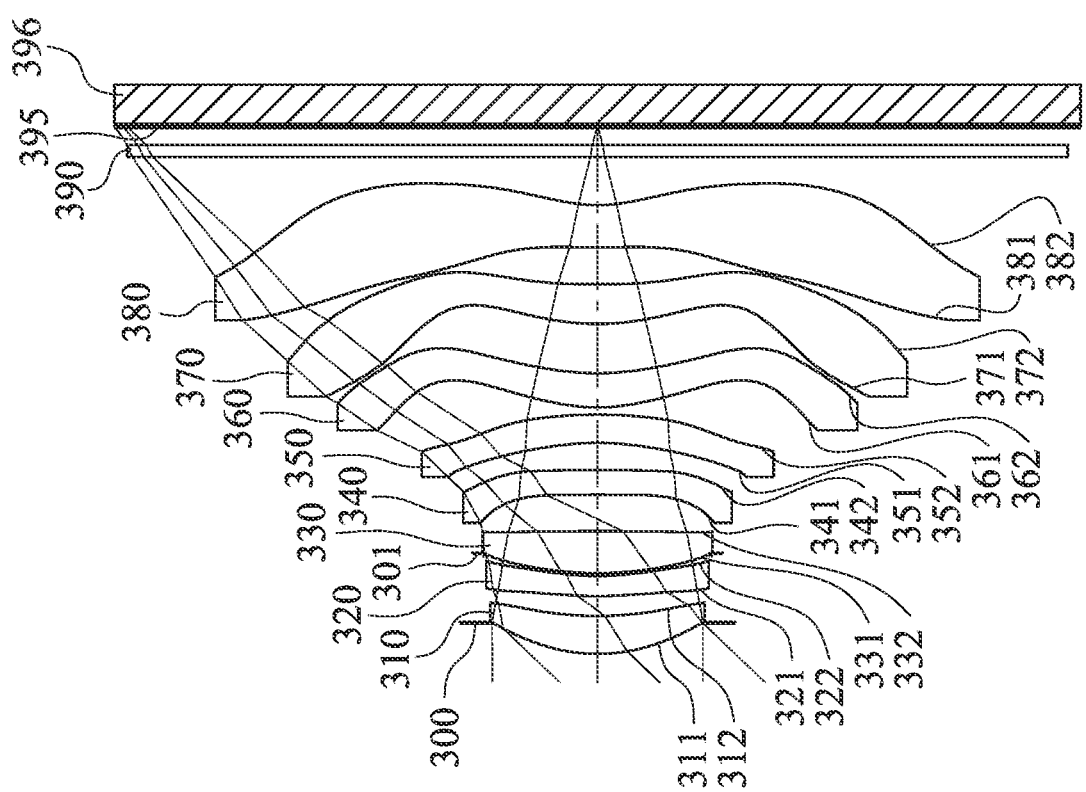
FIG. 5 is a schematic view of an imaging apparatus according to the 3rd embodiment of the present disclosure.
Figure 6:
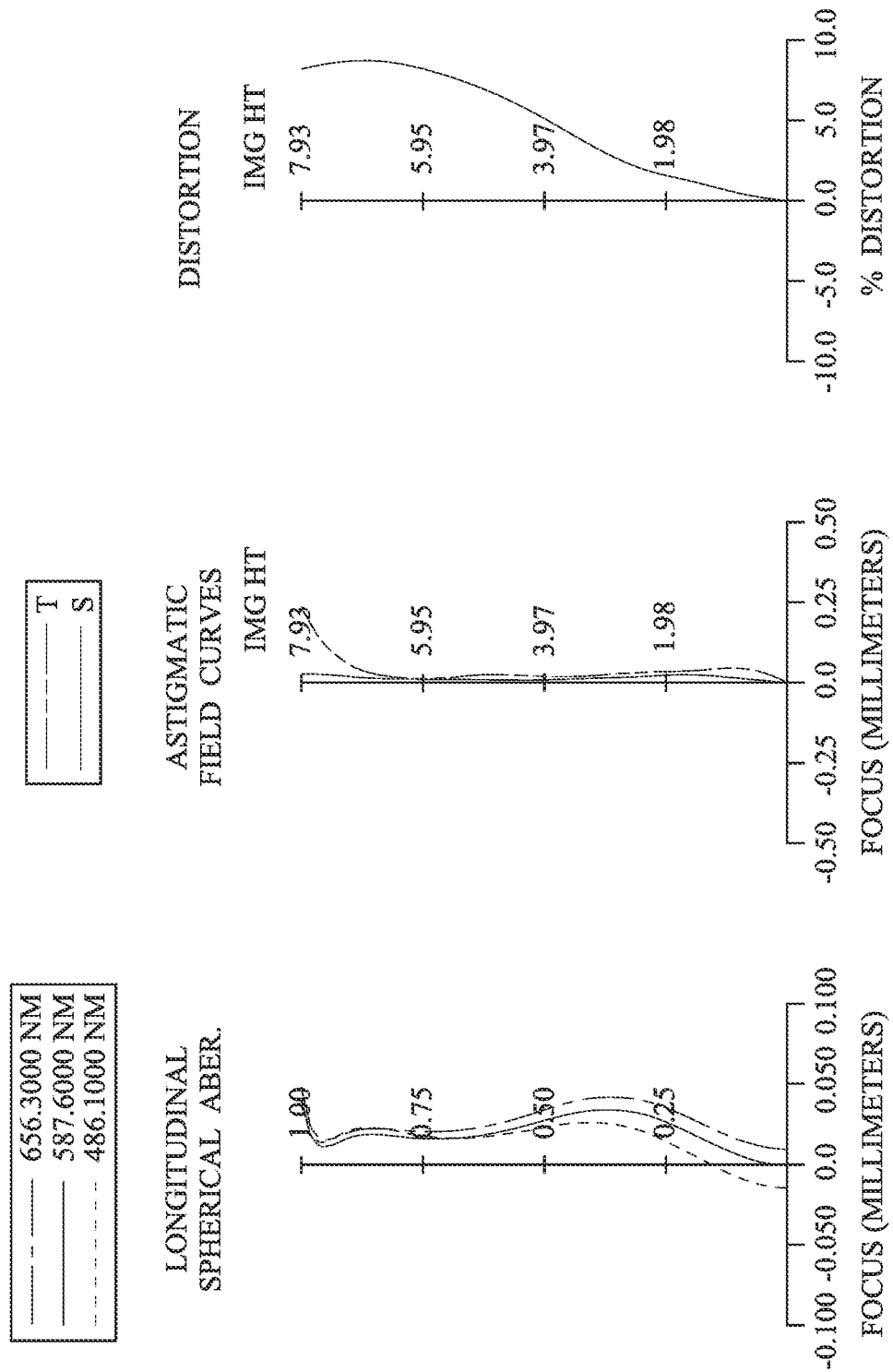
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows, in order from left to right, spherical aberration curves, astigmatic field curves and a distortion curve of the imaging apparatus of the 3rd embodiment. In FIG. 5, the imaging apparatus according to the 3rd embodiment includes a photographing optical lens assembly (its reference number is omitted) and an image sensor 396. The photographing optical lens assembly includes, in order from an object side to an image side along an optical path, an aperture stop 300, a first lens element 310, a second lens element 320, a stop 301, a third lens element 330, a fourth lens element 340, a fifth lens element 350, a sixth lens element 360, a seventh lens element 370, an eighth lens element 380, a filter 390 and an image surface 395, wherein the image sensor 396 is disposed on the image surface 395 of the photographing optical lens assembly. The photographing optical lens assembly includes eight lens elements (310, 320, 330, 340, 350, 360, 370, 380) without additional one or more lens elements inserted between the first lens element 310 and the eighth lens element 380.

The first lens element 310 with positive refractive power has an object-side surface 311 being convex in a paraxial region thereof and an image-side surface 312 being concave in a paraxial region thereof. The first lens element 310 is made of a plastic material, and has the object-side surface 311 and the image-side surface 312 being both aspheric. Furthermore, the object-side surface 311 of the first lens element 310 includes an inflection point in an off-axis region thereof, and the image-side surface 312 of the first lens element 310 includes an inflection point in an off-axis region thereof.

The second lens element 320 with negative refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric. Furthermore, the object-side surface 321 of the second lens element 320 includes two inflection points in an off-axis region thereof, and the image-side surface 322 of the second lens element 320 includes three inflection points in an off-axis region thereof.

The third lens element 330 with positive refractive power has an object-side surface 331 being convex in a paraxial region thereof and an image-side surface 332 being convex in a paraxial region thereof. The third lens element 330 is made of a plastic material, and has the object-side surface 331 and the image-side surface 332 being both aspheric. Furthermore, the image-side surface 332 of the third lens element 330 includes an inflection point and a critical point in an off-axis region thereof.

The fourth lens element 340 with positive refractive power has an object-side surface 341 being concave in a paraxial region thereof and an image-side surface 342 being convex in a paraxial region thereof. The fourth lens element 340 is made of a plastic material, and has the object-side surface 341 and the image-side surface 342 being both aspheric. Furthermore, the image-side surface 342 of the fourth lens element 340 includes an inflection point in an off-axis region thereof.

The fifth lens element 350 with negative refractive power has an object-side surface 351 being concave in a paraxial region thereof and an image-side surface 352 being convex in a paraxial region thereof. The fifth lens element 350 is made of a plastic material, and has the object-side surface 351 and the image-side surface 352 being both aspheric. Furthermore, the image-side surface 352 of the fifth lens element 350 includes two inflection points in an off-axis region thereof.

The sixth lens element 360 with positive refractive power has an object-side surface 361 being convex in a paraxial region thereof and an image-side surface 362 being concave in a paraxial region thereof. The sixth lens element 360 is made of a plastic material, and has the object-side surface 361 and the image-side surface 362 being both aspheric. Furthermore, the object-side surface 361 of the sixth lens element 360 includes two inflection points and a critical point in an off-axis region thereof, and the image-side surface 362 of the sixth lens element 360 includes an inflection point and a critical point in an off-axis region thereof.

The seventh lens element 370 with positive refractive power has an object-side surface 371 being convex in a paraxial region thereof and an image-side surface 372 being concave in a paraxial region thereof. The seventh lens element 370 is made of a plastic material, and has the object-side surface 371 and the image-side surface 372 being both aspheric. Furthermore, the object-side surface 371 of the seventh lens element 370 includes four inflection points and a critical point in an off-axis region thereof, and the image-side surface 372 of the seventh lens element 370 includes two inflection points and a critical point in an off-axis region thereof.

The eighth lens element 380 with negative refractive power has an object-side surface 381 being convex in a paraxial region thereof and an image-side surface 382 being concave in a paraxial region thereof. The eighth lens element 380 is made of a plastic material, and has the object-side surface 381 and the image-side surface 382 being both aspheric. Furthermore, the object-side surface 381 of the eighth lens element 380 includes four inflection points and a critical point in an off-axis region thereof, and the image-side surface 382 of the eighth lens element 380 includes three inflection points and a critical point in an off-axis region thereof.

The filter 390 is made of a glass material and disposed between the eighth lens element 380 and the image surface 395 and will not affect a focal length of the photographing optical lens assembly.

The detailed optical data of the 3rd embodiment are shown in Table 5 and the aspheric surface data are shown in Table 6 below.

TABLE 5

3rd Embodiment
f = 6.99 mm, Fno = 2.00, HFOV = 46.2 deg.

| Surface # | | Curvature Radius | | Thickness | Material | Index | Abbe # | Focal Length |
|---|---|---|---|---|---|---|---|---|
| 0 | Object | Plano | | 2000.000 | | | | |
| 1 | Ape. Stop | Plano | | −0.519 | | | | |
| 2 | Lens 1 | 3.037 | ASP | 0.631 | Plastic | 1.545 | 56.1 | 11.28 |
| 3 | | 5.562 | ASP | 0.335 | | | | |
| 4 | Lens 2 | 7.450 | ASP | 0.335 | Plastic | 1.669 | 19.5 | −19.85 |
| 5 | | 4.686 | ASP | 0.382 | | | | |
| 6 | Stop | Plano | | −0.335 | | | | |
| 7 | Lens 3 | 6.024 | ASP | 0.701 | Plastic | 1.544 | 56.0 | 10.27 |
| 8 | | −74.384 | ASP | 0.611 | | | | |
| 9 | Lens 4 | −89.968 | ASP | 0.410 | Plastic | 1.669 | 19.5 | 210.25 |
| 10 | | −54.973 | ASP | 0.457 | | | | |
| 11 | Lens 5 | −3.987 | ASP | 0.470 | Plastic | 1.587 | 28.3 | −15.08 |
| 12 | | −7.567 | ASP | 0.120 | | | | |
| 13 | Lens 6 | 3.102 | ASP | 0.571 | Plastic | 1.544 | 56.0 | 18.47 |
| 14 | | 4.197 | ASP | 0.825 | | | | |
| 15 | Lens 7 | 4.356 | ASP | 0.663 | Plastic | 1.544 | 56.0 | 9.78 |
| 16 | | 22.773 | ASP | 0.614 | | | | |
| 17 | Lens 8 | 13.839 | ASP | 0.706 | Plastic | 1.544 | 56.0 | −5.66 |
| 18 | | 2.474 | ASP | 0.800 | | | | |
| 19 | Filter | Plano | | 0.210 | Glass | 1.517 | 64.2 | — |
| 20 | | Plano | | 0.310 | | | | |
| 21 | Image | Plano | | — | | | | |

Reference wavelength is 587.6 nm (d-line).
Effective radius of Surface 6 (Stop 301) is 1.890 mm.

TABLE 6

Aspheric Coefficients

| Surface # | 2 | 3 | 4 | 5 | 7 | 8 |
|---|---|---|---|---|---|---|
| k = | 5.0870E−01 | −3.3008E+00 | 0.0000E+00 | −1.1033E+01 | 0.0000E+00 | 0.0000E+00 |
| A4 = | −2.0346E−03 | 9.3577E−04 | −1.8453E−02 | −6.9959E−03 | −1.3652E−03 | 1.6464E−04 |
| A6 = | −9.3633E−04 | −9.3218E−04 | 4.2926E−03 | 8.3547E−03 | 1.0179E−02 | −1.9672E−03 |
| A8 = | 1.8547E−04 | 2.7161E−04 | −3.3892E−03 | −1.3244E−02 | −1.4634E−02 | 3.1072E−03 |
| A10 = | −1.2780E−04 | −3.4754E−04 | 2.4717E−03 | 9.4088E−03 | 9.6615E−03 | −2.2505E−03 |
| A12 = | −8.4733E−06 | 3.1664E−05 | −1.1178E−03 | −3.7090E−03 | −3.5339E−03 | 9.6494E−04 |
| A14 = | | 7.5236E−06 | 2.8810E−04 | 8.1399E−04 | 6.9613E−04 | −2.3729E−04 |
| A16 = | | | −2.8746E−05 | −7.4307E−05 | −5.5667E−05 | 2.4982E−05 |

| Surface # | 9 | 10 | 11 | 12 | 13 | 14 |
|---|---|---|---|---|---|---|
| k = | 0.0000E+00 | 0.0000E+00 | 0.0000E+00 | 0.0000E+00 | −1.2302E+01 | −4.1942E+00 |
| A4 = | −1.4657E−02 | 1.3643E−03 | 5.2122E−02 | 1.6645E−02 | 9.9407E−03 | −2.3383E−02 |
| A6 = | −3.2879E−04 | −7.8010E−03 | −3.6743E−02 | −2.0685E−02 | −3.0623E−03 | 1.3284E−02 |
| A8 = | −5.0874E−03 | 2.7061E−03 | 1.8276E−02 | 8.5739E−03 | 7.4464E−04 | −3.9504E−03 |
| A10 = | 2.8862E−03 | −1.3756E−03 | −6.0385E−03 | −2.1348E−03 | −2.5167E−04 | 6.5659E−04 |
| A12 = | −8.2588E−04 | 5.5064E−04 | 1.3015E−03 | 3.5473E−04 | 4.9020E−05 | −6.7997E−05 |
| A14 = | 1.0218E−04 | −1.3660E−04 | −1.7643E−04 | −3.6538E−05 | −5.3401E−06 | 4.4507E−06 |
| A16 = | −2.8403E−06 | 1.8401E−05 | 1.3838E−05 | 2.0366E−06 | 3.2761E−07 | −1.7735E−07 |
| A18 = | | −9.6231E−07 | −4.8985E−07 | −4.6234E−08 | −1.0519E−08 | 3.8987E−09 |
| A20 = | | | | | 1.3682E−10 | −3.6067E−11 |

| Surface # | 15 | 16 | 17 | 18 |
|---|---|---|---|---|
| k = | −1.0055E+00 | 7.9863E+00 | 0.0000E+00 | −6.5198E+00 |
| A4 = | 2.7857E−03 | 2.6335E−02 | −4.6757E−02 | −2.2919E−02 |
| A6 = | −5.0483E−03 | −8.3526E−03 | 9.4978E−03 | 4.1827E−03 |
| A8 = | 8.8774E−04 | 1.1187E−03 | −1.0180E−03 | −4.7277E−04 |
| A10 = | −1.4995E−04 | −1.0037E−04 | 6.6009E−05 | 3.4883E−05 |
| A12 = | 1.8112E−05 | 7.2240E−06 | −2.7116E−06 | −1.7339E−06 |
| A14 = | −1.2633E−06 | −4.2205E−07 | 6.9271E−08 | 5.8021E−08 |
| A16 = | 4.9067E−08 | 1.8110E−08 | −9.4488E−10 | −1.2827E−09 |
| A18 = | −9.9339E−10 | −5.0897E−10 | 6.5539E−13 | 1.7944E−11 |
| A20 = | 8.1918E−12 | 8.1925E−12 | 1.9904E−13 | −1.4403E−13 |

In the 3rd embodiment, the equation of the aspheric surface profiles of the aforementioned lens elements is the same as the equation of the 1 st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 6.99 | R9/f | −0.57 |
| Fno | 2.00 | (R15 + R16)/(R15 − R16) | 1.44 |
| HFOV [deg.] | 46.2 | f/f1 | 0.62 |
| V5 | 28.3 | f/f2 | −0.35 |
| V6 | 56.0 | f/f3 | 0.68 |
| (Vi/Ni)min | 11.65 | f/f4 | 0.03 |
| Vmin | 19.5 | f/f5 | −0.46 |
| ΣCT/ΣAT | 1.49 | f/f6 | 0.38 |
| CT1/CT3 | 0.90 | f/f7 | 0.71 |
| CTmax/CTmin | 2.11 | f/f8 | −1.23 |
| (T12 + T34)/T23 | 20.13 | f/ImgH | 0.88 |
| (T12 + T34 + T45 + T67 + T78)/(T23 + T56) | 17.02 | f1/f3 | 1.10 |
| (T67 + T78)/CT7 | 2.17 | f3/f7 | 1.05 |
| (T67 − T78)/(T67 + T78) | 0.15 | |f7/f8| | 1.73 |
| TD/T45 | 16.40 | ImgH/BL | 6.01 |
| TD/(T67 + T78) | 5.21 | Y82/Y11 | 3.62 |
| TL [mm] | 8.82 | Yc62/Yc61 | 1.09 |
| TL/f | 1.26 | Yc72/Yc71 | 1.11 |
| TL/ImgH | 1.11 | Yc82/Y82 | 0.44 |
| R5/R6 | −0.08 | | |

4th Embodiment

Figure 7:
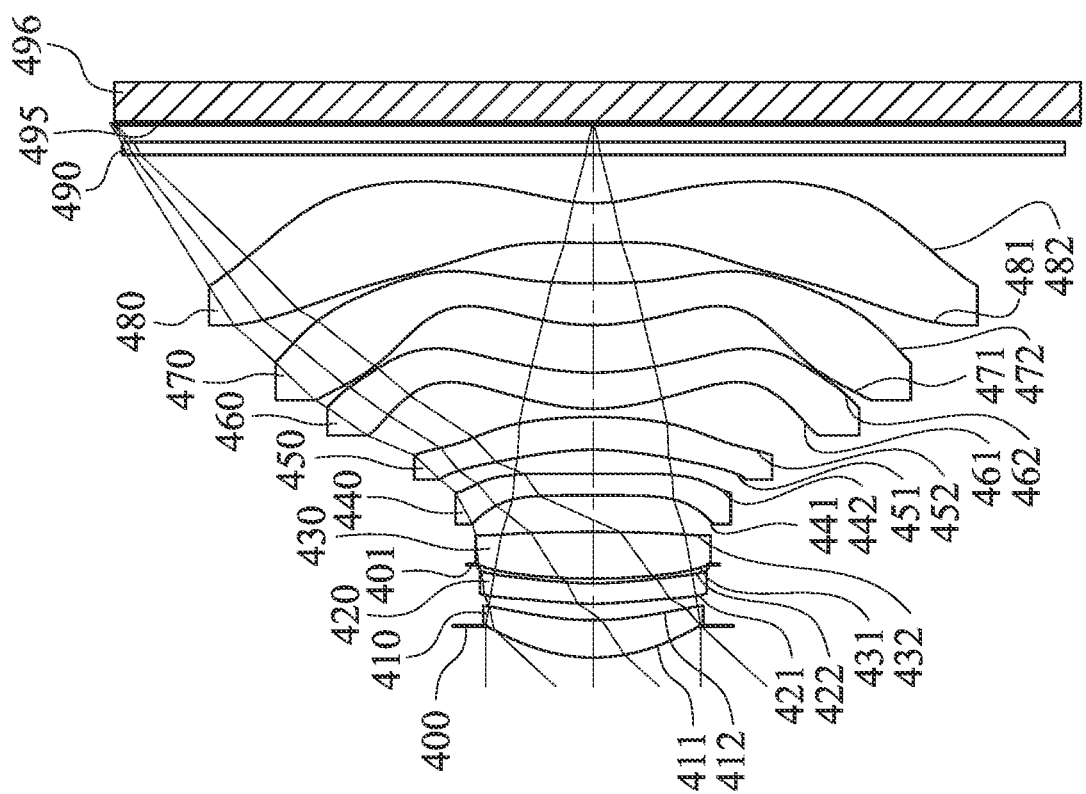
FIG. 7 is a schematic view of an imaging apparatus according to the 4th embodiment of the present disclosure.
Figure 8:
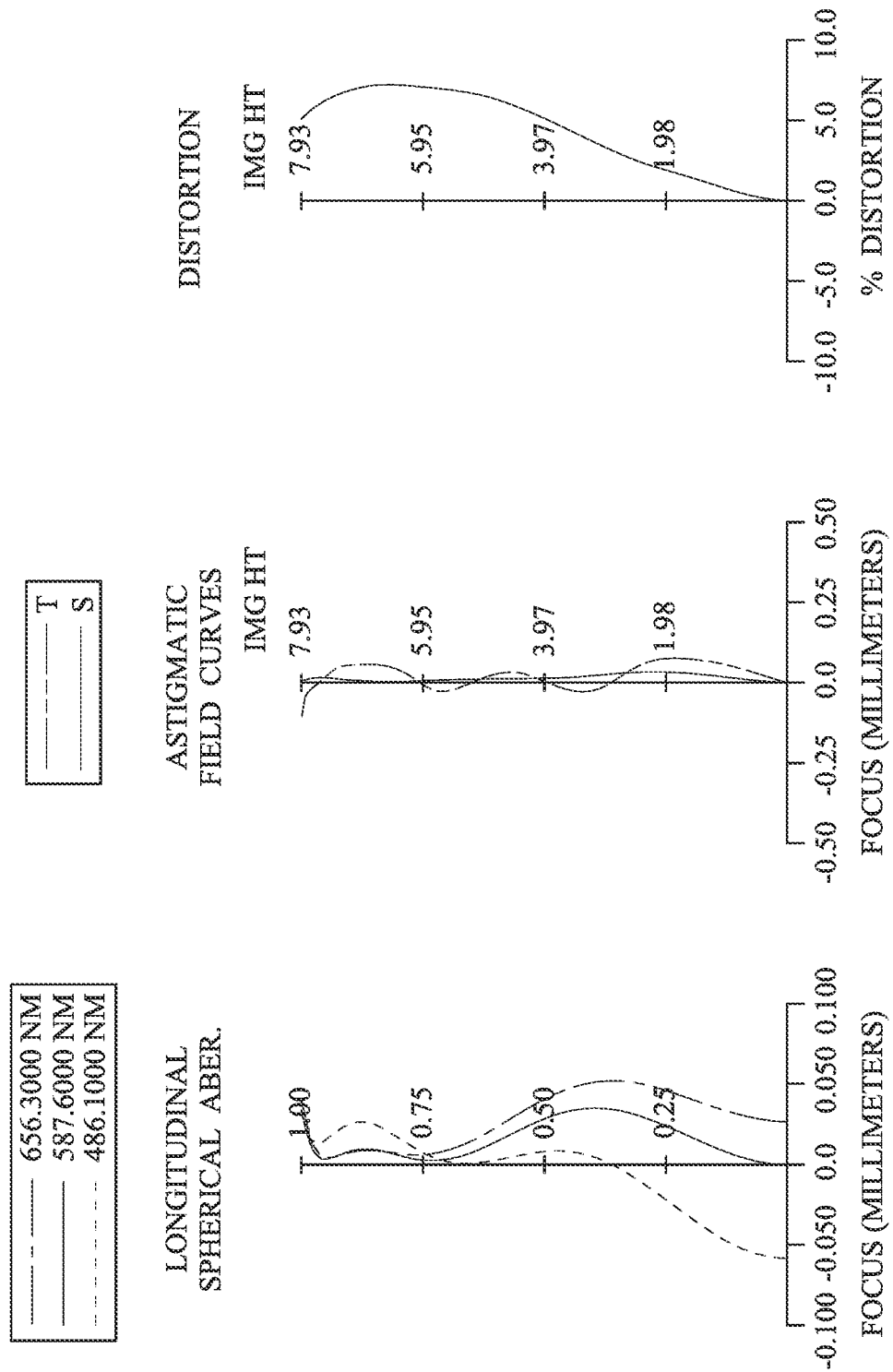
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows, in order from left to right, spherical aberration curves, astigmatic field curves and a distortion curve of the imaging apparatus of the 4th embodiment. In FIG. 7, the imaging apparatus according to the 4th embodiment includes a photographing optical lens assembly (its reference number is omitted) and an image sensor 496. The photographing optical lens assembly includes, in order from an object side to an image side along an optical path, an aperture stop 400, a first lens element 4103 a second lens element 420, a stop 401, a third lens element 430, a fourth lens element 440, a fifth lens element 450, a sixth lens element 460, a seventh lens element 470, an eighth lens element 480, a filter 490 and an image surface 495, wherein the image sensor 496 is disposed on the image surface 495 of the photographing optical lens assembly. The photographing optical lens assembly includes eight lens elements (410, 420, 430, 440, 450, 460, 470, 480) without additional one or more lens elements inserted between the first lens element 410 and the eighth lens element 480.

The first lens element 410 with positive refractive power has an object-side surface 411 being convex in a paraxial region thereof and an image-side surface 412 being concave in a paraxial region thereof. The first lens element 410 is made of a plastic material, and has the object-side surface 411 and the image-side surface 412 being both aspheric. Furthermore, the object-side surface 411 of the first lens element 410 includes an inflection point in an off-axis region thereof, and the image-side surface 412 of the first lens element 410 includes an inflection point in an off-axis region thereof.

The second lens element 420 with positive refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric. Furthermore, the object-side surface 421 of the second lens element 420 includes two inflection points in an off-axis region thereof, and the image-side surface 422 of the second lens element 420 includes an inflection point in an off-axis region thereof.

The third lens element 430 with positive refractive power has an object-side surface 431 being convex in a paraxial region thereof and an image-side surface 432 being convex in a paraxial region thereof. The third lens element 430 is made of a plastic material, and has the object-side surface 431 and the image-side surface 432 being both aspheric. Furthermore, the image-side surface 432 of the third lens element 430 includes an inflection point and a critical point in an off-axis region thereof.

The fourth lens element 440 with positive refractive power has an object-side surface 441 being convex in a paraxial region thereof and an image-side surface 442 being convex in a paraxial region thereof. The fourth lens element 440 is made of a plastic material, and has the object-side surface 441 and the image-side surface 442 being both aspheric. Furthermore, the object-side surface 441 of the fourth lens element 440 includes two inflection points and a critical point in an off-axis region thereof, and the image-side surface 442 of the fourth lens element 440 includes three inflection points and two critical points in an off-axis region thereof.

The fifth lens element 450 with negative refractive power has an object-side surface 451 being concave in a paraxial region thereof and an image-side surface 452 being convex in a paraxial region thereof. The fifth lens element 450 is made of a plastic material, and has the object-side surface 451 and the image-side surface 452 being both aspheric. Furthermore, the image-side surface 452 of the fifth lens element 450 includes three inflection points in an off-axis region thereof.

The sixth lens element 460 with positive refractive power has an object-side surface 461 being convex in a paraxial region thereof and an image-side surface 462 being concave in a paraxial region thereof. The sixth lens element 460 is made of a plastic material, and has the object-side surface 461 and the image-side surface 462 being both aspheric. Furthermore, the object-side surface 461 of the sixth lens element 460 includes two inflection points and a critical point in an off-axis region thereof, and the image-side surface 462 of the sixth lens element 460 includes an inflection point and a critical point in an off-axis region thereof.

The seventh lens element 470 with positive refractive power has an object-side surface 471 being convex in a paraxial region thereof and an image-side surface 472 being concave in a paraxial region thereof. The seventh lens element 470 is made of a plastic material, and has the object-side surface 471 and the image-side surface 472 being both aspheric. Furthermore, the object-side surface 471 of the seventh lens element 470 includes four inflection points and a critical point in an off-axis region thereof, and the image-side surface 472 of the seventh lens element 470 includes two inflection points and a critical point in an off-axis region thereof.

The eighth lens element 480 with negative refractive power has an object-side surface 481 being convex in a paraxial region thereof and an image-side surface 482 being concave in a paraxial region thereof. The eighth lens element 480 is made of a plastic material, and has the object-side surface 481 and the image-side surface 482 being both aspheric. Furthermore, the object-side surface 481 of the eighth lens element 480 includes four inflection points and a critical point in an off-axis region thereof, and the image-side surface 482 of the eighth lens element 480 includes two inflection points and a critical point in an off-axis region thereof.

The filter 490 is made of a glass material and disposed between the eighth lens element 480 and the image surface 495 and will not affect a focal length of the photographing optical lens assembly.

The detailed optical data of the 4th embodiment are shown in Table 7 and the aspheric surface data are shown in Table 8 below.

TABLE 7

4th Embodiment
f = 6.92 mm, Fno = 1.95, HFOV = 47.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.520 | | | | |
| 2 | Lens 1 | 3.025 | ASP | 0.617 | Plastic | 1.529 | 58.1 | 12.79 |
| 3 | | 5.083 | ASP | 0.273 | | | | |
| 4 | Lens 2 | 6.663 | ASP | 0.335 | Plastic | 1.701 | 14.9 | 367.45 |
| 5 | | 6.698 | ASP | 0.308 | | | | |
| 6 | Stop | Plano | | −0.229 | | | | |
| 7 | Lens 3 | 13.746 | ASP | 0.771 | Plastic | 1.529 | 58.1 | 17.73 |
| 8 | | −28.965 | ASP | 0.603 | | | | |
| 9 | Lens 4 | 384.615 | ASP | 0.357 | Plastic | 1.701 | 14.9 | 226.49 |
| 10 | | −270.270 | ASP | 0.397 | | | | |
| 11 | Lens 5 | −4.124 | ASP | 0.540 | Plastic | 1.614 | 26.0 | −16.21 |
| 12 | | −7.394 | ASP | 0.135 | | | | |
| 13 | Lens 6 | 3.280 | ASP | 0.597 | Plastic | 1.534 | 55.9 | 20.02 |
| 14 | | 4.432 | ASP | 0.787 | | | | |
| 15 | Lens 7 | 4.293 | ASP | 0.690 | Plastic | 1.534 | 55.9 | 9.73 |
| 16 | | 23.317 | ASP | 0.669 | | | | |
| 17 | Lens 8 | 17.343 | ASP | 0.653 | Plastic | 1.534 | 55.9 | −5.87 |
| 18 | | 2.618 | ASP | 0.800 | | | | |

TABLE 7-continued

4th Embodiment
f = 6.92 mm, Fno = 1.95, HFOV = 47.4 deg.

| Surface # | | Curvature Radius | Thickness | Material | Index | Abbe # | Focal Length |
|---|---|---|---|---|---|---|---|
| 19 | Filter | Plano | 0.210 | Glass | 1.517 | 64.2 | — |
| 20 | | Plano | 0.305 | | | | |
| 21 | image | Plano | — | | | | |

Reference wavelength is 587.6 nm (d-line).
Effective radius of Surface 6 (Stop 401) is 1.895 mm.

TABLE 8

Aspheric Coefficients

| Surface # | 2 | 3 | 4 | 5 | 7 | 8 |
|---|---|---|---|---|---|---|
| k = | 4.7794E−01 | −4.6342E+00 | −2.3512E−01 | −8.3218E+00 | 1.9389E+01 | −1.6671E+01 |
| A4 = | −2.0099E−03 | 2.5112E−03 | −1.0316E−02 | 7.5911E−03 | 2.0964E−02 | −1.0546E−03 |
| A6 = | −2.9098E−03 | −1.1234E−02 | −1.4852E−02 | −2.1102E−02 | −1.8738E−02 | 3.3293E−04 |
| A8 = | 1.6022E−03 | 1.1041E−02 | 1.3502E−02 | 8.8839E−03 | 6.4343E−03 | 7.2179E−04 |
| A10 = | −5.1804E−04 | −5.3315E−03 | −4.8627E−03 | 2.9118E−03 | 2.5567E−03 | −1.5345E−03 |
| A12 = | 2.9442E−05 | 1.1565E−03 | 4.7934E−04 | −3.6096E−03 | −2.7704E−03 | 9.8342E−04 |
| A14 = | | −9.2007E−05 | 1.4113E−04 | 1.0981E−03 | 7.9431E−04 | −2.7305E−04 |
| A16 = | | | −2.6647E−05 | −1.1130E−04 | −7.5663E−05 | 2.8542E−05 |

| Surface # | 9 | 10 | 11 | 12 | 13 | 14 |
|---|---|---|---|---|---|---|
| k = | 9.9000E+01 | −9.9000E+01 | −3.3755E−01 | −5.2340E−02 | −1.2302E+01 | −4.0423E+00 |
| A4 = | −1.8843E−02 | 1.1250E−02 | 6.0108E−02 | 1.7067E−02 | 9.7025E−03 | −2.1823E−02 |
| A6 = | 5.0690E−03 | −2.4690E−02 | −5.2049E−02 | −2.1978E−02 | −2.6186E−03 | 1.2400E−02 |
| A8 = | −7.6602E−03 | 1.9831E−02 | 3.1309E−02 | 9.4650E−03 | 4.9563E−04 | −3.7168E−03 |
| A10 = | 2.9108E−03 | −1.0915E−02 | −1.1685E−02 | −2.4450E−03 | −1.8582E−04 | 6.2018E−04 |
| A12 = | −5.3195E−04 | 3.5875E−03 | 2.6919E−03 | 4.1727E−04 | 3.9000E−05 | −6.4483E−05 |
| A14 = | 3.0871E−05 | −6.8615E−04 | −3.7427E−04 | −4.3758E−05 | −4.4280E−06 | 4.2448E−06 |
| A16 = | 2.1669E−06 | 7.0577E−05 | 2.8926E−05 | 2.4735E−06 | 2.7886E−07 | −1.7054E−07 |
| A18 = | | −2.9701E−06 | −9.6327E−07 | −5.6885E−08 | −9.1150E−09 | 3.7928E−09 |
| A20 = | | | | | 1.2017E−10 | −3.5655E−11 |

| Surface # | 15 | 16 | 17 | 18 |
|---|---|---|---|---|
| k = | −1.0079E+00 | 8.1040E+00 | 4.8613E−01 | −6.0744E+00 |
| A4 = | 3.0771E−03 | 2.5717E−02 | −4.4613E−02 | −2.3028E−02 |
| A6 = | −5.5287E−03 | −7.8438E−03 | 8.7943E−03 | 4.1106E−03 |
| A8 = | 1.0549E−03 | 9.4492E−04 | −9.0648E−04 | −4.4952E−04 |
| A10 = | −1.8319E−04 | −6.5350E−05 | 5.5978E−05 | 3.1364E−05 |
| A12 = | 2.2032E−05 | 2.8848E−06 | −2.1748E−06 | −1.4323E−06 |
| A14 = | −1.5359E−06 | −8.5212E−08 | 5.3304E−08 | 4.2284E−08 |
| A16 = | 5.9999E−08 | 1.7016E−09 | −7.9078E−10 | −7.7286E−10 |
| A18 = | −1.2265E−09 | −2.1923E−11 | 6.3506E−12 | 7.9323E−12 |
| A20 = | 1.0234E−11 | 1.4364E−13 | −2.0355E−14 | −3.4937E−14 |

In the 4th embodiment, the equation of the aspheric surface profiles of the aforementioned lens elements is the same as the equation of the 1 st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | |
|---|---|---|
| f [mm] | 6.92 | |
| Fno | 1.95 | |
| HFOV [deg.] | 47.4 | |
| V5 | 26.0 | |
| V6 | 55.9 | |
| (Vi/Ni)min | 8.76 | |
| Vmin | 14.9 | |
| ΣCT/ΣAT | 1.55 | |
| CT1/CT3 | 0.80 | |
| CTmax/CTmin | 2.30 | |
| (T12 + T34)/T23 | 11.09 | |
| (T12 + T34 + T45 + T67 + T78)/(T23 + T56) | 12.75 | |
| (T67 + T78)/CT7 | 2.11 | |
| (T67 − T78)/(T67 + T78) | 0.08 | |
| TD/T45 | 18.90 | |
| TD/(T67 + T78) | 5.15 | |
| TL [mm] | 8.82 | |
| R9/f | −0.60 | |
| (R15 + R16)/(R15 − R16) | 1.36 | |
| f/f1 | 0.54 | |
| f/f2 | 0.02 | |
| f/f3 | 0.39 | |
| f/f4 | 0.03 | |
| f/f5 | −0.43 | |
| f/f6 | 0.35 | |
| f/f7 | 0.71 | |
| f/f8 | −1.18 | |
| f/ImgH | 0.87 | |
| f1/f3 | 0.72 | |
| f3/f7 | 1.82 | |
| |f7/f8| | 1.66 | |
| ImgH/BL | 6.03 | |
| Y82/Y11 | 3.56 | |
| Yc62/Yc61 | 1.09 | |

-continued

| 4th Embodiment | | | |
|---|---|---|---|
| TL/f | 1.27 | Yc72/Yc71 | 1.12 |
| TL/ImgH | 1.11 | Yc82/Y82 | 0.44 |
| R5/R6 | −0.47 | | |

5th Embodiment

Figure 9:
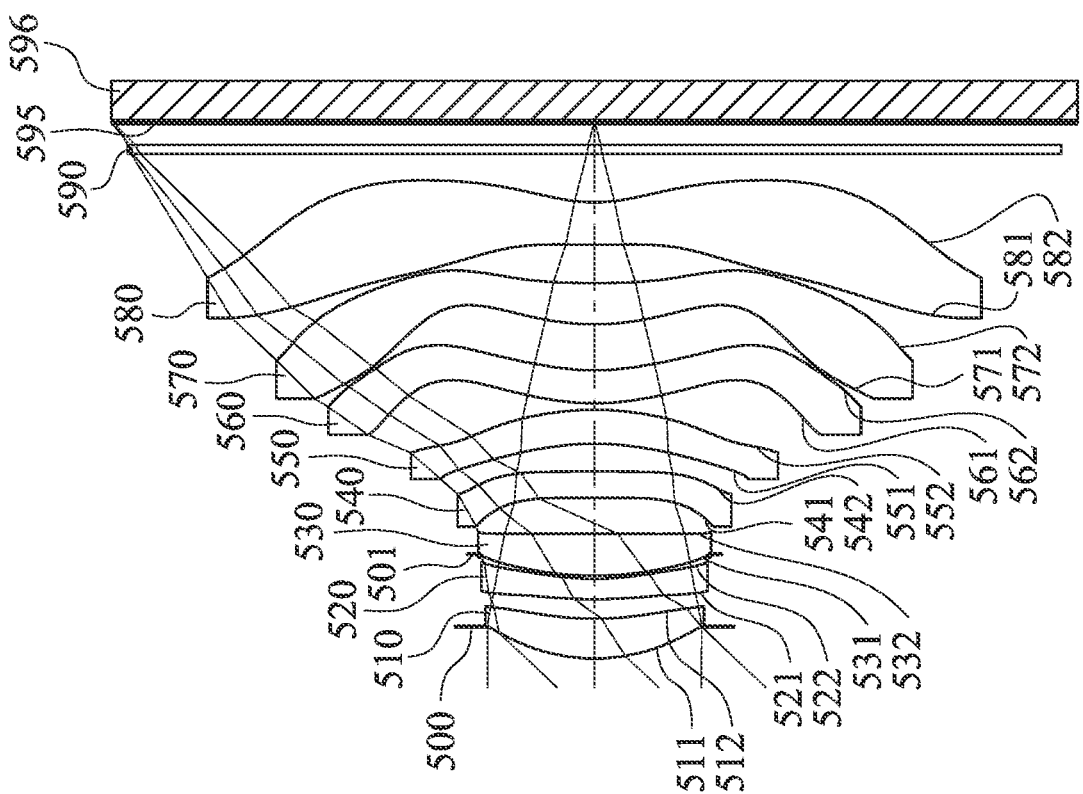
FIG. 9 is a schematic view of an imaging apparatus according to the 5th embodiment of the present disclosure.
Figure 10:
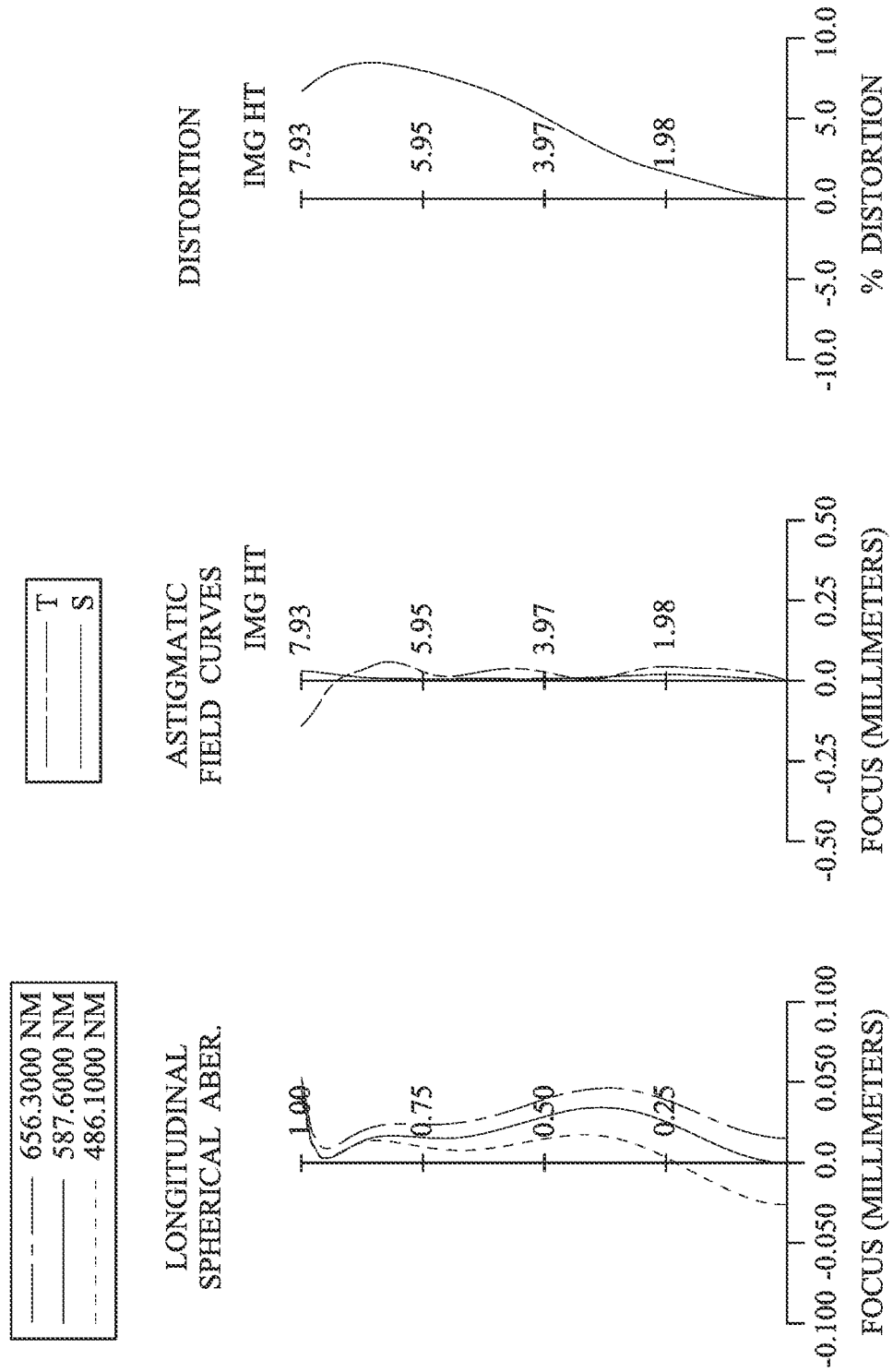
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows, in order from left to right, spherical aberration curves, astigmatic field curves and a distortion curve of the imaging apparatus of the 5th embodiment. In FIG. 9, the imaging apparatus according to the 5th embodiment includes a photographing optical lens assembly (its reference number is omitted) and an image sensor 596. The photographing optical lens assembly includes, in order from an object side to an image side along an optical path, an aperture stop 500, a first lens element 510, a second lens element 520, a stop 501, a third lens element 530, a fourth lens element 540, a fifth lens element 550, a sixth lens element 560, a seventh lens element 570, an eighth lens element 580, a filter 590 and an image surface 595, wherein the image sensor 596 is disposed on the image surface 595 of the photographing optical lens assembly. The photographing optical lens assembly includes eight lens elements (510, 520, 530, 540, 550, 560, 570, 580) without additional one or more lens elements inserted between the first lens element 510 and the eighth lens element 580.

The first lens element 510 with positive refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric. Furthermore, the object-side surface 511 of the first lens element 510 includes an inflection point in an off-axis region thereof, and the image-side surface 512 of the first lens element 510 includes an inflection point in an off-axis region thereof.

The second lens element 520 with negative refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric. Furthermore, the object-side surface 521 of the second lens element 520 includes two inflection points in an off-axis region thereof, and the image-side surface 522 of the second lens element 520 includes three inflection points in an off-axis region thereof.

The third lens element 530 with positive refractive power has an object-side surface 531 being convex in a paraxial region thereof and an image-side surface 532 being convex in a paraxial region thereof. The third lens element 530 is made of a plastic material, and has the object-side surface 531 and the image-side surface 532 being both aspheric. Furthermore, the image-side surface 532 of the third lens element 530 includes an inflection point and a critical point in an off-axis region thereof.

The fourth lens element 540 with negative refractive power has an object-side surface 541 being concave in a paraxial region thereof and an image-side surface 542 being concave in a paraxial region thereof. The fourth lens element 540 is made of a plastic material, and has the object-side surface 541 and the image-side surface 542 being both aspheric. Furthermore, the image-side surface 542 of the fourth lens element 540 includes two inflection points and a critical point in an off-axis region thereof.

The fifth lens element 550 with positive refractive power has an object-side surface 551 being concave in a paraxial region thereof and an image-side surface 552 being convex in a paraxial region thereof. The fifth lens element 550 is made of a plastic material, and has the object-side surface 551 and the image-side surface 552 being both aspheric. Furthermore, the image-side surface 552 of the fifth lens element 550 includes two inflection points in an off-axis region thereof.

The sixth lens element 560 with negative refractive power has an object-side surface 561 being convex in a paraxial region thereof and an image-side surface 562 being concave in a paraxial region thereof. The sixth lens element 560 is made of a plastic material, and has the object-side surface 561 and the image-side surface 562 being both aspheric. Furthermore, the object-side surface 561 of the sixth lens element 560 includes two inflection points and a critical point in an off-axis region thereof, and the image-side surface 562 of the sixth lens element 560 includes an inflection point and a critical point in an off-axis region thereof.

The seventh lens element 570 with positive refractive power has an object-side surface 571 being convex in a paraxial region thereof and an image-side surface 572 being concave in a paraxial region thereof. The seventh lens element 570 is made of a plastic material, and has the object-side surface 571 and the image-side surface 572 being both aspheric. Furthermore, the object-side surface 571 of the seventh lens element 570 includes two inflection points and a critical point in an off-axis region thereof, and the image-side surface 572 of the seventh lens element 570 includes two inflection points and a critical point in an off-axis region thereof.

The eighth lens element 580 with negative refractive power has an object-side surface 581 being convex in a paraxial region thereof and an image-side surface 582 being concave in a paraxial region thereof. The eighth lens element 580 is made of a plastic material, and has the object-side surface 581 and the image-side surface 582 being both aspheric. Furthermore, the object-side surface 581 of the eighth lens element 580 includes four inflection points and a critical point in an off-axis region thereof, and the image-side surface 582 of the eighth lens element 580 includes three inflection points and a critical point in an off-axis region thereof.

The filter 590 is made of a glass material and disposed between the eighth lens element 580 and the image surface 595 and will not affect a focal length of the photographing optical lens assembly.

The detailed optical data of the 5th embodiment are shown in Table 9 and the aspheric surface data are shown in Table 10 below.

TABLE 9

5th Embodiment
f = 6.99 mm, Fno = 2.00, HFOV = 46.5 deg.

| Surface # | | Curvature Radius | | Thickness | Material | Index | Abbe # | Focal Length |
|---|---|---|---|---|---|---|---|---|
| 0 | Object | Plano | | 2000.000 | | | | |
| 1 | Ape. Stop | Plano | | −0.523 | | | | |
| 2 | Lens 1 | 3.016 | ASP | 0.659 | Plastic | 1.529 | 58.1 | 11.01 |
| 3 | | 5.780 | ASP | 0.316 | | | | |
| 4 | Lens 2 | 7.145 | ASP | 0.335 | Plastic | 1.656 | 21.3 | −19.08 |
| 5 | | 4.464 | ASP | 0.410 | | | | |
| 6 | Stop | Plano | | −0.358 | | | | |
| 7 | Lens 3 | 5.686 | ASP | 0.692 | Plastic | 1.529 | 58.1 | 10.43 |
| 8 | | −177.874 | ASP | 0.590 | | | | |
| 9 | Lens 4 | −301.205 | ASP | 0.430 | Plastic | 1.669 | 19.5 | −181.11 |
| 10 | | 202.840 | ASP | 0.459 | | | | |
| 11 | Lens 5 | −4.328 | ASP | 0.559 | Plastic | 1.566 | 37.4 | 160.02 |
| 12 | | −4.323 | ASP | 0.106 | | | | |
| 13 | Lens 6 | 4.382 | ASP | 0.541 | Plastic | 1.544 | 56.0 | −122.70 |
| 14 | | 3.933 | ASP | 0.757 | | | | |
| 15 | Lens 7 | 4.318 | ASP | 0.677 | Plastic | 1.544 | 56.0 | 9.77 |
| 16 | | 21.778 | ASP | 0.627 | | | | |
| 17 | Lens 8 | 13.925 | ASP | 0.699 | Plastic | 1.534 | 55.9 | −5.77 |
| 18 | | 2.479 | ASP | 0.800 | | | | |
| 19 | Filter | Plano | | 0.145 | Glass | 1.517 | 64.2 | — |
| 20 | | Plano | | 0.371 | | | | |
| 21 | Image | Plano | | — | | | | |

Reference wavelength is 587.6 nm (d-line).
Effective radius of Surface 6 (Stop 501) is 1.892 mm.

TABLE 10

Aspheric Coefficients

| Surface # | 2 | 3 | 4 | 5 | 7 | 8 |
|---|---|---|---|---|---|---|
| k = | 5.0182E−01 | −4.4897E+00 | −9.4924E−01 | −1.0254E+01 | 8.0163E−02 | 9.9000E+01 |
| A4 = | −2.1978E−03 | 1.4306E−03 | −1.6806E−02 | 9.5793E−04 | 6.0575E−03 | 2.3242E−04 |
| A6 = | −6.4630E−04 | −2.3696E−03 | −1.9341E−03 | −7.8317E−03 | −2.7215E−03 | −1.2842E−03 |
| A8 = | −4.3385E−05 | 1.2911E−03 | 3.3918E−03 | 1.5076E−03 | −4.1085E−03 | 2.9628E−03 |
| A10 = | −4.3382E−05 | −7.8537E−04 | −1.5630E−03 | 1.4978E−03 | 4.4577E−03 | −2.3007E−03 |
| A12 = | −2.1956E−05 | 1.2467E−04 | 2.6479E−04 | −1.1367E−03 | −1.9540E−03 | 9.8372E−04 |
| A14 = | | −1.8196E−07 | 3.5450E−05 | 3.5446E−04 | 4.3179E−04 | −2.3491E−04 |
| A16 = | | | −9.5963E−06 | −4.0090E−05 | −3.7307E−05 | 2.4149E−05 |

| Surface # | 9 | 10 | 11 | 12 | 13 | 14 |
|---|---|---|---|---|---|---|
| k = | 9.9000E+01 | −9.9000E+01 | 4.7211E−01 | −5.4982E+00 | −1.2693E+01 | −4.9577E+00 |
| A4 = | −2.2270E−02 | −1.1128E−02 | 2.2268E−02 | 1.7568E−02 | 1.0001E−02 | −2.4035E−02 |
| A6 = | 2.2657E−03 | −3.8575E−03 | −1.1623E−02 | −1.6872E−02 | −2.6428E−03 | 1.3514E−02 |
| A8 = | −4.8938E−03 | 3.0781E−03 | 5.6177E−03 | 5.9457E−03 | 4.0171E−04 | −4.0379E−03 |
| A10 = | 2.3547E−03 | −2.2292E−03 | −1.8937E−03 | −1.3450E−03 | −1.5048E−04 | 6.8029E−04 |
| A12 = | −6.2373E−04 | 9.0821E−04 | 4.3657E−04 | 2.2742E−04 | 3.3192E−05 | −7.1616E−05 |
| A14 = | 6.7973E−05 | −2.1193E−04 | −6.5024E−05 | −2.5189E−05 | −3.9104E−06 | 4.7615E−06 |
| A16 = | −6.2532E−07 | 2.6504E−05 | 5.7144E−06 | 1.5151E−06 | 2.5286E−07 | −1.9236E−07 |
| A18 = | | −1.3122E−06 | −2.3101E−07 | −3.6823E−08 | −8.4114E−09 | 4.2806E−09 |
| A20 = | | | | | 1.1195E−10 | −4.0062E−11 |

| Surface # | 15 | 16 | 17 | 18 |
|---|---|---|---|---|
| k = | −1.0199E+00 | 8.1285E+00 | −5.3656E−02 | −6.3098E+00 |
| A4 = | 2.7629E−03 | 2.5326E−02 | −4.6647E−02 | −2.2570E−02 |
| A6 = | −5.1072E−03 | −7.4254E−03 | 9.4215E−03 | 3.8582E−03 |
| A8 = | 9.1489E−04 | 7.9286E−04 | −1.0018E−03 | −4.0113E−04 |
| A10 = | −1.5687E−04 | −4.0146E−05 | 6.4434E−05 | 2.6663E−05 |
| A12 = | 1.9077E−05 | 5.9918E−07 | −2.6478E−06 | −1.1683E−06 |
| A14 = | −1.3378E−06 | 3.6185E−08 | 7.0278E−08 | 3.3353E−08 |
| A16 = | 5.2269E−08 | −2.0729E−09 | −1.1692E−09 | −5.9317E−10 |
| A18 = | −1.0649E−09 | 4.1682E−11 | 1.1113E−11 | 5.9505E−12 |
| A20 = | 8.8396E−12 | −3.0429E−13 | −4.6127E−14 | −2.5712E−14 |

In the 5th embodiment, the equation of the aspheric surface profiles of the aforementioned lens elements is the same as the equation of the 1 st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 6.99 | R9/f | −0.62 |
| Fno | 2.00 | (R15 + R16)/(R15 − R16) | 1.43 |
| HFOV [deg.] | 46.5 | f/f1 | 0.64 |
| V5 | 37.4 | f/f2 | −0.37 |
| V6 | 56.0 | f/f3 | 0.67 |
| (Vi/Ni)min | 11.65 | f/f4 | −0.04 |
| Vmin | 19.5 | f/f5 | 0.04 |
| ΣCT/ΣAT | 1.58 | f/f6 | −0.06 |
| CT1/CT3 | 0.95 | f/f7 | 0.72 |
| CTmax/CTmin | 2.09 | f/f8 | −1.21 |
| (T12 + T34)/T23 | 17.42 | f/ImgH | 0.88 |
| (T12 + T34 + T45 + T67 + T78)/(T23 + T56) | 17.40 | f1/f3 | 1.06 |
| (T67 + T78)/CT7 | 2.04 | f3/f7 | 1.07 |
| (T67 − T78)/(T67 + T78) | 0.09 | |f7/f8| | 1.69 |
| TD/T45 | 16.34 | ImgH/BL | 6.03 |
| TD/(T67 + T78) | 5.42 | Y82/Y11 | 3.60 |
| TL [mm] | 8.81 | Yc62/Yc61 | 1.10 |
| TL/f | 1.26 | Yc72/Yc71 | 1.11 |
| TL/ImgH | 1.11 | Yc82/Y82 | 0.43 |
| R5/R6 | −0.03 | | |

6th Embodiment

Figure 11:
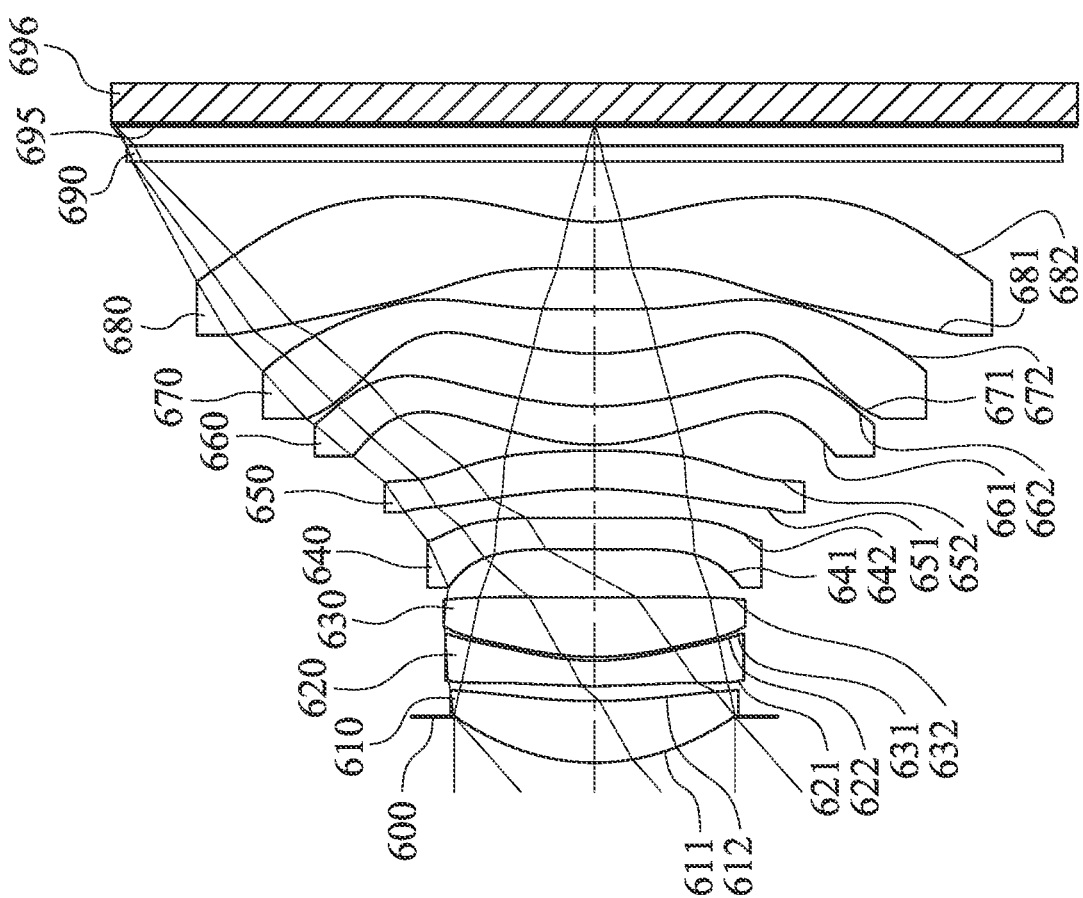
FIG. 11 is a schematic view of an imaging apparatus according to the 6th embodiment of the present disclosure.
Figure 12:
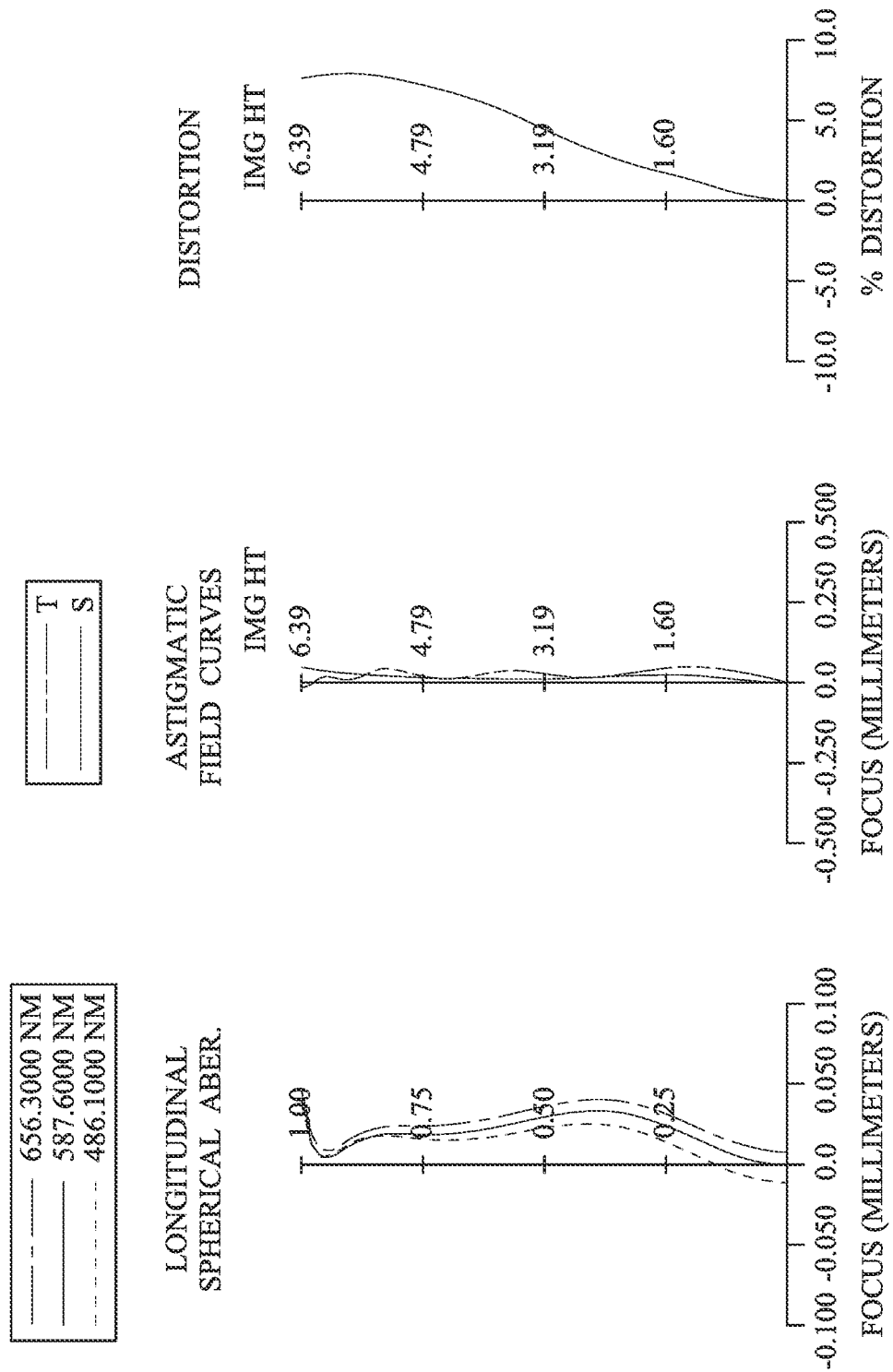
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows, in order from left to right, spherical aberration curves, astigmatic field curves and a distortion curve of the imaging apparatus of the 6th embodiment. In FIG. 11, the imaging apparatus according to the 6th embodiment includes a photographing optical lens assembly (its reference number is omitted) and an image sensor 696. The photographing optical lens assembly includes, in order from an object side to an image side along an optical path, an aperture stop 600, a first lens element 610, a second lens element 620, a third lens element 630, a fourth lens element 640, a fifth lens element 650, a sixth lens element 660, a seventh lens element 670, an eighth lens element 680, a filter 690 and an image surface 695, wherein the image sensor 696 is disposed on the image surface 695 of the photographing optical lens assembly. The photographing optical lens assembly includes eight lens elements (610, 620, 630, 640, 650, 660, 670, 680) without additional one or more lens elements inserted between the first lens element 610 and the eighth lens element 680.

The first lens element 610 with positive refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric. Furthermore, the object-side surface 611 of the first lens element 610 includes an inflection point in an off-axis region thereof, and the image-side surface 612 of the first lens element 610 includes two inflection points in an off-axis region thereof.

The second lens element 620 with negative refractive power has an object-side surface 621 being convex in a paraxial region thereof and an image-side surface 622 being concave in a paraxial region thereof. The second lens element 620 is made of a plastic material, and has the object-side surface 621 and the image-side surface 622 being both aspheric. Furthermore, the object-side surface 621 of the second lens element 620 includes two inflection points and two critical points in an off-axis region thereof, and the image-side surface 622 of the second lens element 620 includes three inflection points in an off-axis region thereof.

The third lens element 630 with positive refractive power has an object-side surface 631 being convex in a paraxial region thereof and an image-side surface 632 being concave in a paraxial region thereof. The third lens element 630 is made of a plastic material, and has the object-side surface 631 and the image-side surface 632 being both aspheric. Furthermore, the object-side surface 631 of the third lens element 630 includes two inflection points in an off-axis region thereof, and the image-side surface 632 of the third lens element 630 includes two inflection points and a critical point in an off-axis region thereof.

The fourth lens element 640 with positive refractive power has an object-side surface 641 being convex in a paraxial region thereof and an image-side surface 642 being concave in a paraxial region thereof. The fourth lens element 640 is made of a plastic material, and has the object-side surface 641 and the image-side surface 642 being both aspheric. Furthermore, the object-side surface 641 of the fourth lens element 640 includes an inflection point and a critical point in an off-axis region thereof, and the image-side surface 642 of the fourth lens element 640 includes two inflection points and a critical point in an off-axis region thereof.

The fifth lens element 650 with negative refractive power has an object-side surface 651 being concave in a paraxial region thereof and an image-side surface 652 being convex in a paraxial region thereof. The fifth lens element 650 is made of a plastic material, and has the object-side surface 651 and the image-side surface 652 being both aspheric. Furthermore, the object-side surface 651 of the fifth lens element 650 includes two inflection points in an off-axis region thereof, and the image-side surface 652 of the fifth lens element 650 includes two inflection points in an off-axis region thereof.

The sixth lens element 660 with positive refractive power has an object-side surface 661 being convex in a paraxial region thereof and an image-side surface 662 being concave in a paraxial region thereof. The sixth lens element 660 is made of a plastic material, and has the object-side surface 661 and the image-side surface 662 being both aspheric. Furthermore, the object-side surface 661 of the sixth lens element 660 includes two inflection points and a critical point in an off-axis region thereof, and the image-side surface 662 of the sixth lens element 660 includes an inflection point and a critical point in an off-axis region thereof.

The seventh lens element 670 with positive refractive power has an object-side surface 671 being convex in a paraxial region thereof and an image-side surface 672 being convex in a paraxial region thereof. The seventh lens element 670 is made of a plastic material, and has the object-side surface 671 and the image-side surface 672 being both aspheric. Furthermore, the object-side surface 671 of the seventh lens element 670 includes two inflection points and a critical point in an off-axis region thereof, and the image-side surface 672 of the seventh lens element 670 includes two inflection points and two critical points in an off-axis region thereof.

The eighth lens element 680 with negative refractive power has an object-side surface 681 being convex in a paraxial region thereof and an image-side surface 682 being concave in a paraxial region thereof. The eighth lens element 680 is made of a plastic material, and has the object-side surface 681 and the image-side surface 682 being both aspheric. Furthermore, the object-side surface 681 of the eighth lens element 680 includes four inflection points and a critical point in an off-axis region thereof, and the image-side surface 682 of the eighth lens element 680 includes two inflection points and a critical point in an off-axis region thereof.

The filter 690 is made of a glass material and disposed between the eighth lens element 680 and the image surface 695 and will not affect a focal length of the photographing optical lens assembly.

The detailed optical data of the 6th embodiment are shown in Table 11 and the aspheric surface data are shown in Table 12 below.

TABLE 11

6th Embodiment
f = 6.69 mm, Fno = 1.80, HFOV = 41.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.611 | | | | |
| 2 | Lens 1 | 3.015 | ASP | 0.817 | Plastic | 1.545 | 56.1 | |
| 3 | | 8.245 | ASP | 0.198 | | | | |
| 4 | Lens 2 | 10.189 | ASP | 0.335 | Plastic | 1.587 | 28.3 | −8.40 |
| 5 | | 3.284 | ASP | 0.051 | | | | |
| 6 | Lens 3 | 3.906 | ASP | 0.787 | Plastic | 1.544 | 56.0 | 7.69 |
| 7 | | 55.114 | ASP | 0.636 | | | | |
| 8 | Lens 4 | 86.834 | ASP | 0.416 | Plastic | 1.686 | 18.4 | 321.39 |
| 9 | | 142.965 | ASP | 0.385 | | | | |
| 10 | Lens 5 | −4.724 | ASP | 0.509 | Plastic | 1.582 | 30.2 | −17.06 |
| 11 | | −9.362 | ASP | 0.077 | | | | |
| 12 | Lens 6 | 2.944 | ASP | 0.506 | Plastic | 1.544 | 56.0 | 19.37 |
| 13 | | 3.838 | ASP | 0.700 | | | | |
| 14 | Lens 7 | 4.382 | ASP | 0.585 | Plastic | 1.544 | 56.0 | 7.92 |
| 15 | | −240.553 | ASP | 0.540 | | | | |
| 16 | Lens 8 | 15.952 | ASP | 0.617 | Plastic | 1.544 | 56.0 | −5.12 |
| 17 | | 2.340 | ASP | 0.800 | | | | |
| 18 | Filter | Plano | | 0.210 | Glass | 1.517 | 64.2 | — |
| 19 | | Plano | | 0.278 | | | | |
| 20 | Image | Plano | | — | | | | |

Reference wavelength is 587.6 nm (d-line).

TABLE 12

Aspheric Coefficients

| Surface # | 2 | 3 | 4 | 5 | 6 | 7 |
|---|---|---|---|---|---|---|
| k = | 5.8585E−01 | −5.6233E+00 | −2.9899E+00 | −8.6899E+00 | −5.3576E+00 | −6.4086E+01 |
| A4 = | −2.0553E−03 | 2.5094E−03 | −1.5469E−02 | −2.8887E−04 | −3.3598E−03 | −2.9267E−03 |
| A6 = | −8.5374E−04 | −5.2151E−03 | −1.1928E−03 | −2.8505E−03 | 3.3510E−03 | −2.3078E−03 |
| A8 = | 9.4776E−05 | 3.2967E−03 | 3.3948E−03 | −8.0514E−04 | −5.7909E−03 | 3.4195E−03 |
| A10 = | −4.2864E−05 | −1.6685E−03 | −2.1708E−03 | 6.7523E−04 | 3.1751E−03 | −2.4531E−03 |
| A12 = | −1.2489E−05 | 3.7010E−04 | 6.3468E−04 | −2.3301E−04 | −9.9382E−04 | 9.8585E−04 |
| A14 = | | −2.5845E−05 | −6.7060E−05 | 8.7809E−05 | 1.9786E−04 | −2.1598E−04 |
| A16 = | | | 1.1733E−06 | −1.2678E−05 | −1.6856E−05 | 1.9357E−05 |

| Surface # | 8 | 9 | 10 | 11 | 12 | 13 |
|---|---|---|---|---|---|---|
| k = | −2.9072E+01 | −9.9000E+01 | −6.1818E−01 | −1.6262E+00 | −9.1215E+00 | −4.5684E+00 |
| A4 = | −1.5959E−02 | 7.4230E−03 | 5.7620E−02 | 1.8968E−02 | 3.5108E−03 | −2.7277E−02 |
| A6 = | −7.5269E−03 | −2.3199E−02 | −4.6361E−02 | −2.8864E−02 | 2.1121E−04 | 1.7333E−02 |
| A8 = | 2.4598E−03 | 1.7281E−02 | 2.6305E−02 | 1.4011E−02 | −4.2881E−04 | −5.8033E−03 |
| A10 = | −1.6808E−03 | −9.6731E−03 | −9.9381E−03 | −4.0193E−03 | −3.3237E−05 | 1.1006E−03 |
| A12 = | 7.9122E−04 | 3.4676E−03 | 2.4442E−03 | 7.4001E−04 | 2.8164E−05 | −1.3138E−04 |
| A14 = | −1.9513E−04 | −7.3821E−04 | −3.7113E−04 | −8.1704E−05 | −4.8409E−06 | 9.9786E−06 |
| A16 = | 1.7301E−05 | 8.4142E−05 | 3.1488E−05 | 4.8015E−06 | 3.9941E−07 | −4.6599E−07 |
| A18 = | | −3.8688E−06 | −1.1445E−06 | −1.1418E−07 | −1.6061E−08 | 1.2225E−08 |
| A20 = | | | | | 2.4996E−10 | −1.3890E−10 |

| Surface # | 14 | 15 | 16 | 17 |
|---|---|---|---|---|
| k = | −7.0677E−01 | −9.9000E+01 | 3.5597E+00 | −5.3890E+00 |
| A4 = | 4.2068E−03 | 3.6821E−02 | −5.2411E−02 | −3.2520E−02 |

TABLE 12-continued

| Aspheric Coefficients | | | | |
|---|---|---|---|---|
| A6 = | −7.2445E−03 | −1.2677E−02 | 1.0563E−02 | 7.2672E−03 |
| A8 = | 1.5452E−03 | 2.1138E−03 | −9.5496E−04 | −1.0372E−03 |
| A10 = | −2.9292E−04 | −2.4925E−04 | 2.8361E−05 | 9.6306E−05 |
| A12 = | 3.7951E−05 | 2.2265E−05 | 2.1017E−06 | −5.9170E−06 |
| A14 = | −2.8441E−06 | −1.4136E−06 | −2.4278E−07 | 2.3718E−07 |
| A16 = | 1.1910E−07 | 5.7760E−08 | 1.0340E−08 | −5.9294E−09 |
| A18 = | −2.5965E−09 | −1.3375E−09 | −2.1475E−10 | 8.3590E−11 |
| A20 = | 2.2950E−11 | 1.3260E−11 | 1.8048E−12 | −5.0603E−13 |

In the 6th embodiment, the equation of the aspheric surface profiles of the aforementioned lens elements is the same as the equation of the 1 st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 6.69 | R9/f | −0.71 |
| Fno | 1.80 | (R15 + R16)/(R15 − R16) | 1.34 |
| HFOV [deg.] | 41.5 | f/f1 | 0.81 |
| V5 | 30.2 | f/f2 | −0.80 |
| V6 | 56.0 | f/f3 | 0.87 |
| (Vi/Ni)min | 10.90 | f/f4 | 0.02 |
| Vmin | 18.4 | f/f5 | −0.39 |
| ΣCT/ΣAT | 1.77 | f/f6 | 0.35 |
| CT1/CT3 | 1.04 | f/f7 | 0.85 |
| CTmax/CTmin | 2.44 | f/f8 | −1.31 |
| (T12 + T34)/T23 | 16.35 | f/ImgH | 1.05 |
| (T12 + T34 + T45 + T67 + T78)/(T23 + T56) | 19.21 | f1/f3 | 1.08 |
| (T67 + T78)/CT7 | 2.12 | f3/f7 | 0.97 |
| (T67 − T78)/(T67 + T78) | 0.13 | |f7/f8| | 1.55 |
| TD/T45 | 18.59 | ImgH/BL | 4.96 |
| TD/(T67 + T78) | 5.77 | Y82/Y11 | 2.82 |
| TL [mm] | 8.45 | Yc62/Yc61 | 1.10 |
| TL/f | 1.26 | Yc72/Yc71 | 0.09, 1.08 |
| TL/ImgH | 1.32 | Yc82/Y82 | 0.47 |
| R5/R6 | 0.07 | | |

7th Embodiment

Figure 13:
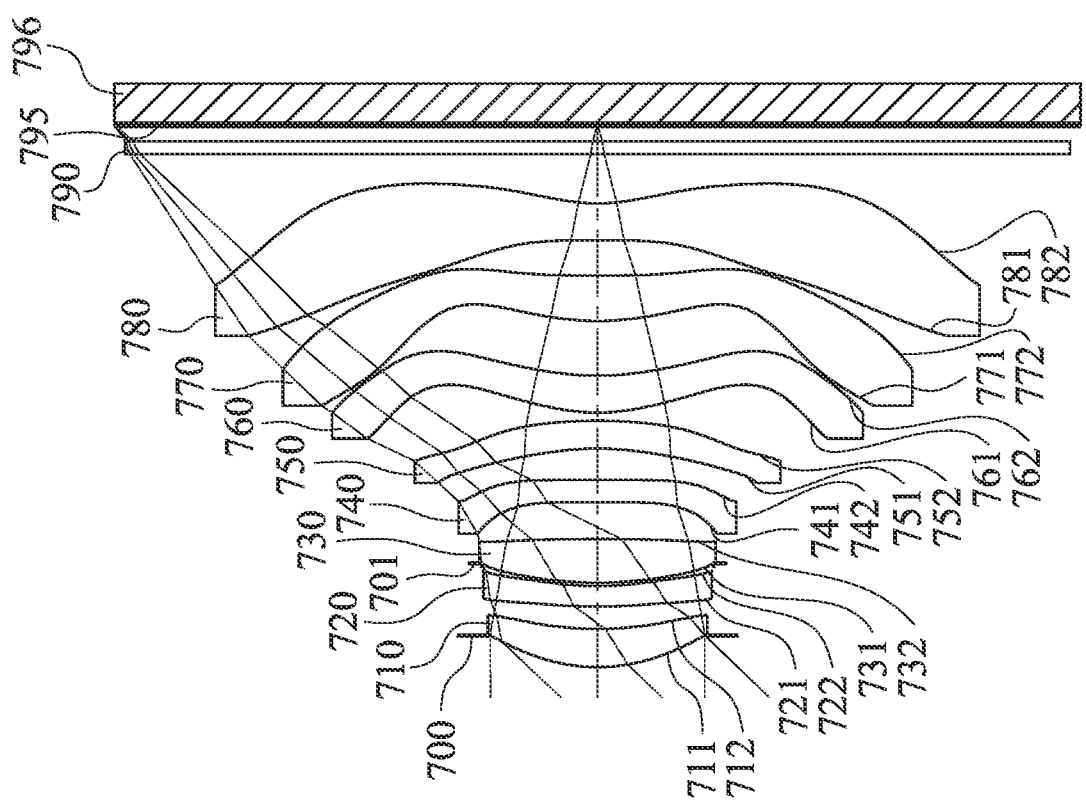
FIG. 13 is a schematic view of an imaging apparatus according to the 7th embodiment of the present disclosure.
Figure 14:
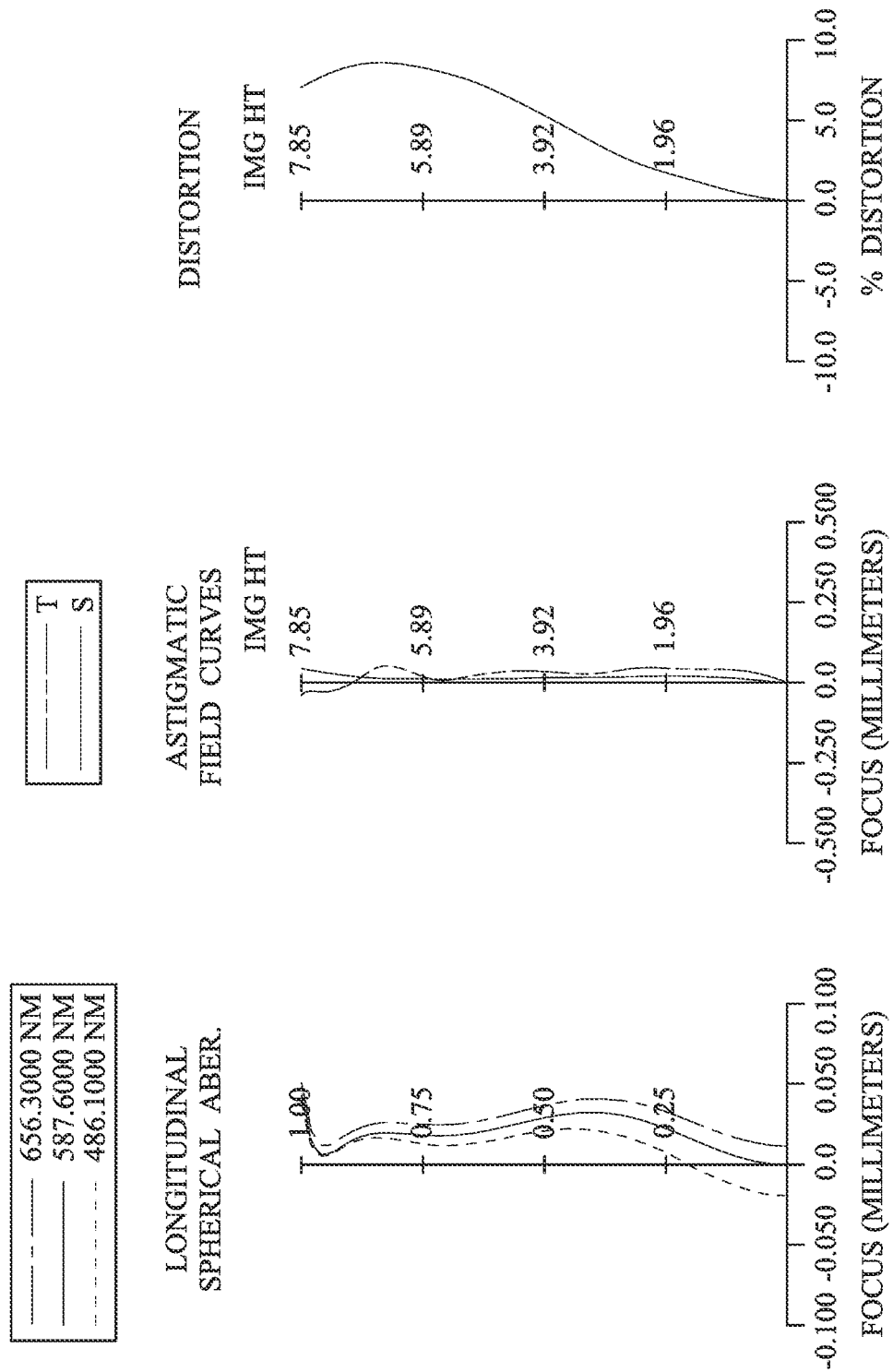
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows, in order from left to right, spherical aberration curves, astigmatic field curves and a distortion curve of the imaging apparatus of the 7th embodiment. In FIG. 13, the imaging apparatus according to the 7th embodiment includes a photographing optical lens assembly (its reference number is omitted) and an image sensor 796. The photographing optical lens assembly includes, in order from an object side to an image side along an optical path, an aperture stop 700, a first lens element 710, a second lens element 720, a stop 701, a third lens element 730, a fourth lens element 740, a fifth lens element 750, a sixth lens element 760, a seventh lens element 770, an eighth lens element 780, a filter 790 and an image surface 795, wherein the image sensor 796 is disposed on the image surface 795 of the photographing optical lens assembly. The photographing optical lens assembly includes eight lens elements (710, 720, 730, 740, 750, 760, 770, 780) without additional one or more lens elements inserted between the first lens element 710 and the eighth lens element 780.

The first lens element 710 with positive refractive power has an object-side surface 711 being convex in a paraxial region thereof and an image-side surface 712 being concave in a paraxial region thereof. The first lens element 710 is made of a plastic material, and has the object-side surface 711 and the image-side surface 712 being both aspheric. Furthermore, the object-side surface 711 of the first lens element 710 includes an inflection point in an off-axis region thereof, and the image-side surface 712 of the first lens element 710 includes an inflection point in an off-axis region thereof.

The second lens element 720 with negative refractive power has an object-side surface 721 being convex in a paraxial region thereof and an image-side surface 722 being concave in a paraxial region thereof. The second lens element 720 is made of a plastic material, and has the object-side surface 721 and the image-side surface 722 being both aspheric. Furthermore, the object-side surface 721 of the second lens element 720 includes two inflection points in an off-axis region thereof, and the image-side surface 722 of the second lens element 720 includes three inflection points in an off-axis region thereof.

The third lens element 730 with positive refractive power has an object-side surface 731 being convex in a paraxial region thereof and an image-side surface 732 being convex in a paraxial region thereof. The third lens element 730 is made of a plastic material, and has the object-side surface 731 and the image-side surface 732 being both aspheric. Furthermore, the image-side surface 732 of the third lens element 730 includes an inflection point and a critical point in an off-axis region thereof.

The fourth lens element 740 with negative refractive power has an object-side surface 741 being concave in a paraxial region thereof and an image-side surface 742 being convex in a paraxial region thereof. The fourth lens element 740 is made of a plastic material, and has the object-side surface 741 and the image-side surface 742 being both aspheric. Furthermore, the image-side surface 742 of the fourth lens element 740 includes an inflection point in an off-axis region thereof.

The fifth lens element 750 with negative refractive power has an object-side surface 751 being concave in a paraxial region thereof and an image-side surface 752 being convex in a paraxial region thereof. The fifth lens element 750 is made of a plastic material, and has the object-side surface 751 and the image-side surface 752 being both aspheric. Furthermore, the image-side surface 752 of the fifth lens element 750 includes two inflection points in an off-axis region thereof.

The sixth lens element 760 with positive refractive power has an object-side surface 761 being convex in a paraxial region thereof and an image-side surface 762 being concave in a paraxial region thereof. The sixth lens element 760 is made of a plastic material, and has the object-side surface 761 and the image-side surface 762 being both aspheric. Furthermore, the object-side surface 761 of the sixth lens element 760 includes two inflection points and a critical point in an off-axis region thereof, and the image-side surface 762 of the sixth lens element 760 includes an inflection point and a critical point in an off-axis region thereof.

The seventh lens element 770 with positive refractive power has an object-side surface 771 being convex in a paraxial region thereof and an image-side surface 772 being convex in a paraxial region thereof. The seventh lens element 770 is made of a plastic material, and has the object-side surface 771 and the image-side surface 772 being both aspheric. Furthermore, the object-side surface 771 of the seventh lens element 770 includes four inflection points and a critical point in an off-axis region thereof, and the image-side surface 772 of the seventh lens element 770 includes three inflection points and two critical points in an off-axis region thereof.

The eighth lens element 780 with negative refractive power has an object-side surface 781 being concave in a paraxial region thereof and an image-side surface 782 being concave in a paraxial region thereof. The eighth lens element 780 is made of a plastic material, and has the object-side surface 781 and the image-side surface 782 being both aspheric. Furthermore, the object-side surface 781 of the eighth lens element 780 includes three inflection points in an off-axis region thereof, and the image-side surface 782 of the eighth lens element 780 includes two inflection points and a critical point in an off-axis region thereof.

The filter 790 is made of a glass material and disposed between the eighth lens element 780 and the image surface 795 and will not affect a focal length of the photographing optical lens assembly.

The detailed optical data of the 7th embodiment are shown in Table 13 and the aspheric surface data are shown in Table 14 below.

TABLE 13

7th Embodiment
f = 6.93 mm, Fno = 2.00, HFOV = 46.4 deg.

| Surface # | | Curvature Radius | | Thickness | Material | Index | Abbe # | Focal Length |
|---|---|---|---|---|---|---|---|---|
| 0 | Object | Plano | | 2000.000 | | | | |
| 1 | Ape. Stop | Plano | | −0.510 | | | | |
| 2 | Lens 1 | 3.016 | ASP | 0.618 | Plastic | 1.545 | 56.1 | 11.61 |
| 3 | | 5.348 | ASP | 0.362 | | | | |
| 4 | Lens 2 | 7.183 | ASP | 0.335 | Plastic | 1.669 | 19.5 | −22.24 |
| 5 | | 4.754 | ASP | 0.371 | | | | |
| 6 | Stop | Plano | | −0.315 | | | | |
| 7 | Lens 3 | 6.657 | ASP | 0.711 | Plastic | 1.544 | 56.0 | 10.08 |
| 8 | | −30.026 | ASP | 0.600 | | | | |
| 9 | Lens 4 | −92.547 | ASP | 0.362 | Plastic | 1.669 | 19.5 | −218.23 |
| 10 | | −253.165 | ASP | 0.511 | | | | |
| 11 | Lens 5 | −4.054 | ASP | 0.452 | Plastic | 1.614 | 26.0 | −15.73 |
| 12 | | −7.287 | ASP | 0.130 | | | | |
| 13 | Lens 6 | 3.100 | ASP | 0.602 | Plastic | 1.566 | 37.4 | 17.07 |
| 14 | | 4.245 | ASP | 0.891 | | | | |
| 15 | Lens 7 | 4.683 | ASP | 0.740 | Plastic | 1.562 | 44.6 | 8.15 |
| 16 | | −194.553 | ASP | 0.572 | | | | |
| 17 | Lens 8 | −332.226 | ASP | 0.600 | Plastic | 1.566 | 37.4 | −4.93 |
| 18 | | 2.817 | ASP | 0.800 | | | | |
| 19 | Filter | Plano | | 0.210 | Glass | 1.517 | 64.2 | — |
| 20 | | Plano | | 0.265 | | | | |
| 21 | Image | Plano | | — | | | | |

Reference wavelength is 587.6 nm (d-line).
Effective radius of Surface 6 (Stop 701) is 1.890 mm.

TABLE 14

Aspheric Coefficients

| Surface # | 2 | 3 | 4 | 5 | 7 | 8 |
|---|---|---|---|---|---|---|
| k = | 4.8311E−01 | −3.2906E+00 | −6.5001E−01 | −1.2490E+01 | 6.7863E−01 | −4.7577E+01 |
| A4 = | −2.1264E−03 | 4.0878E−04 | −1.9779E−02 | −2.1316E−04 | 5.9391E−03 | 2.3008E−03 |
| A6 = | −8.9466E−04 | −1.2798E−04 | 1.2710E−03 | −3.7746E−03 | −7.3346E−04 | −4.3691E−03 |
| A8 = | 7.8660E−05 | −5.5959E−04 | 6.6653E−04 | −4.4191E−03 | −8.6569E−03 | 5.2646E−03 |
| A10 = | −6.9728E−05 | 2.8039E−04 | 4.5605E−04 | 6.5554E−03 | 8.2553E−03 | −3.8563E−03 |
| A12 = | −2.3746E−05 | −1.8765E−04 | −5.7337E−04 | −3.2835E−03 | −3.4161E−03 | 1.6293E−03 |
| A14 = | | 3.2504E−05 | 2.0304E−04 | 7.9226E−04 | 7.0011E−04 | −3.6856E−04 |
| A16 = | | | −2.2498E−05 | −7.4538E−05 | −5.6393E−05 | 3.4780E−05 |

| Surface # | 9 | 10 | 11 | 12 | 13 | 14 |
|---|---|---|---|---|---|---|
| k = | 9.9000E+01 | 9.9000E+01 | −2.2045E−01 | 5.2687E−02 | −1.2333E+01 | −4.2621E+00 |
| A4 = | −1.1400E−02 | 3.8320E−03 | 5.2005E−02 | 1.6428E−02 | 9.4881E−03 | −2.2760E−02 |
| A6 = | −9.1639E−03 | −1.4093E−02 | −3.7673E−02 | −1.9743E−02 | −2.4012E−03 | 1.2852E−02 |
| A8 = | 3.2456E−03 | 8.1402E−03 | 1.9633E−02 | 8.1897E−03 | 3.7913E−04 | −3.8848E−03 |

TABLE 14-continued

| | | | Aspheric Coefficients | | | |
|---|---|---|---|---|---|---|
| A10 = | −2.0107E−03 | −4.1935E−03 | −6.7983E−03 | −2.0981E−03 | −1.4583E−04 | 6.5937E−04 |
| A12 = | 7.6164E−04 | 1.4088E−03 | 1.5183E−03 | 3.5894E−04 | 3.1430E−05 | −6.9967E−05 |
| A14 = | −1.5575E−04 | −2.8182E−04 | −2.0895E−04 | −3.7494E−05 | −3.6068E−06 | 4.6980E−06 |
| A16 = | 1.3432E−05 | 3.0759E−05 | 1.6158E−05 | 2.0918E−06 | 2.2808E−07 | −1.9208E−07 |
| A18 = | | −1.3669E−06 | −5.4277E−07 | −4.7179E−08 | −7.4627E−09 | 4.3337E−09 |
| A20 = | | | | | 9.8344E−11 | −4.1164E−11 |

| Surface # | 15 | 16 | 17 | 18 |
|---|---|---|---|---|
| k = | −1.0001E+00 | −9.9000E+01 | −9.9000E+01 | −6.9417E+00 |
| A4 = | 1.2034E−03 | 2.7784E−02 | −3.5084E−02 | −2.2514E−02 |
| A6 = | −4.5709E−03 | −7.9801E−03 | 6.7993E−03 | 4.0481E−03 |
| A8 = | 8.1874E−04 | 8.7054E−04 | −6.4820E−04 | −4.3439E−04 |
| A10 = | −1.5178E−04 | −4.6621E−05 | 3.4830E−05 | 2.9240E−05 |
| A12 = | 1.9640E−05 | 9.6463E−07 | −1.0925E−06 | −1.2807E−06 |
| A14 = | −1.4295E−06 | 2.0331E−08 | 1.9669E−08 | 3.6356E−08 |
| A16 = | 5.7328E−08 | −1.5332E−09 | −1.9509E−10 | −6.4368E−10 |
| A18 = | −1.1930E−09 | 2.9697E−11 | 1.1910E−12 | 6.4618E−12 |
| A20 = | 1.0089E−11 | −1.8557E−13 | −6.6992E−15 | −2.8139E−14 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 6.93 | R9/f | −0.58 |
| Fno | 2.00 | (R15 + R16)/(R15 − R16) | 0.98 |
| HFOV [deg.] | 46.4 | f/f1 | 0.60 |
| V5 | 26.0 | f/f2 | −0.31 |
| V6 | 37.4 | f/f3 | 0.69 |
| (Vi/Ni)min | 11.65 | f/f4 | −0.03 |
| Vmin | 19.5 | f/f5 | −0.44 |
| ΣCT/ΣAT | 1.42 | f/f6 | 0.41 |
| CT1/CT3 | 0.87 | f/f7 | 0.85 |
| CTmax/CTmin | 2.21 | f/f8 | −1.41 |
| (T12 + T34)/T23 | 17.18 | f/ImgH | 0.88 |
| (T12 + T34 + T45 + T67 + T78)/(T23 + T56) | 15.78 | f1/f3 | 1.15 |
| (T67 + T78)/CT7 | 1.98 | f3/f7 | 1.24 |
| (T67 − T78)/(T67 + T78) | 0.22 | \|f7/f8\| | 1.65 |
| TD/T45 | 14.76 | ImgH/BL | 6.16 |
| TD/(T67 + T78) | 5.16 | Y82/Y11 | 3.55 |
| TL [mm] | 8.82 | Yc62/Yc61 | 1.08 |
| TL/f | 1.27 | Yc72/Yc71 | 0.11, 1.04 |
| TL/ImgH | 1.12 | Yc82/Y82 | 0.45 |
| R5/R6 | −0.22 | | |

8th Embodiment

Figure 15:
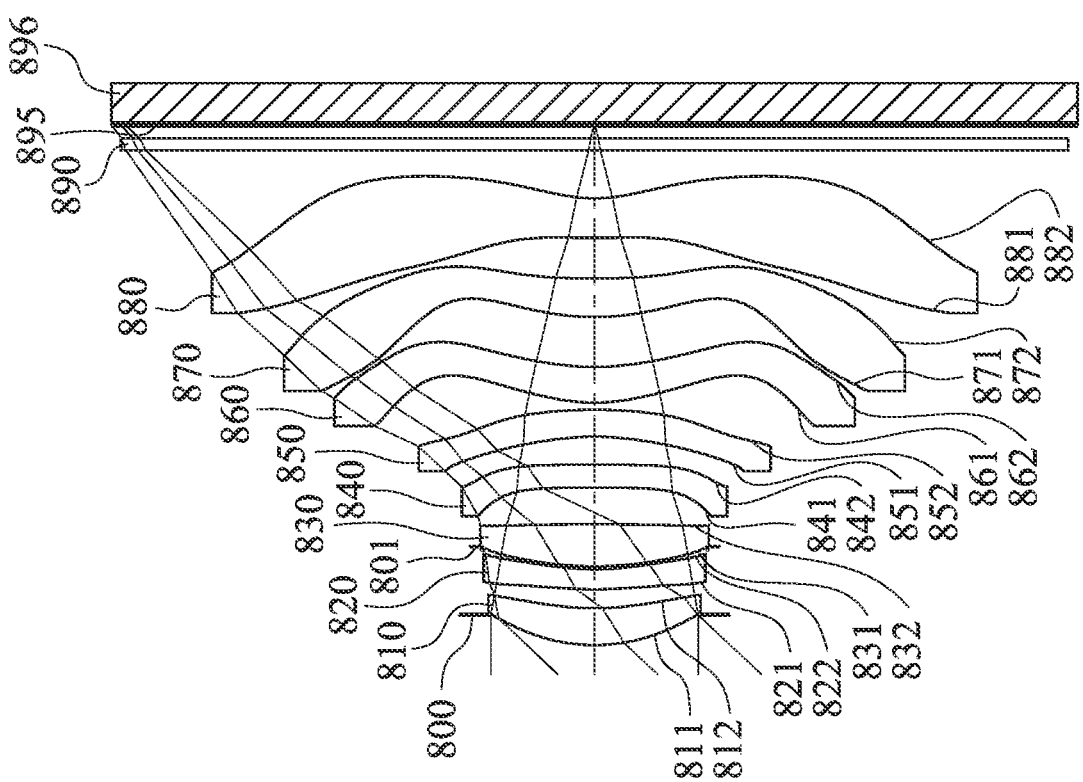
FIG. 15 is a schematic view of an imaging apparatus according to the 8th embodiment of the present disclosure.
Figure 16:
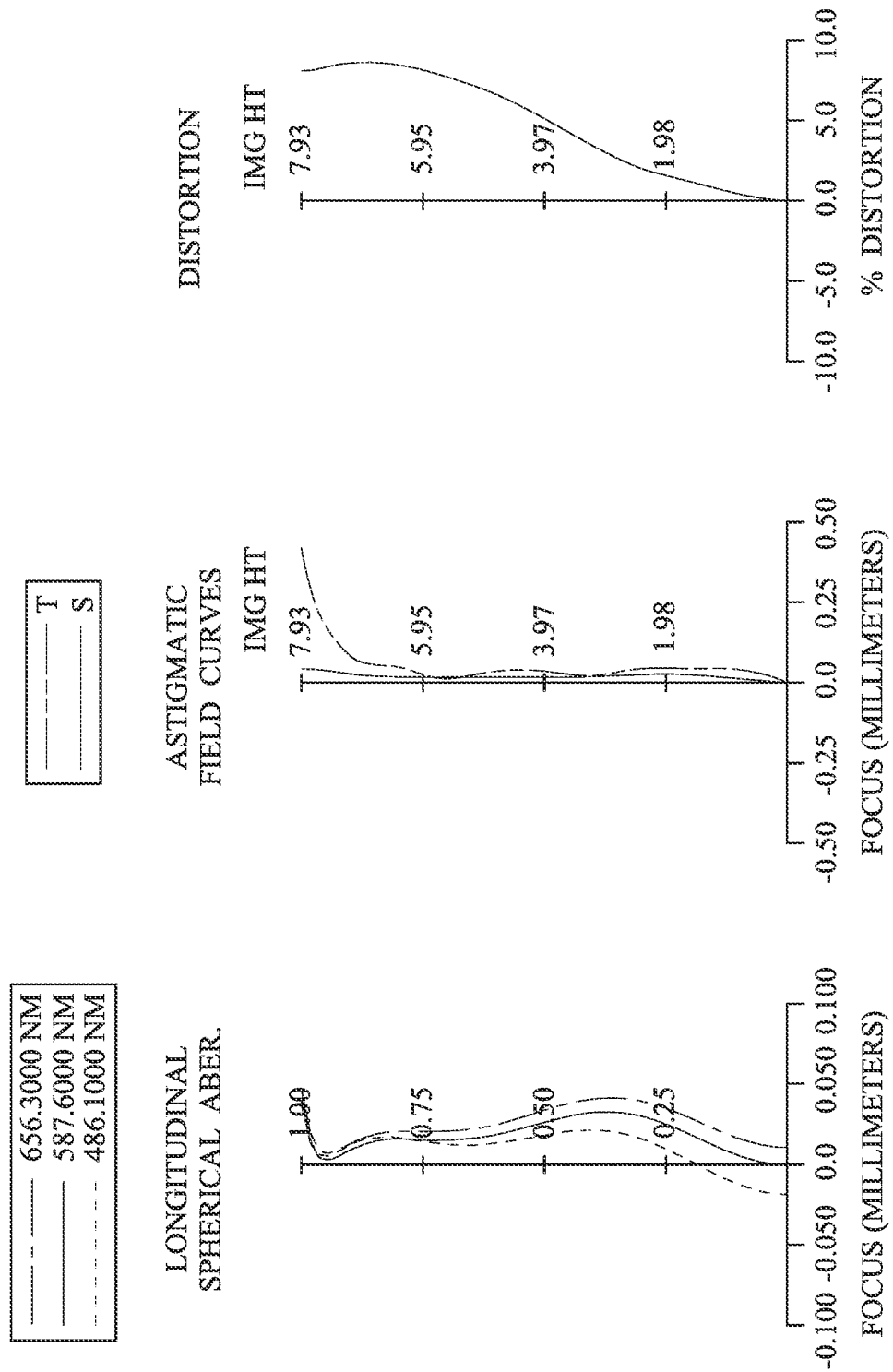
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows, in order from left to right, spherical aberration curves, astigmatic field curves and a distortion curve of the imaging apparatus of the 8th embodiment. In FIG. 15, the imaging apparatus according to the 8th embodiment includes a photographing optical lens assembly (its reference number is omitted) and an image sensor 896. The photographing optical lens assembly includes, in order from an object side to an image side along an optical path, an aperture stop 800, a first lens element 810, a second lens element 820, a stop 801, a third lens element 830, a fourth lens element 840, a fifth lens element 850, a sixth lens element 860, a seventh lens element 870, an eighth lens element 880, a filter 890 and an image surface 895, wherein the image sensor 896 is disposed on the image surface 895 of the photographing optical lens assembly. The photographing optical lens assembly includes eight lens elements (810, 820, 830, 840, 850, 860, 870, 880) without additional one or more lens elements inserted between the first lens element 810 and the eighth lens element 880.

The first lens element 810 with positive refractive power has an object-side surface 811 being convex in a paraxial region thereof and an image-side surface 812 being concave in a paraxial region thereof. The first lens element 810 is made of a plastic material, and has the object-side surface 811 and the image-side surface 812 being both aspheric. Furthermore, the object-side surface 811 of the first lens element 810 includes an inflection point in an off-axis region thereof, and the image-side surface 812 of the first lens element 810 includes two inflection points in an off-axis region thereof.

The second lens element 820 with negative refractive power has an object-side surface 821 being convex in a paraxial region thereof and an image-side surface 822 being concave in a paraxial region thereof. The second lens element 820 is made of a plastic material, and has the object-side surface 821 and the image-side surface 822 being both aspheric. Furthermore, the object-side surface 821 of the second lens element 820 includes two inflection points in an off-axis region thereof, and the image-side surface 822 of the second lens element 820 includes three inflection points in an off-axis region thereof.

The third lens element 830 with positive refractive power has an object-side surface 831 being convex in a paraxial region thereof and an image-side surface 832 being convex in a paraxial region thereof. The third lens element 830 is made of a plastic material, and has the object-side surface 831 and the image-side surface 832 being both aspheric. Furthermore, the image-side surface 832 of the third lens element 830 includes an inflection point and a critical point in an off-axis region thereof.

The fourth lens element 840 with positive refractive power has an object-side surface 841 being concave in a paraxial region thereof and an image-side surface 842 being convex in a paraxial region thereof. The fourth lens element 840 is made of a plastic material, and has the object-side surface 841 and the image-side surface 842 being both aspheric. Furthermore, the image-side surface 842 of the fourth lens element 840 includes an inflection point in an off-axis region thereof.

The fifth lens element 850 with negative refractive power has an object-side surface 851 being concave in a paraxial region thereof and an image-side surface 852 being convex in a paraxial region thereof. The fifth lens element 850 is made of a plastic material, and has the object-side surface 851 and the image-side surface 852 being both aspheric. Furthermore, the image-side surface 852 of the fifth lens element 850 includes two inflection points in an off-axis region thereof.

The sixth lens element 860 with positive refractive power has an object-side surface 861 being convex in a paraxial region thereof and an image-side surface 862 being concave in a paraxial region thereof. The sixth lens element 860 is made of a plastic material, and has the object-side surface 861 and the image-side surface 862 being both aspheric. Furthermore, the object-side surface 861 of the sixth lens element 860 includes two inflection points and a critical point in an off-axis region thereof, and the image-side surface 862 of the sixth lens element 860 includes an inflection point and a critical point in an off-axis region thereof.

The seventh lens element 870 with positive refractive power has an object-side surface 871 being convex in a paraxial region thereof and an image-side surface 872 being concave in a paraxial region thereof. The seventh lens element 870 is made of a plastic material, and has the object-side surface 871 and the image-side surface 872 being both aspheric. Furthermore, the object-side surface 871 of the seventh lens element 870 includes four inflection points and a critical point in an off-axis region thereof, and the image-side surface 872 of the seventh lens element 870 includes two inflection points and a critical point in an off-axis region thereof.

The eighth lens element 880 with negative refractive power has an object-side surface 881 being convex in a paraxial region thereof and an image-side surface 882 being concave in a paraxial region thereof. The eighth lens element 880 is made of a plastic material, and has the object-side surface 881 and the image-side surface 882 being both aspheric. Furthermore, the object-side surface 881 of the eighth lens element 880 includes four inflection points and a critical point in an off-axis region thereof, and the image-side surface 882 of the eighth lens element 880 includes three inflection points and a critical point in an off-axis region thereof.

The filter 890 is made of a glass material and disposed between the eighth lens element 880 and the image surface 895 and will not affect a focal length of the photographing optical lens assembly.

The detailed optical data of the 8th embodiment are shown in Table 15 and the aspheric surface data are shown in Table 16 below.

TABLE 15

8th Embodiment
f = 6.89 mm, Fno = 2.00, HFOV = 46.6 deg.

| Surface # | | Curvature Radius | | Thickness | Material | Index | Abbe # | Focal Length |
|---|---|---|---|---|---|---|---|---|
| 0 | Object | Plano | | 2000.000 | | | | |
| 1 | Ape. Stop | Plano | | −0.511 | | | | |
| 2 | Lens 1 | 3.025 | ASP | 0.622 | Plastic | 1.545 | 56.1 | 11.20 |
| 3 | | 5.563 | ASP | 0.315 | | | | |
| 4 | Lens 2 | 7.521 | ASP | 0.335 | Plastic | 1.660 | 20.4 | −18.63 |
| 5 | | 4.584 | ASP | 0.378 | | | | |
| 6 | Stop | Plano | | −0.329 | | | | |
| 7 | Lens 3 | 6.069 | ASP | 0.705 | Plastic | 1.544 | 56.0 | 10.03 |
| 8 | | −52.094 | ASP | 0.613 | | | | |
| 9 | Lens 4 | −86.660 | ASP | 0.386 | Plastic | 1.679 | 18.4 | 156.74 |
| 10 | | −47.858 | ASP | 0.470 | | | | |
| 11 | Lens 5 | −3.965 | ASP | 0.452 | Plastic | 1.582 | 30.2 | −14.87 |
| 12 | | −7.621 | ASP | 0.118 | | | | |
| 13 | Lens 6 | 3.058 | ASP | 0.598 | Plastic | 1.544 | 56.0 | 18.04 |
| 14 | | 4.135 | ASP | 0.836 | | | | |
| 15 | Lens 7 | 4.367 | ASP | 0.648 | Plastic | 1.544 | 56.0 | 9.82 |
| 16 | | 22.689 | ASP | 0.680 | | | | |
| 17 | Lens 8 | 14.239 | ASP | 0.663 | Plastic | 1.544 | 56.0 | −5.57 |
| 18 | | 2.458 | ASP | 0.800 | | | | |
| 19 | Filter | Plano | | 0.210 | Glass | 1.517 | 64.2 | — |
| 20 | | Plano | | 0.226 | | | | |
| 21 | Image | Plano | | — | | | | |

Reference wavelength is 587.6 nm (d-line).
Effective radius of Surface 6 (Stop 801) is 1.890 mm.

TABLE 16

Aspheric Coefficients

| Surface # | 2 | 3 | 4 | 5 | 7 | 8 |
|---|---|---|---|---|---|---|
| k = | 5.1240E−01 | −3.2523E+00 | −2.2963E−01 | −1.0809E+01 | −2.8994E−01 | 2.8286E+01 |
| A4 = | −1.9122E−03 | 8.4051E−04 | −1.7817E−02 | −4.1519E−03 | 2.5033E−04 | 1.8091E−04 |
| A6 = | −7.8891E−04 | −8.1092E−05 | 1.7143E−03 | 2.0628E−03 | 6.7785E−03 | −2.6172E−03 |
| A8 = | 1.3285E−05 | −9.0027E−04 | −5.0970E−04 | −7.5996E−03 | −1.2668E−02 | 4.1259E−03 |
| A10 = | −6.3881E−05 | 3.3892E−04 | 6.4719E−04 | 6.6650E−03 | 9.4276E−03 | −3.0549E−03 |

TABLE 16-continued

Aspheric Coefficients

| | | | | | | |
|---|---|---|---|---|---|---|
| A12 = | −1.7461E−05 | −1.6097E−04 | −4.4314E−04 | −2.9479E−03 | −3.7084E−03 | 1.3133E−03 |
| A14 = | | 2.9329E−05 | 1.5538E−04 | 7.0160E−04 | 7.6343E−04 | −3.1137E−04 |
| A16 = | | | −1.7891E−05 | −6.7591E−05 | −6.2784E−05 | 3.0938E−05 |

| Surface # | 9 | 10 | 11 | 12 | 13 | 14 |
|---|---|---|---|---|---|---|
| k = | 9.9000E+01 | 9.9000E+01 | −1.3206E−02 | −4.7034E−02 | −1.2328E+01 | −4.2706E+00 |
| A4 = | −1.1853E−02 | 4.3672E−03 | 5.5086E−02 | 1.6929E−02 | 9.7000E−03 | −2.3495E−02 |
| A6 = | −4.9134E−03 | −1.3396E−02 | −4.0114E−02 | −2.0633E−02 | −2.7388E−03 | 1.3422E−02 |
| A8 = | −7.2475E−04 | 7.4244E−03 | 1.9688E−02 | 8.3182E−03 | 5.9911E−04 | −4.0119E−03 |
| A10 = | 6.4047E−04 | −3.7372E−03 | −6.2605E−03 | −2.0074E−03 | −2.2110E−04 | 6.6968E−04 |
| A12 = | −2.0271E−04 | 1.2927E−03 | 1.2915E−03 | 3.2669E−04 | 4.5487E−05 | −6.9592E−05 |
| A14 = | 1.2319E−05 | −2.8430E−04 | −1.6901E−04 | −3.3330E−05 | −5.1185E−06 | 4.5676E−06 |
| A16 = | 2.3173E−06 | 3.5159E−05 | 1.3010E−05 | 1.8500E−06 | 3.2137E−07 | −1.8240E−07 |
| A18 = | | −1.7582E−06 | −4.5998E−07 | −4.1875E−08 | −1.0517E−08 | 4.0169E−09 |
| A20 = | | | | | 1.3926E−10 | −3.7215E−11 |

| Surface # | 15 | 16 | 17 | 18 |
|---|---|---|---|---|
| k = | −1.0075E+00 | 7.9337E+00 | 8.8355E−02 | −6.2829E+00 |
| A4 = | 2.8572E−03 | 2.5635E−02 | −4.7181E−02 | −2.2958E−02 |
| A6 = | −5.1299E−03 | −7.7153E−03 | 9.6238E−03 | 4.0298E−03 |
| A8 = | 9.1519E−04 | 8.8650E−04 | −1.0377E−03 | −4.2822E−04 |
| A10 = | −1.5530E−04 | −5.4698E−05 | 6.8024E−05 | 2.9076E−05 |
| A12 = | 1.8739E−05 | 1.8634E−06 | −2.8654E−06 | −1.3001E−06 |
| A14 = | −1.3068E−06 | −2.8805E−08 | 7.8406E−08 | 3.7810E−08 |
| A16 = | 5.0822E−08 | −1.0693E−10 | −1.3523E−09 | −6.8382E−10 |
| A18 = | −1.0310E−09 | 9.3579E−12 | 1.3391E−11 | 6.9641E−12 |
| A20 = | 8.5229E−12 | −8.1721E−14 | −5.8157E−14 | −3.0491E−14 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 6.89 | R9/f | −0.58 |
| Fno | 2.00 | (R15 + R16)/(R15 − R16) | 1.42 |
| HFOV [deg.] | 46.6 | f/f1 | 0.62 |
| V5 | 30.2 | f/f2 | −0.37 |
| V6 | 56.0 | f/f3 | 0.69 |
| (Vi/Ni)min | 10.98 | f/f4 | 0.04 |
| Vmin | 18.4 | f/f5 | −0.46 |
| ΣCT/ΣAT | 1.43 | f/f6 | 0.38 |
| CT1/CT3 | 0.88 | f/f7 | 0.70 |
| CTmax/CTmin | 2.10 | f/f8 | −1.24 |
| (T12 + T34)/T23 | 18.94 | f/ImgH | 0.87 |
| (T12 + T34 + T45 + T67 + T78)/(T23 + T56) | 17.45 | f1/f3 | 1.12 |
| (T67 + T78)/CT7 | 2.34 | f3/f7 | 1.02 |
| (T67 − T78)/(T67 + T78) | 0.10 | |f7/f8| | 1.76 |
| TD/T45 | 15.94 | ImgH/BL | 6.42 |
| TD/(T67 + T78) | 4.94 | Y82/Y11 | 3.68 |
| TL [mm] | 8.73 | Yc62/Yc61 | 1.09 |
| TL/f | 1.27 | Yc72/Yc71 | 1.11 |
| TL/ImgH | 1.10 | Yc82/Y82 | 0.44 |
| R5/R6 | −0.12 | | |

9th Embodiment

Figure 18:
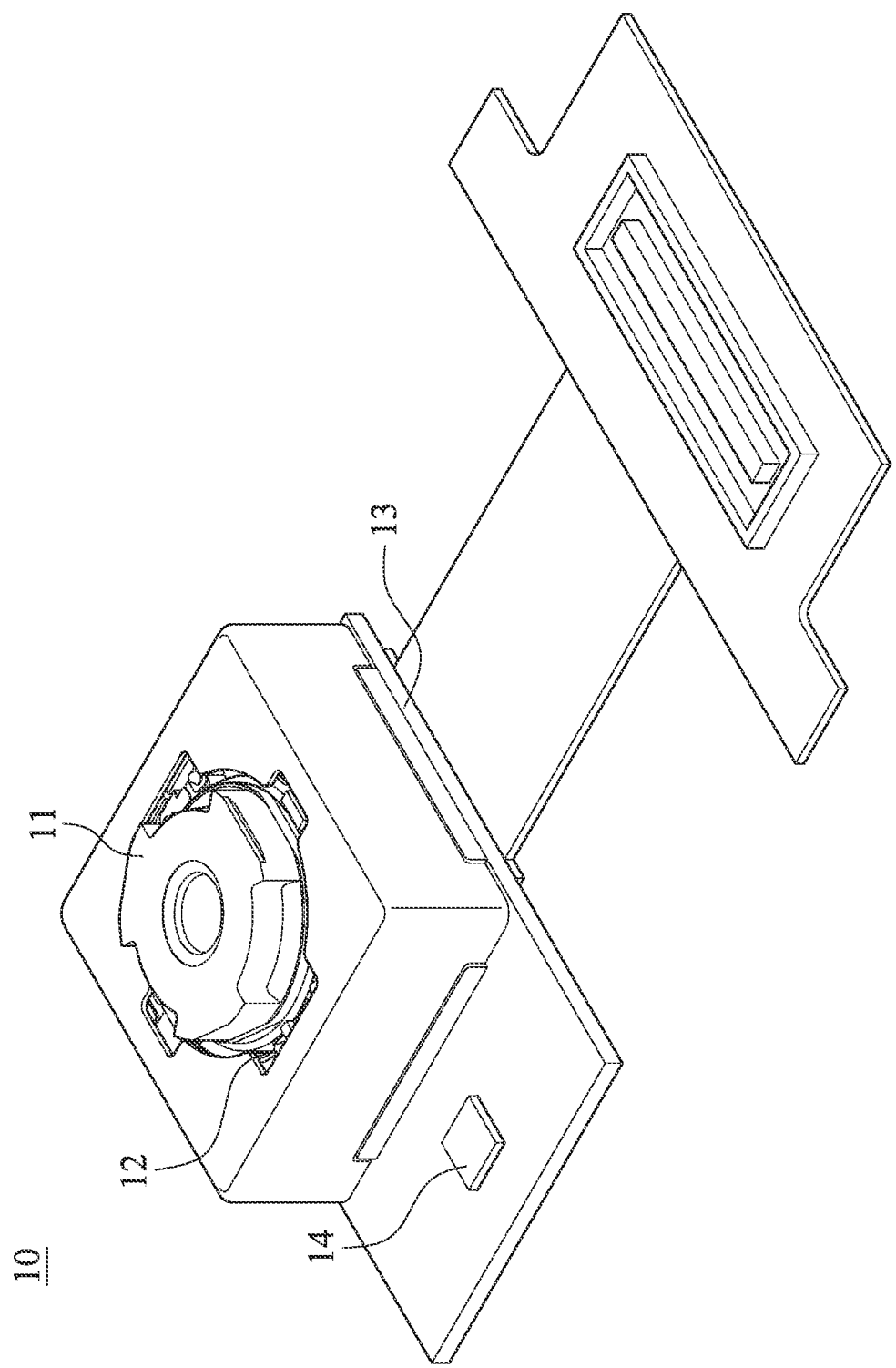
FIG. 18 is a three-dimensional schematic view of an imaging apparatus according to the 9th embodiment of the present disclosure.

FIG. 18 is a three-dimensional schematic view of an imaging apparatus 10 according to the 9th embodiment of the present disclosure. In FIG. 18, the imaging apparatus 10 of the 9th embodiment is a camera module, the imaging apparatus 10 includes an imaging lens assembly 11, a driving apparatus 12 and an image sensor 13, wherein the imaging lens assembly 11 includes the photographing optical lens assembly of the present disclosure and a lens barrel (its reference number is omitted) for carrying the photographing optical lens assembly. The imaging apparatus 10 can focus light from an imaged object via the imaging lens assembly 11, perform image focusing by the driving apparatus 12, and generate an image on the image sensor 13, and the imaging information can be transmitted.

The driving apparatus 12 can be an auto-focus module, which can be driven by driving systems, such as voice coil motors (VCM), micro electro-mechanical systems (MEMS), piezoelectric systems, and shape memory alloys. The photographing optical lens assembly can obtain a favorable imaging position by the driving apparatus 12 so as to capture clear images when the imaged object is disposed at different object distances.

The imaging apparatus 10 can include the image sensor 13 located on the image surface of the photographing optical lens assembly, such as CMOS and CCD, with superior photosensitivity and low noise. Thus, it is favorable for providing realistic images with high definition image quality thereof.

Furthermore, the imaging apparatus 10 can further include an image stabilization module 14, which can be a kinetic energy sensor, such as an accelerometer, a gyro sensor, and a Hall Effect sensor. In the 9th embodiment, the image stabilization module 14 is a gyro sensor, but is not limited thereto. Therefore, the variation of different axial directions of the photographing optical lens assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS), can be provided.

10th Embodiment

Figure 19A:
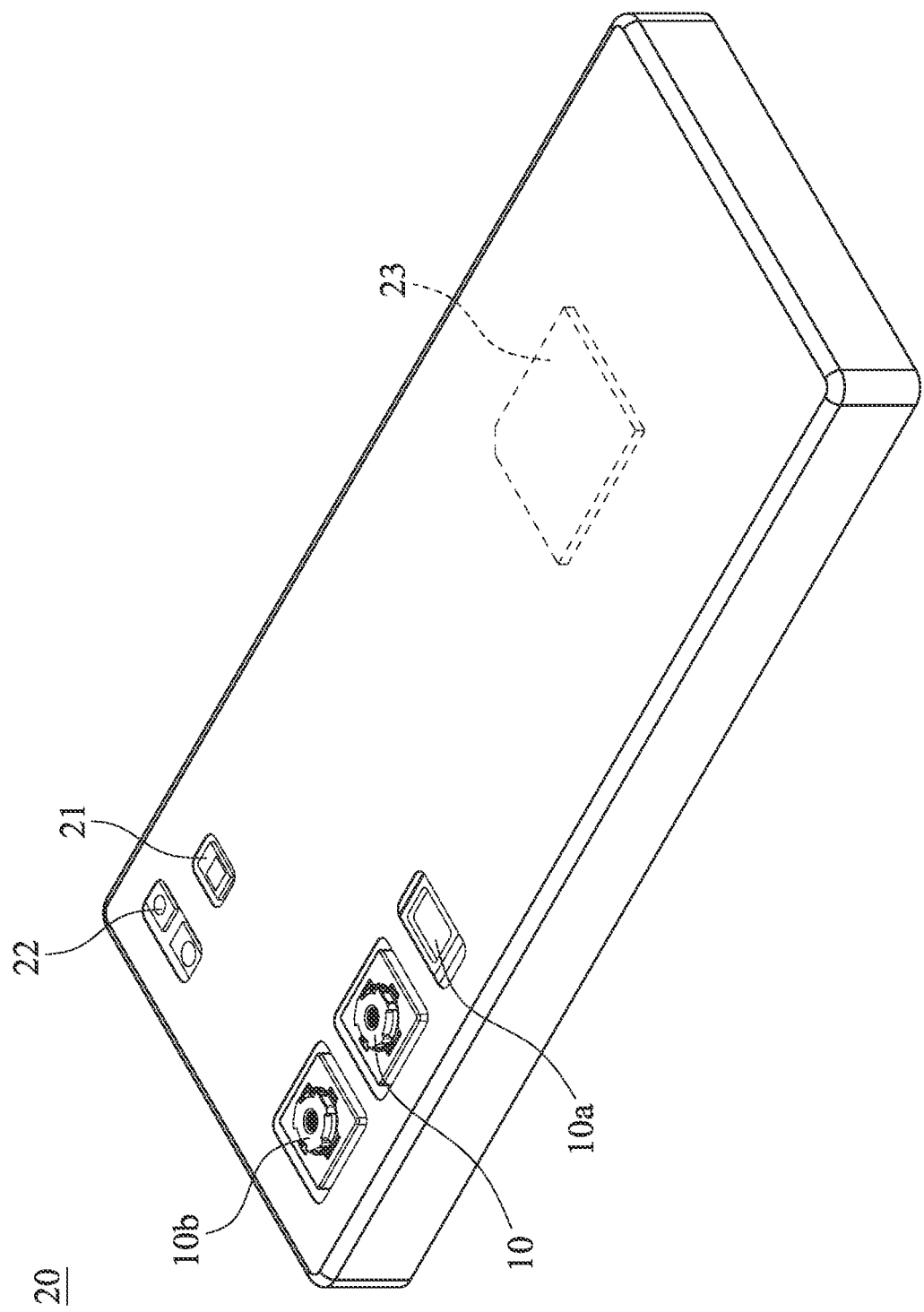
FIG. 19A is a schematic view of one side of an electronic device according to the 10th embodiment of the present disclosure.
Figure 19B:
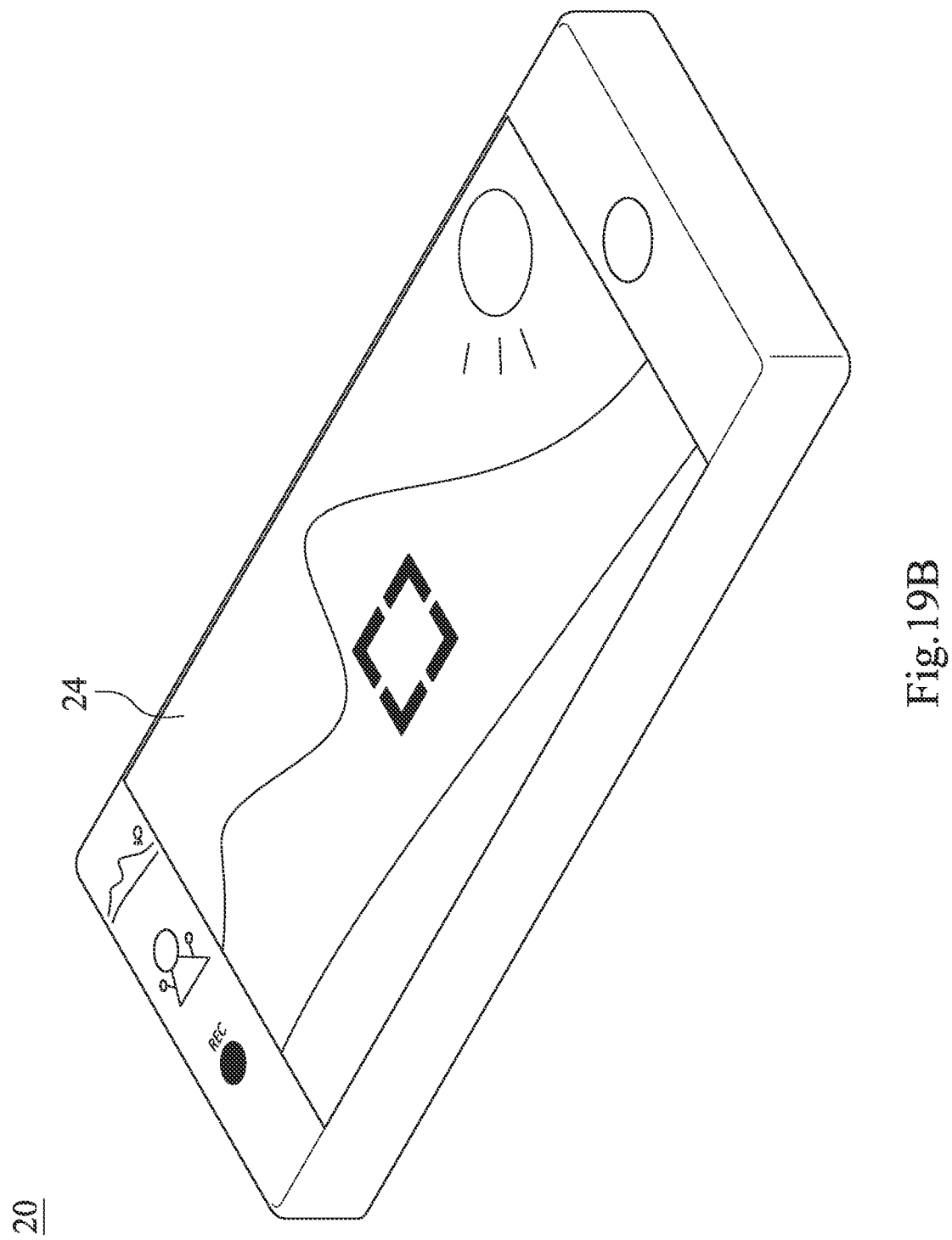
FIG. 19B is a schematic view of another side of the electronic device of FIG. 19A.
Figure 19C:
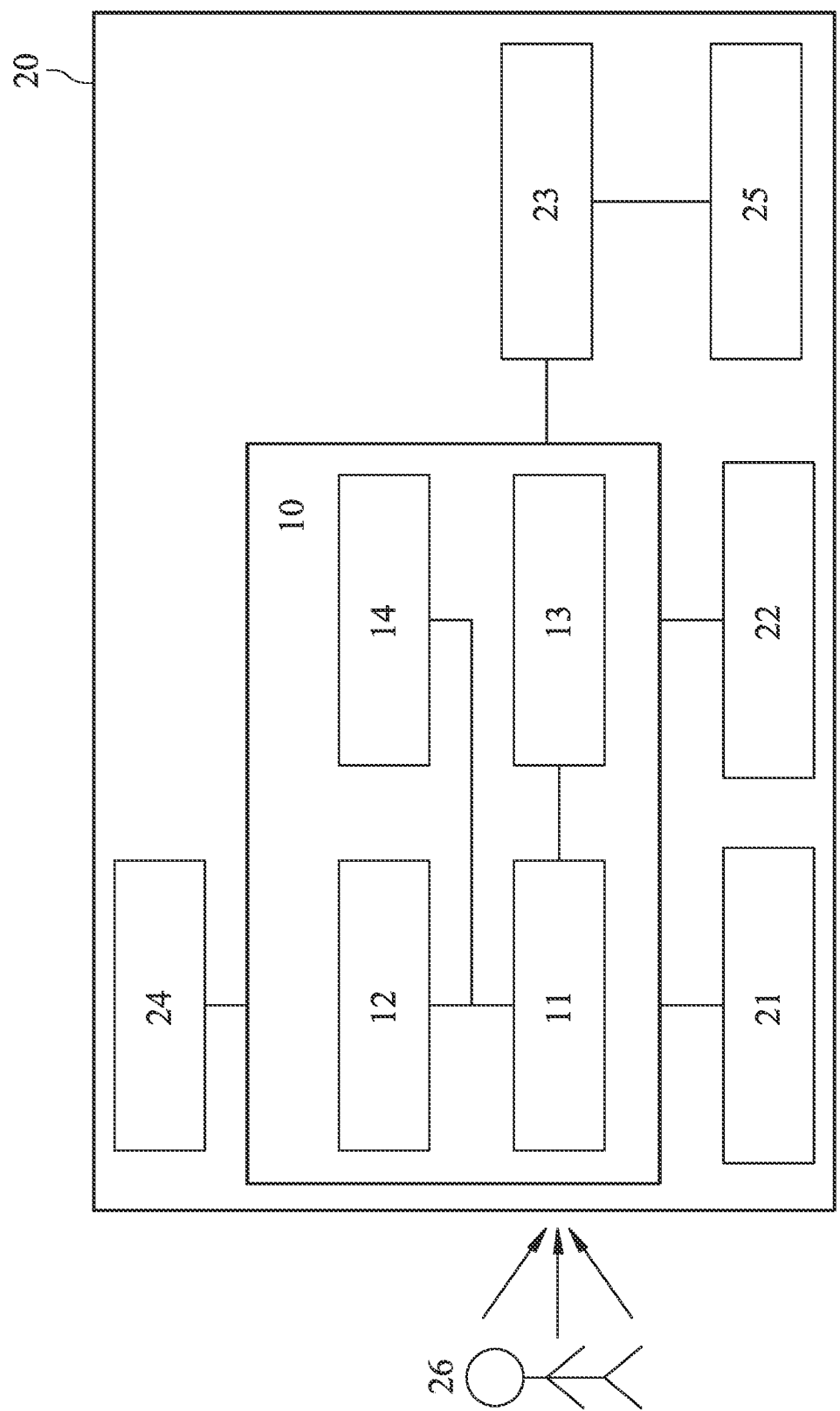
FIG. 19C is a system schematic view of the electronic device of FIG. 19A.

FIG. 19A is a schematic view of one side of an electronic device 20 according to the 10th embodiment of the present disclosure. FIG. 19B is a schematic view of another side of the electronic device 20 of FIG. 19A. FIG. 19C is a system schematic view of the electronic device 20 of FIG. 19A. In FIG. 19A, FIG. 19B and FIG. 19C, the electronic device 20 according to the 10th embodiment is a smartphone, wherein the electronic device 20 includes three imaging apparatus 10, 10a, 10b, a flash module 21, a focusing assisting module 22, an image signal processor (ISP) 23, a user interface 24 and an image software processor 25. When the user captures images of an imaged object 26 via the user interface 24, the electronic device 20 focuses and generates an image via at least one of the imaging apparatus 10, 10a, 10b while compensating for low illumination via the flash module 21 when necessary. Then, the electronic device 20 quickly focuses on the imaged object according to its object distance information provided by the focusing assisting module 22, and optimizes the image via the image signal processor 23 and the image software processor 25. Thus, the image quality can be further enhanced. The focusing assisting module 22 can adopt conventional infrared or laser for obtaining quick focusing, and the user interface 24 can utilize a touch screen or a physical button for capturing and processing the image with various functions of the image processing software.

According to the 10th embodiment, the imaging apparatus 10a, 10b can be the same as or similar to the imaging apparatus 10 according to the 9th embodiment and will not be described again herein. In detail, the imaging apparatus 10a, 10, 10b of the 10th embodiment can be respectively a telephoto imaging apparatus, a wide-angle imaging apparatus and a general imaging apparatus (which is between telephoto characteristic and wide angle characteristic), or other kinds of imaging apparatus, and the present disclosure is not limited thereto.

11th Embodiment

Figure 20:
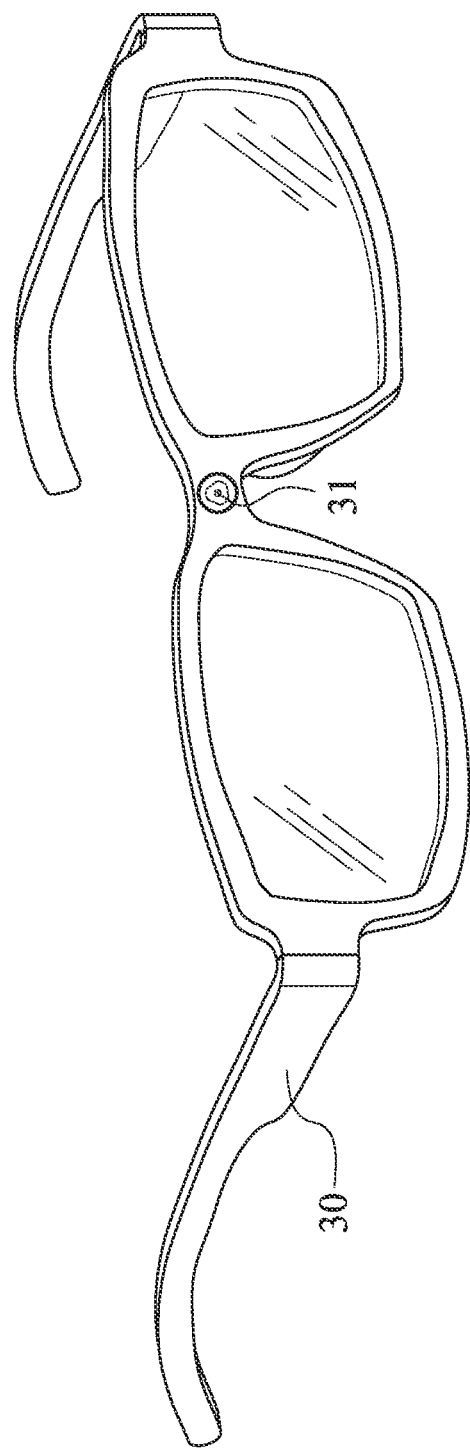
FIG. 20 is a schematic view of an electronic device according to the 11th embodiment of the present disclosure.

FIG. 20 is a schematic view of an electronic device 30 according to the 11th embodiment of the present disclosure. The electronic device 30 of the 11th embodiment is a wearable device. The electronic device 30 includes an imaging apparatus 31. The imaging apparatus 31 can be the same as that of the 9th embodiment, and will not be repeated herein.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising eight lens elements, the eight lens elements being, in order from an object side to an image side along an optical path:
   a first lens element, a second lens element, a third lens element, a fourth lens element, a fifth lens element, a sixth lens element, a seventh lens element and an eighth lens element;
   wherein each of the eight lens elements has an object-side surface towards the object side and an image-side surface towards the image side;
   wherein the first lens element has positive refractive power, the third lens element has positive refractive power, the object-side surface of the fifth lens element is concave in a paraxial region thereof, the object-side surface of the seventh lens element is convex in a paraxial region thereof, the image-side surface of the eighth lens element is concave in a paraxial region thereof;
   wherein at least one of the object-side surface and the image-side surface of the eighth lens element comprises at least one critical point in an off-axis region thereof;
   wherein an axial distance between the sixth lens element and the seventh lens element is T67, an axial distance between the seventh lens element and the eighth lens element is T78, a curvature radius of the object-side surface of the fifth lens element is R9, a focal length of the photographing optical lens assembly is f, a focal length of the seventh lens element is f7, a focal length of the eighth lens element is f8, an f-number of the photographing optical lens assembly is Fno, and the following conditions are satisfied:

$-0.40 < (T67-T78)/(T67+T78);$ $-1.0 < R9/f < 0;$ $1.4 < Fno < 2.2;$ and $1.2 < |f7/f8| < 3.5.$ 2. The photographing optical lens assembly of claim 1, wherein the curvature radius of the object-side surface of the fifth lens element is R9, the focal length of the photographing optical lens assembly is f, and the following condition is satisfied:

$-1.0 < R9/f \leq -0.57.$

3. The photographing optical lens assembly of claim 1, wherein the f-number of the photographing optical lens assembly is Fno, and the following condition is satisfied:

$1.4 < Fno \leq 2.00.$

4. The photographing optical lens assembly of claim 1, wherein the axial distance between the sixth lens element and the seventh lens element is T67, the axial distance between the seventh lens element and the eighth lens element is T78, a central thickness of the seventh lens element is CT7, and the following condition is satisfied:

$1.5 < (T67+T78)/CT7.$

5. The photographing optical lens assembly of claim 1, wherein an axial distance between the object-side surface of the first lens element and the image-side surface of the eighth lens element is TD, an axial distance between the fourth lens element and the fifth lens element is T45, and the following condition is satisfied:

$2.0 < TD/T45 < 30.$

6. The photographing optical lens assembly of claim 1, wherein an axial distance between the object-side surface of the first lens element and the image-side surface of the eighth lens element is TD, the axial distance between the sixth lens element and the seventh lens element is T67, the axial distance between the seventh lens element and the eighth lens element is T78, and the following condition is satisfied:

$2.0<TD/(T67+T78)<6.3$.

7. The photographing optical lens assembly of claim 1, wherein an axial distance between the object-side surface of the first lens element and an image surface is TL, the focal length of the photographing optical lens assembly is f, and the following conditions are satisfied:

3.0 mm<$TL$<14.0 mm; and $1.1<TL/f<1.4$.

8. The photographing optical lens assembly of claim 1, wherein the focal length of the photographing optical lens assembly is f, the focal length of the eighth lens element is f8, and the following condition is satisfied:

$-1.8<f/f8<-1.0$.

9. The photographing optical lens assembly of claim 1, wherein the focal length of the seventh lens element is f7, a focal length of the eighth lens element is f8, and the following condition is satisfied:

$1.4<|f7/f8|<2.3$.

10. The photographing optical lens assembly of claim 1, wherein each of at least three of the eight lens elements comprises at least one inflection point on at least one of the object-side surfaces and the image-side surfaces thereof, a distance between a critical point of the image-side surface of the eighth lens element and an optical axis is Yc82, a maximum distance between an optically effective area of the image-side surface of the eighth lens element and the optical axis is Y82, and the image-side surface of the eighth lens element comprises at least one critical point in the off-axis region thereof satisfying the following condition:

$0.25<Yc82/Y82<0.65$.

11. A photographing optical lens assembly comprising eight lens elements, the eight lens elements being, in order from an object side to an image side along an optical path:
a first lens element, a second lens element, a third lens element, a fourth lens element, a fifth lens element, a sixth lens element, a seventh lens element and an eighth lens element;
wherein each of the eight lens elements has an object-side surface towards the object side and an image-side surface towards the image side;
wherein the first lens element has positive refractive power, the third lens element has positive refractive power, the object-side surface of the fifth lens element is concave in a paraxial region thereof, the object-side surface of the seventh lens element is convex in a paraxial region thereof, the image-side surface of the eighth lens element is concave in a paraxial region thereof;
wherein at least one of the object-side surface and the image-side surface of the eighth lens element comprises at least one critical point in an off-axis region thereof;
wherein an axial distance between the fourth lens element and the fifth lens element is T45, an axial distance between the sixth lens element and the seventh lens element is T67, an axial distance between the seventh lens element and the eighth lens element is T78, a curvature radius of the object-side surface of the fifth lens element is R9, a focal length of the photographing optical lens assembly is f, an f-number of the photographing optical lens assembly is Fno, a focal length of the seventh lens element is f7, a focal length of the eighth lens element is f8, an axial distance between the object-side surface of the first lens element and the image-side surface of the eighth lens element is TD, a central thickness of the first lens element is CT1, a central thickness of the third lens element is CT3, and the following conditions are satisfied:

$-0.40<(T67-T78)/(T67+T78)$;

$-1.0<R9/f<0$;

$6.0<TD/T45<25$;

$0.75<CT1/CT3<1.2$;

$1.4<Fno<2.2$; and $1.2<|f7/f8|<3.5$.

12. The photographing optical lens assembly of claim 11, wherein the axial distance between the sixth lens element and the seventh lens element is T67, the axial distance between the seventh lens element and the eighth lens element is T78, and the following condition is satisfied:

$-0.30<(T67-T78)/(T67+T78)<0.30$.

13. The photographing optical lens assembly of claim 11, wherein the curvature radius of the object-side surface of the fifth lens element is R9, the focal length of the photographing optical lens assembly is f, and the following condition is satisfied:

$-0.80<R9/f<-0.45$.

14. The photographing optical lens assembly of claim 11, wherein an Abbe number of the sixth lens element is V6, and the following condition is satisfied:

$35.0<V6<60.0$.

15. The photographing optical lens assembly of claim 11, wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of i-th lens element is Ni, a minimum of Vi/Ni is (Vi/Ni)min, a sum of central thicknesses of all the lens elements of the photographing optical lens assembly is ΣCT, a sum of all axial distances between adjacent lens elements of the photographing optical lens assembly is ΣAT, and and the following conditions are satisfied:

$8.0<(Vi/Ni)min<12.0$, wherein $i=1-8$; and $1.0<\Sigma CT/\Sigma AT<2.0$.

16. The photographing optical lens assembly of claim 11, wherein a curvature radius of the object-side surface of the third lens element is R5, a curvature radius of the image-side surface of the third lens element is R6, and the following condition is satisfied:

$R5/R6<0.30.$

17. The photographing optical lens assembly of claim 11, wherein the focal length of the photographing optical lens assembly is f, a focal length of the third lens element is f3, a focal length of the fourth lens element is f4, a focal length of the fifth lens element is f5, a focal length of the sixth lens element is f6, and the following conditions are satisfied:

$0.20<f/f3<1.2;$ $-0.70<f/f4<1.0;$ $-0.80<f/f5<0.70;$ and $-0.40<f/f6<0.50.$

18. The photographing optical lens assembly of claim 11, wherein the object-side surface of the first lens element is convex in a paraxial region thereof; a distance between a critical point of the object-side surface of the seventh lens element and an optical axis is Yc71, a distance between a critical point of the image-side surface of the seventh lens element and the optical axis is Yc72, and each of the object-side surface and the image-side surface of the seventh lens element comprises at least one critical point in the off-axis region thereof satisfying the following condition:

$0.80<Yc72/Yc71<1.3.$

19. The photographing optical lens assembly of claim 11, wherein the second lens element has negative refractive power, the image-side surface of the second lens element is concave in a paraxial region thereof; the image-side surface of the fifth lens element is convex in a paraxial region thereof.

20. The photographing optical lens assembly of claim 11, wherein the object-side surface of the third lens element is convex in a paraxial region thereof; half of a maximum field of view of the photographing optical lens assembly is HFOV, a maximum distance between an optically effective area of the image-side surface of the eighth lens element and an optical axis is Y82, a maximum distance between an optically effective area of the object-side surface of the first lens element and the optical axis is Y11, and the following conditions are satisfied:

$30.0$ degrees$<$HFOV$<65.0$ degrees; and $2.0<Y82/Y11<5.0.$

* * * * *